(12) United States Patent
Knight et al.

(10) Patent No.: US 6,724,694 B2
(45) Date of Patent: Apr. 20, 2004

(54) DISK MASTERING BASED ON NEAR-FIELD OPTICAL SYSTEMS

(75) Inventors: Gordon R. Knight, Saratoga, CA (US); John Al-Samarrie, Felton, CA (US); David Blankenbeckler, Santa Clara, CA (US); Brian Bonn, Scotts Valley, CA (US); Alan Burroughs, San Jose, CA (US); Warren Dalziel, Monte Sereno, CA (US); Roger Hajjar, Santa Clara, CA (US); Amit Jain, Sunnyvale, CA (US); Guolin Ma, Milpitas, CA (US); Brian P. Tremaine, San Jose, CA (US)

(73) Assignee: TeraStor Corporation, Milpitas, CA (US)

( * ) Notice: Subject to any disclaimer, the term of this patent is extended or adjusted under 35 U.S.C. 154(b) by 0 days.

(21) Appl. No.: 10/173,495

(22) Filed: Jun. 14, 2002

(65) Prior Publication Data

US 2003/0035361 A1 Feb. 20, 2003

Related U.S. Application Data

(60) Division of application No. 09/500,695, filed on Feb. 9, 2000, now Pat. No. 6,449,221, which is a division of application No. 08/846,916, filed on Apr. 29, 1997, now Pat. No. 6,243,350, which is a continuation-in-part of application No. 08/641,513, filed on May 1, 1996, now abandoned, and a continuation-in-part of application No. 08/657,145, filed on Jun. 3, 1996, now Pat. No. 6,270,696, and a continuation-in-part of application No. 08/692,581, filed on Aug. 5, 1996, now abandoned, and a continuation-in-part of application No. 08/720,808, filed on Oct. 1, 1996, now Pat. No. 5,936,928, and a continuation-in-part of application No. 08/764,175, filed on Dec. 13, 1996, now Pat. No. 5,793,584, and a continuation-in-part of application No. 08/795,606, filed on Feb. 5, 1997, now Pat. No. 5,828,482.

(51) Int. Cl.$^7$ .............................................. G11B 11/00
(52) U.S. Cl. ............................... 369/13.55; 369/13.35; 369/44.13; 369/47.37; 369/275.2; 369/275.4; 369/112.24
(58) Field of Search ......................... 369/119, 112.27, 369/112.29, 126, 44.15, 112.05, 116, 44.25, 13.33, 112.24, 13.35, 13.55, 44.13, 47.37, 275.2, 275.4; 428/65.3; 219/121.68, 121.77; 360/75, 77.04, 77.06

(56) References Cited

U.S. PATENT DOCUMENTS

| | | | | |
|---|---|---|---|---|
| 5,497,359 A | * | 3/1996 | Mamin et al. | 369/44.15 |
| 5,541,784 A | * | 7/1996 | Cribbs et al. | 360/75 |
| 5,602,820 A | * | 2/1997 | Wickramasinghe et al. | 369/44.25 |
| 5,729,393 A | * | 3/1998 | Lee et al. | 369/44.15 |
| 5,754,514 A | * | 5/1998 | Guerra | 369/116 |
| 5,981,902 A | * | 11/1999 | Arita et al. | 219/121.68 |
| 6,044,056 A | * | 3/2000 | Wilde et al. | 369/119 |
| 6,125,008 A | * | 9/2000 | Berg et al. | 360/264.4 |

* cited by examiner

Primary Examiner—William Korzuch
Assistant Examiner—Kim-Kwok Chu
(74) Attorney, Agent, or Firm—Fish & Richardson P.C.

(57) ABSTRACT

Structures of storage media for optical storage systems, especially for systems in the near-field configuration to couple radiation between the optical head and the media at least in part by evanescent fields.

10 Claims, 61 Drawing Sheets

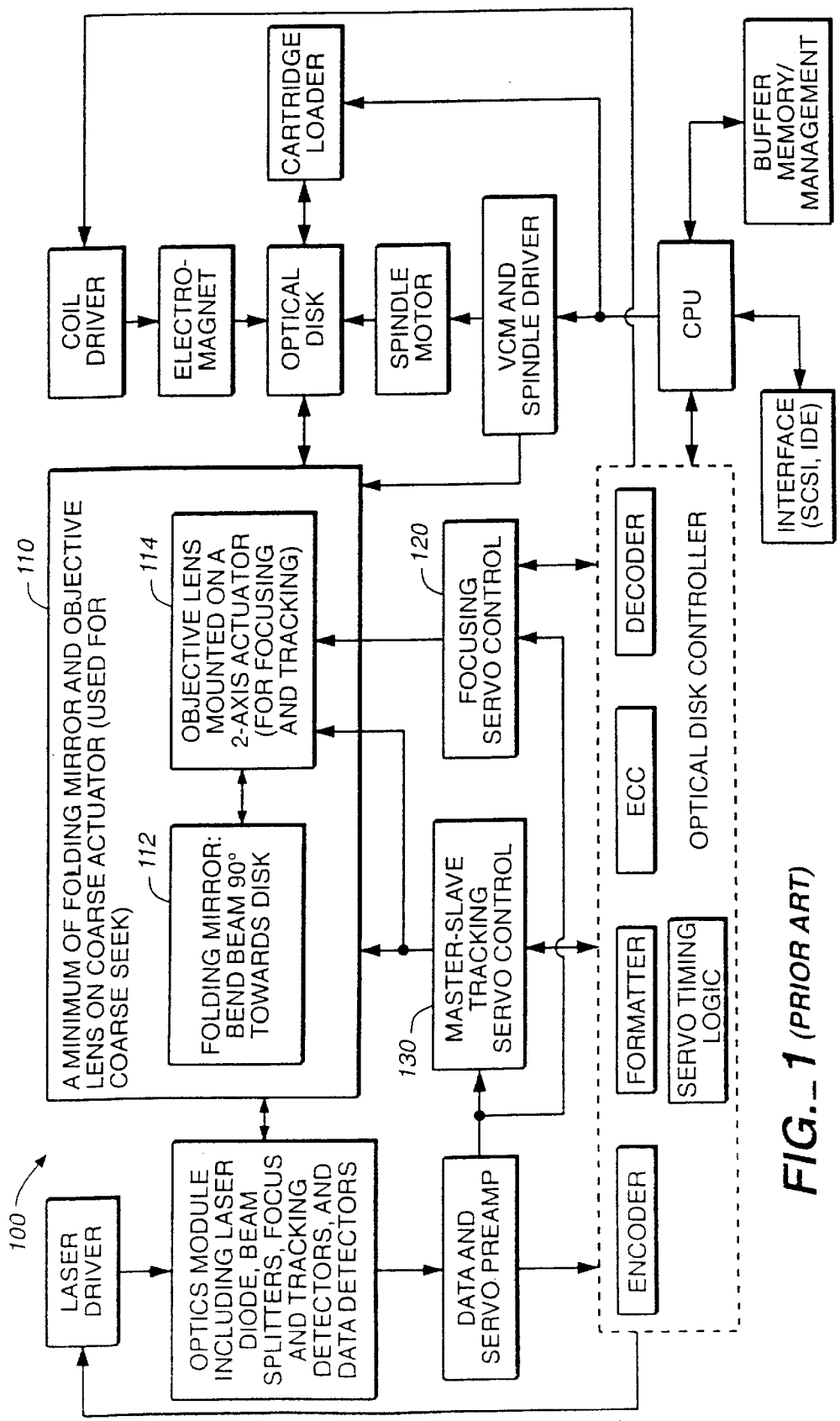
FIG._1 (PRIOR ART)

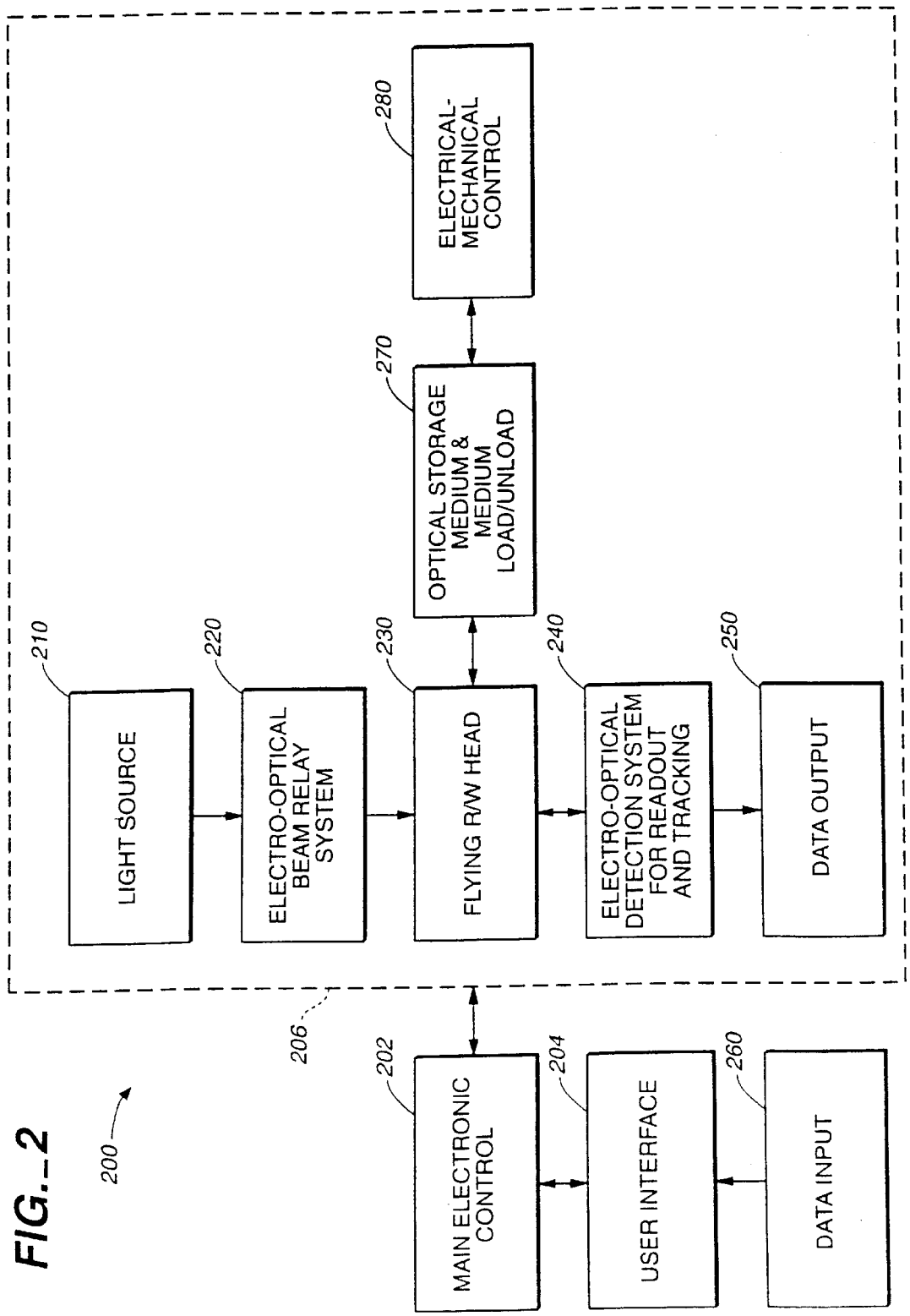
FIG._2

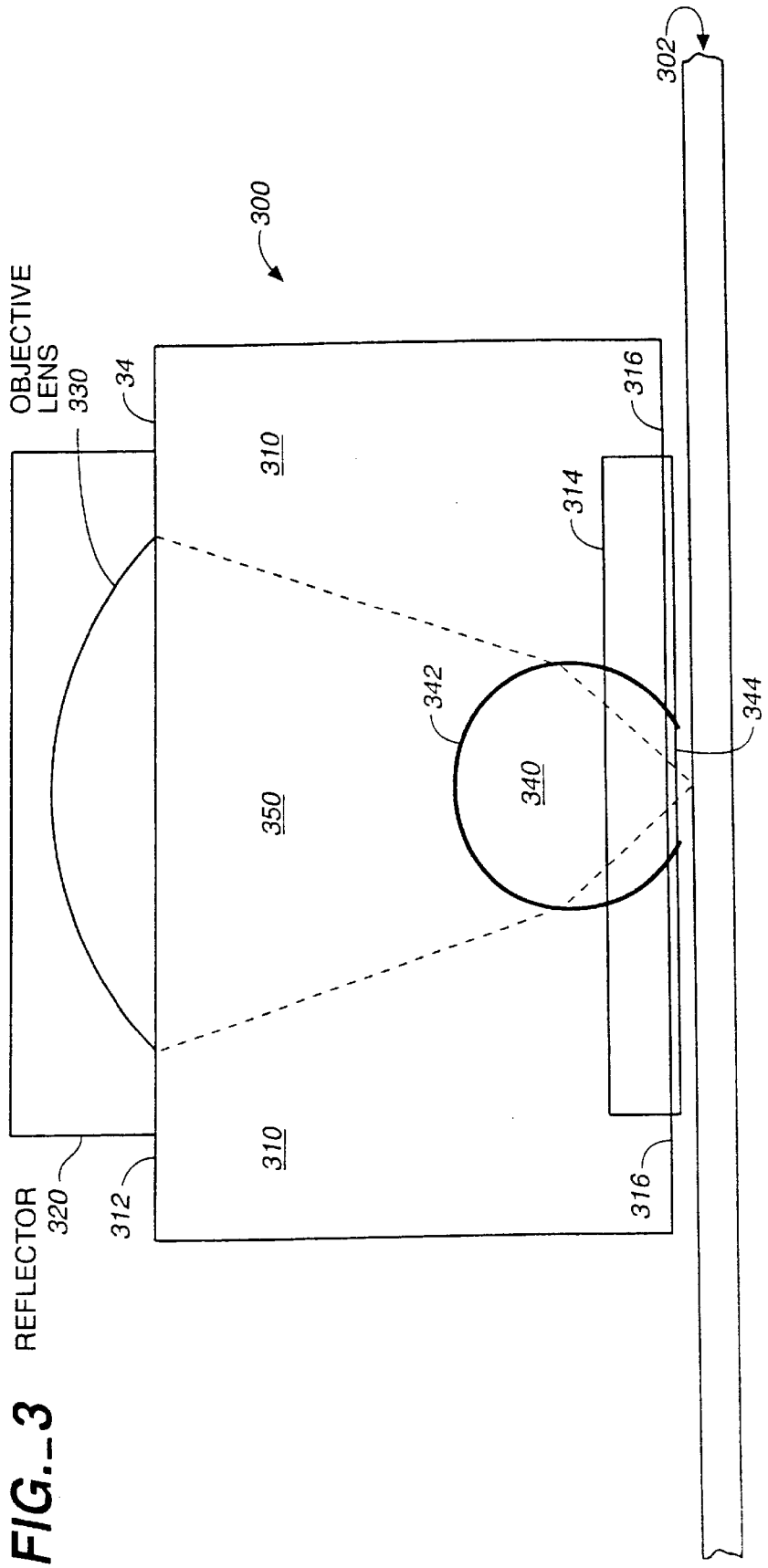

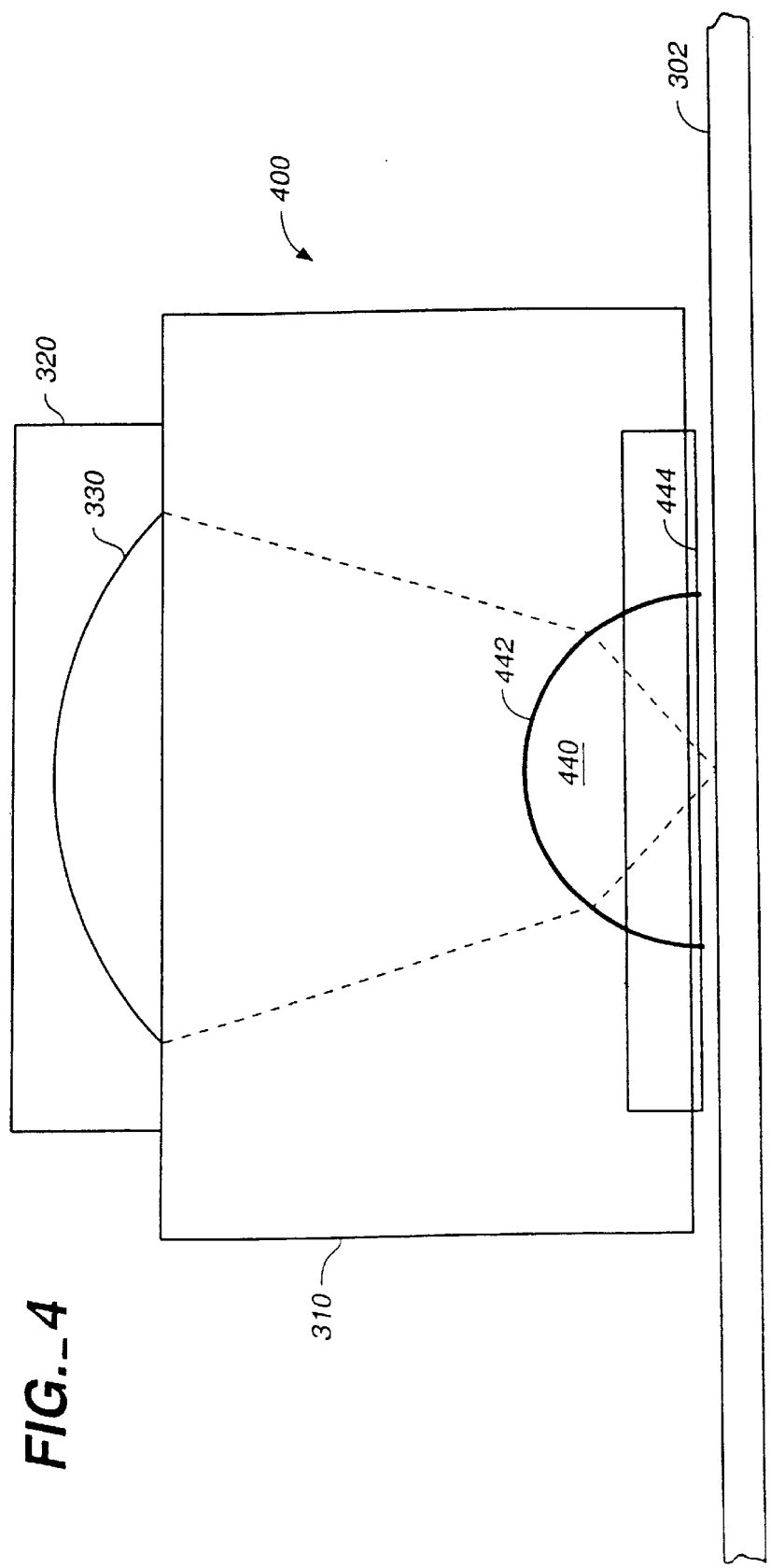

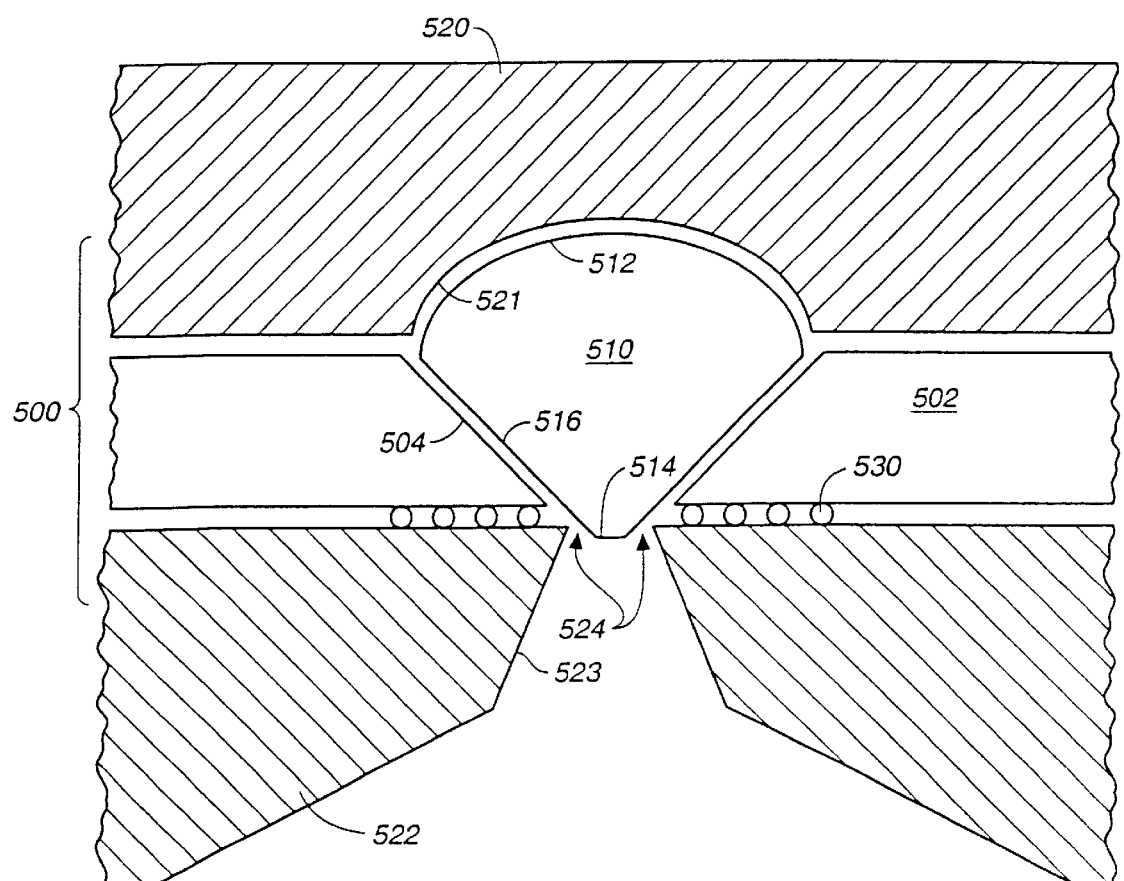
FIG._5

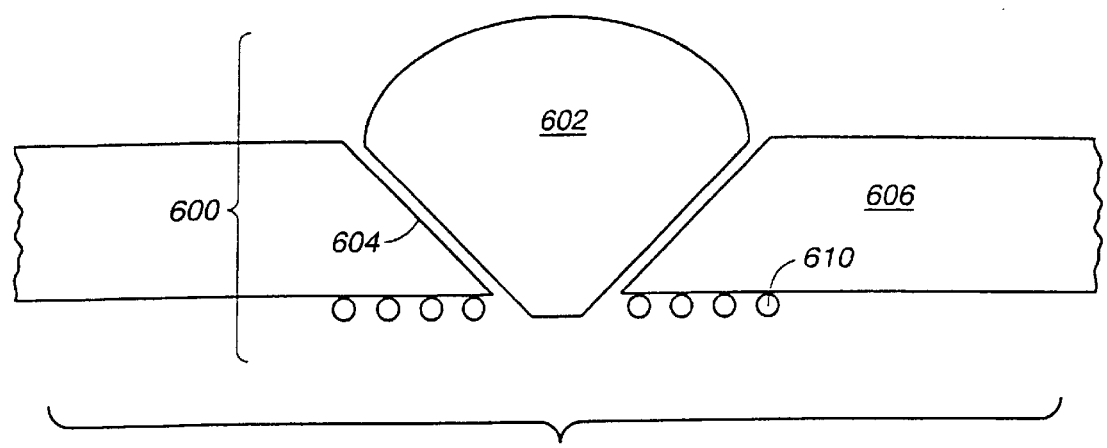
FIG._6
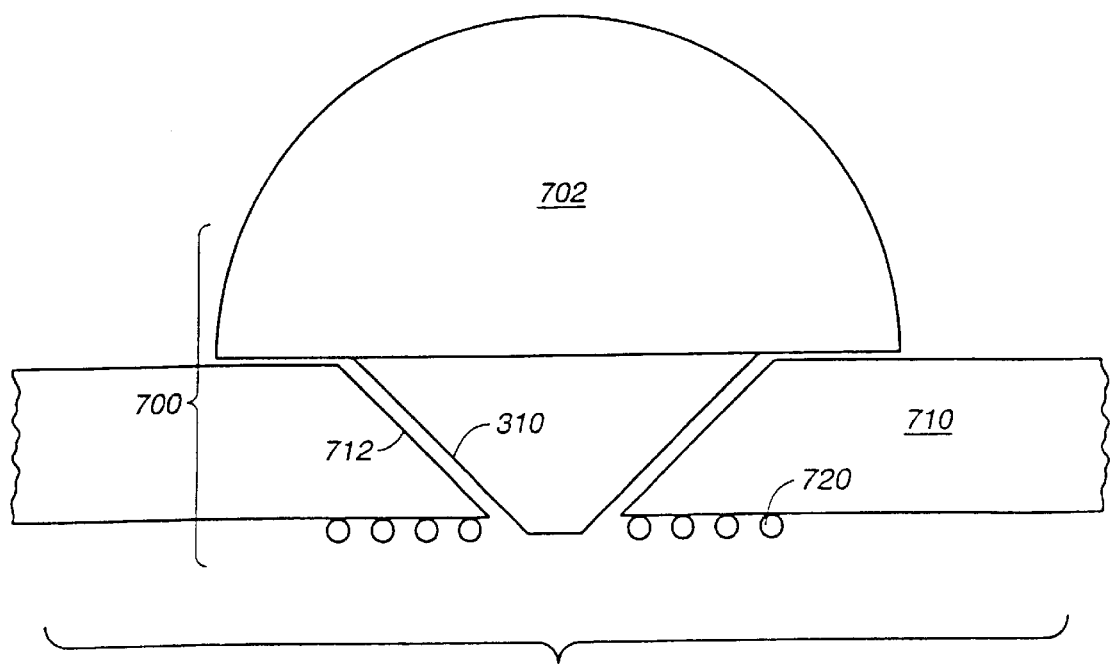
FIG._7

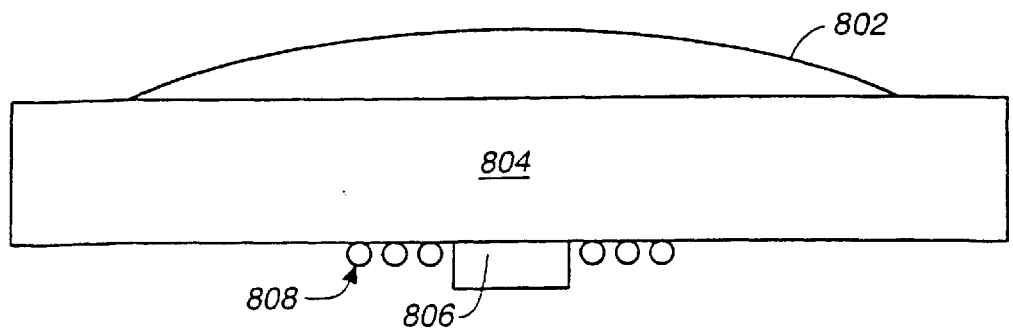
FIG._8A
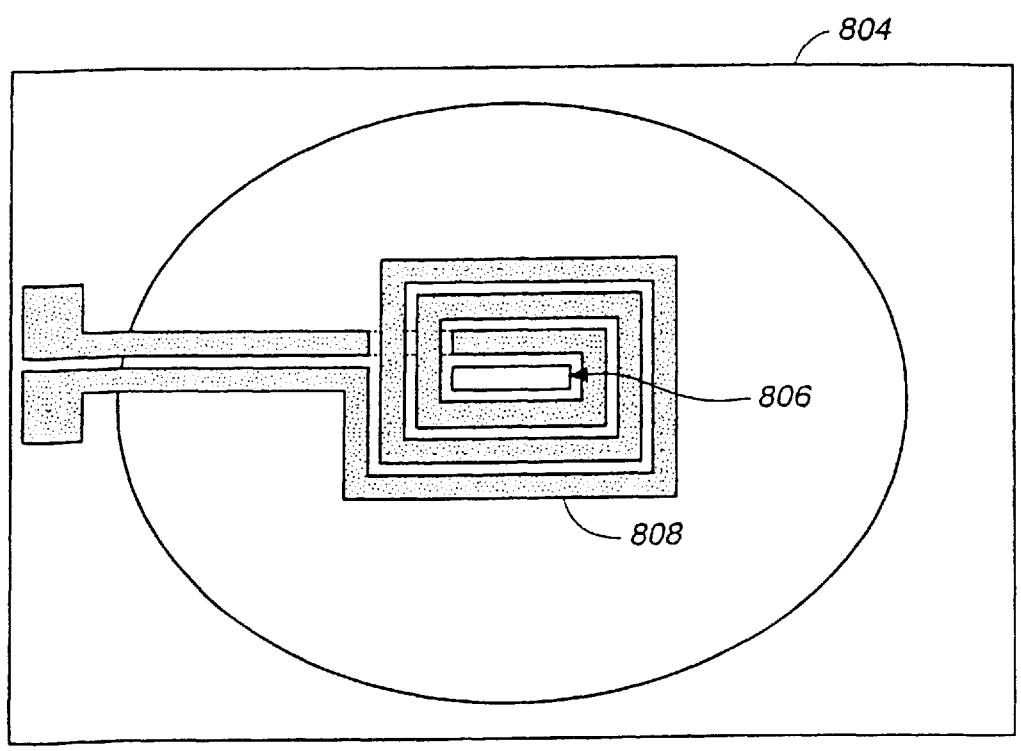
FIG._8B

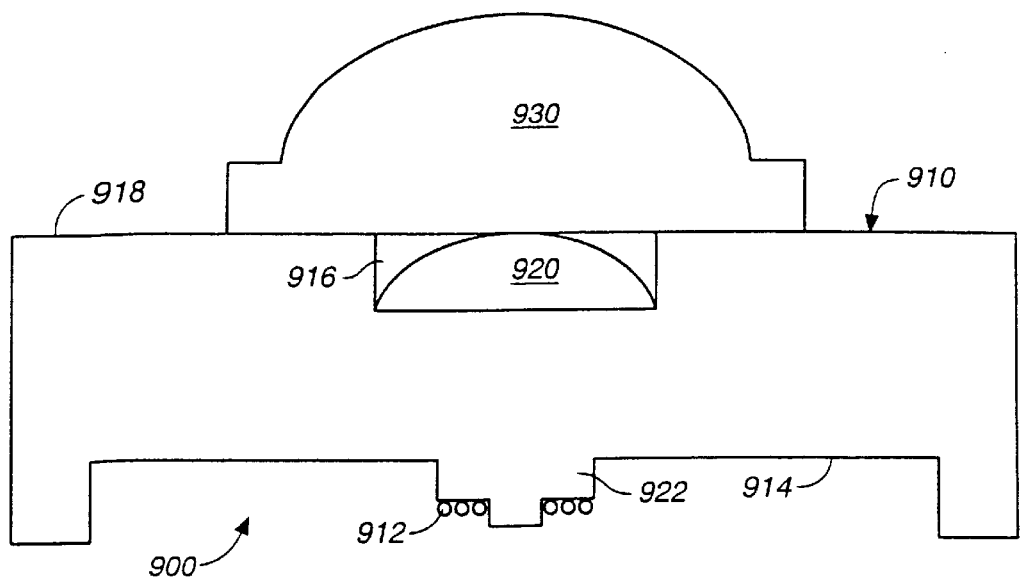
FIG._9A
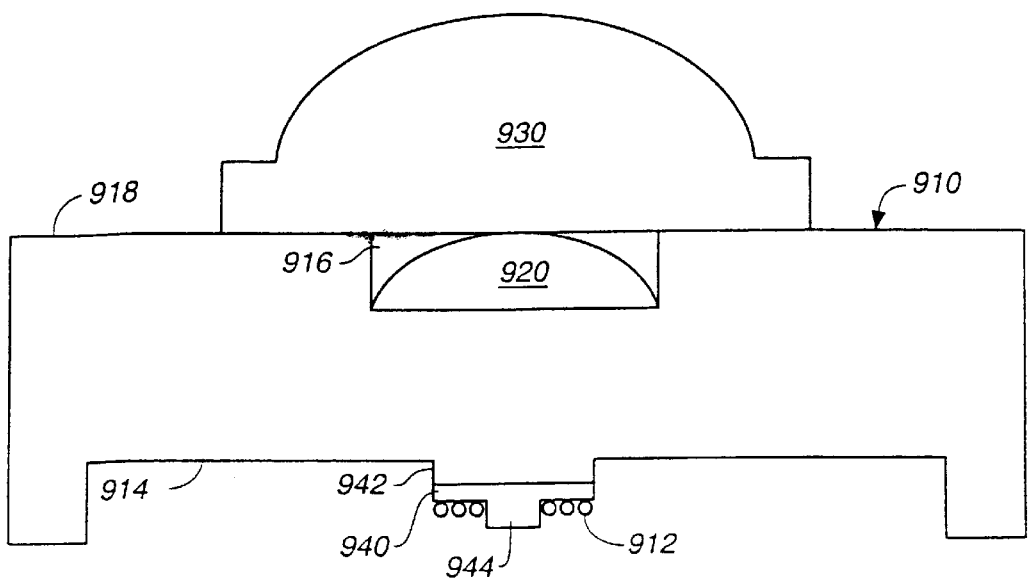
FIG._9B

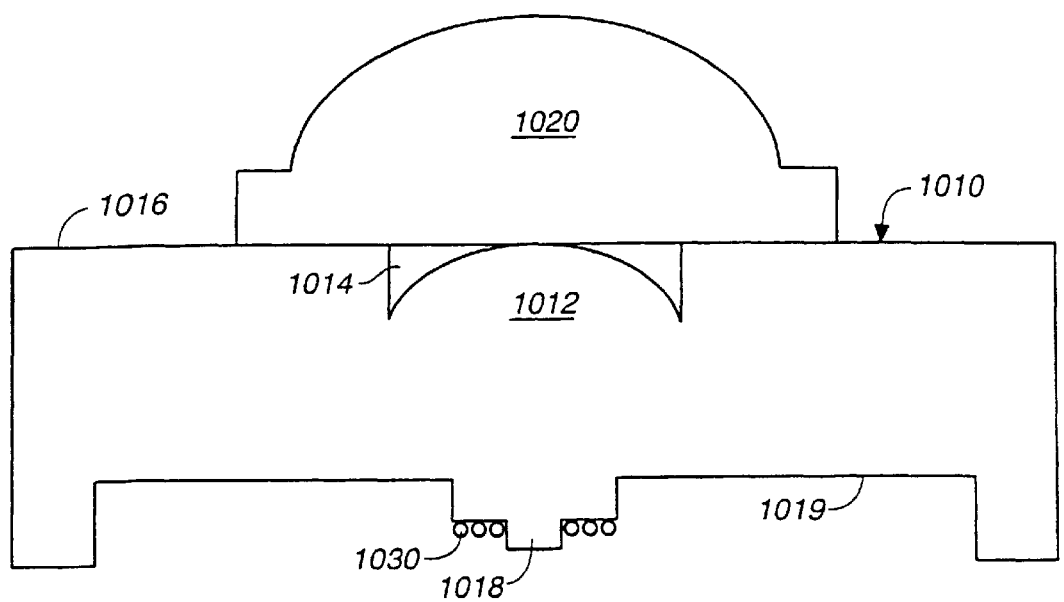
FIG._10A
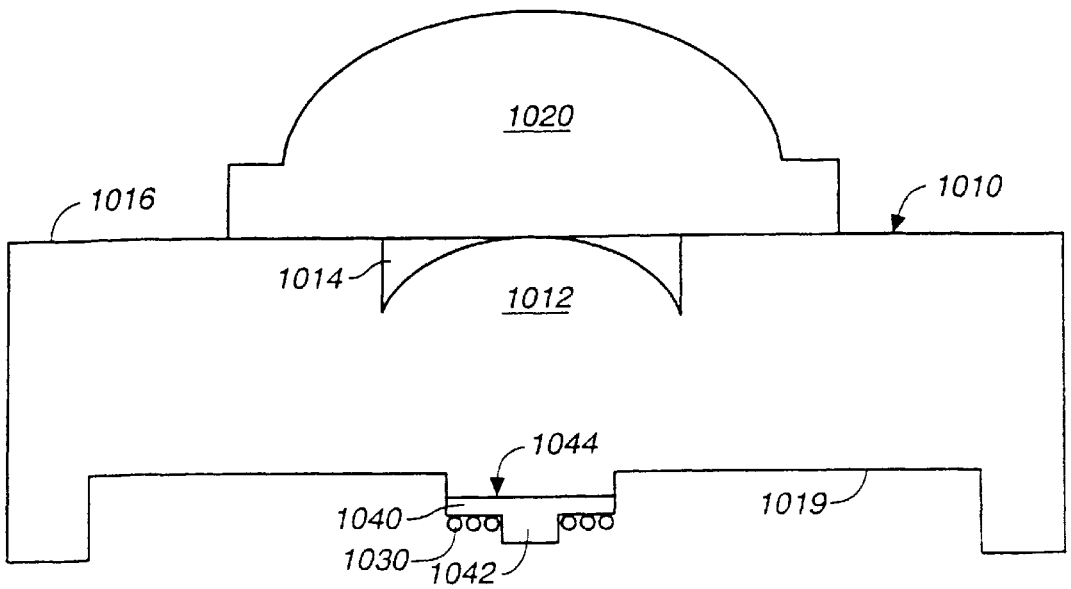
FIG._10B

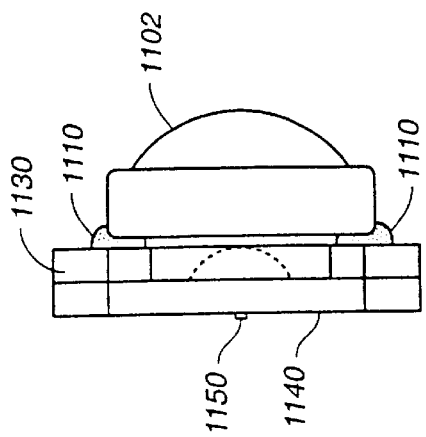
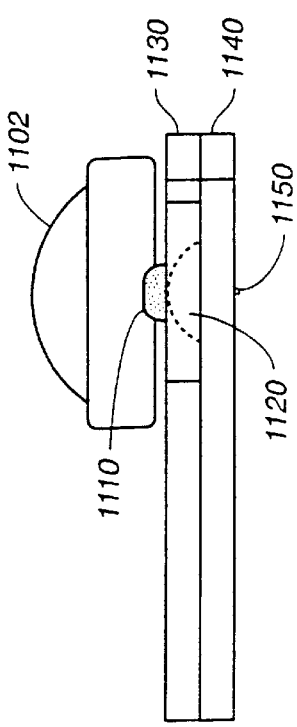
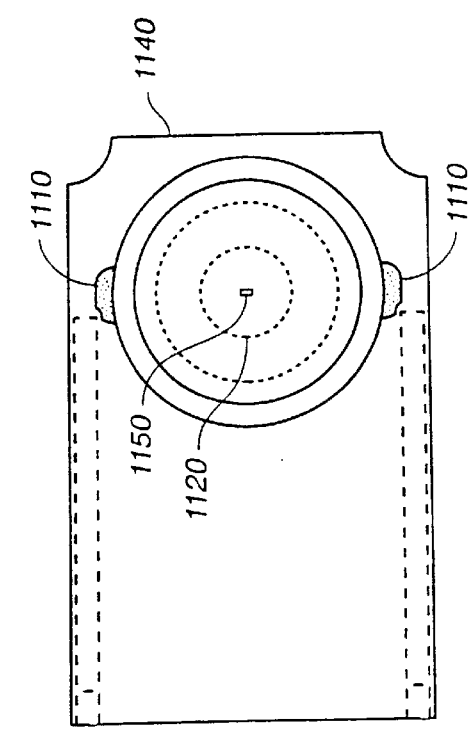

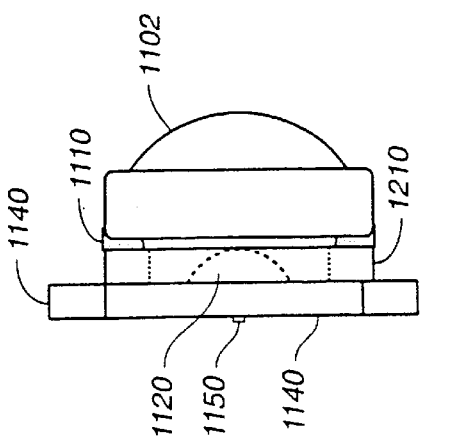
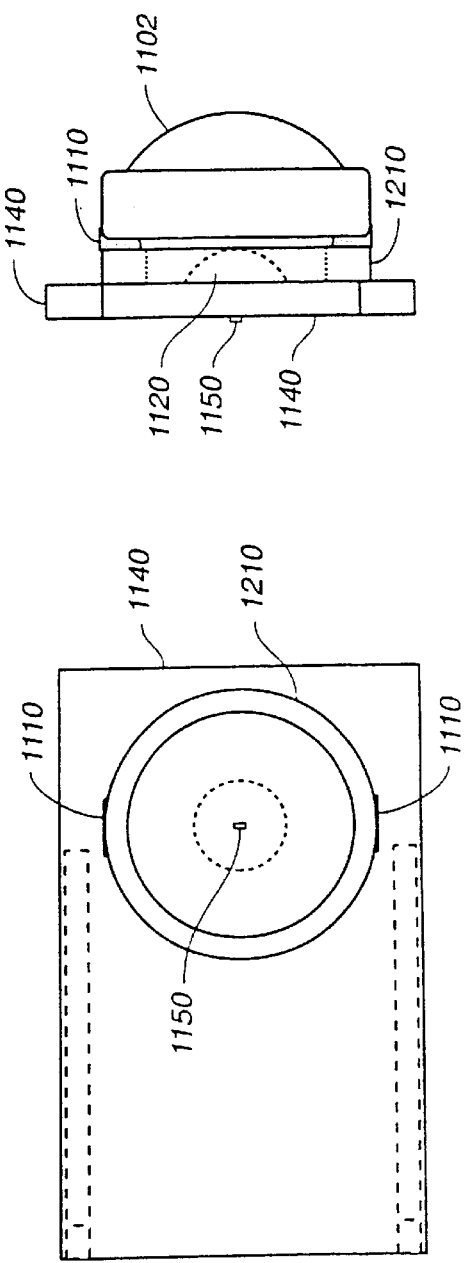
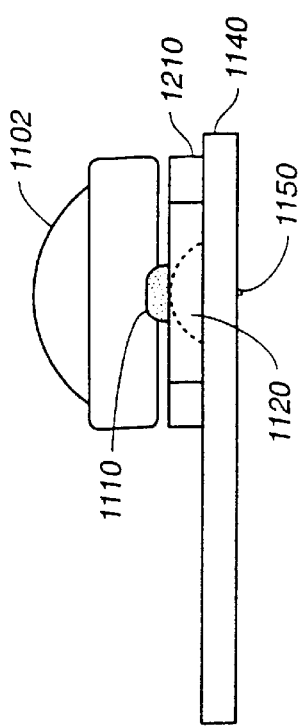

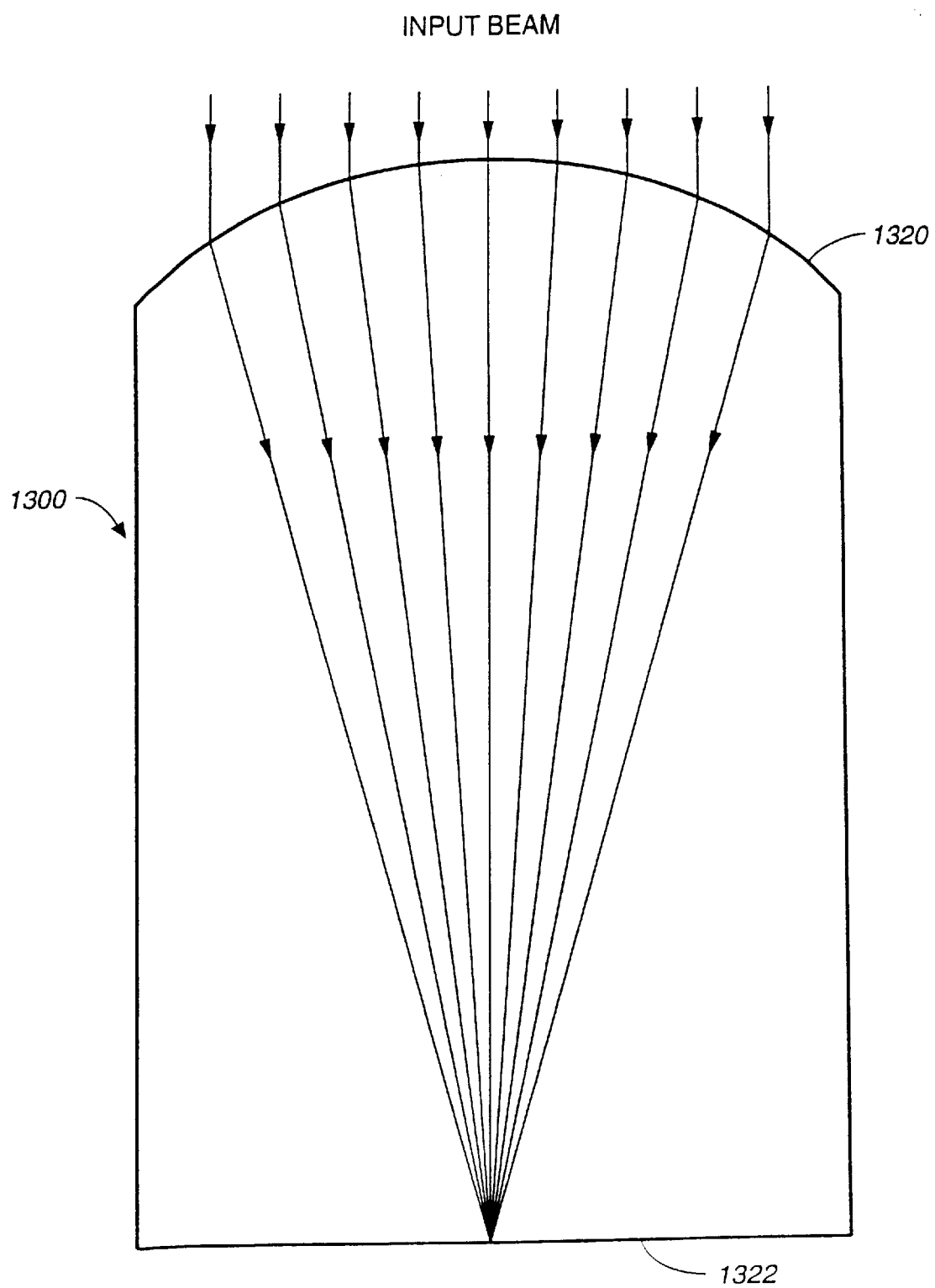
FIG._13A

INPUT BEAM
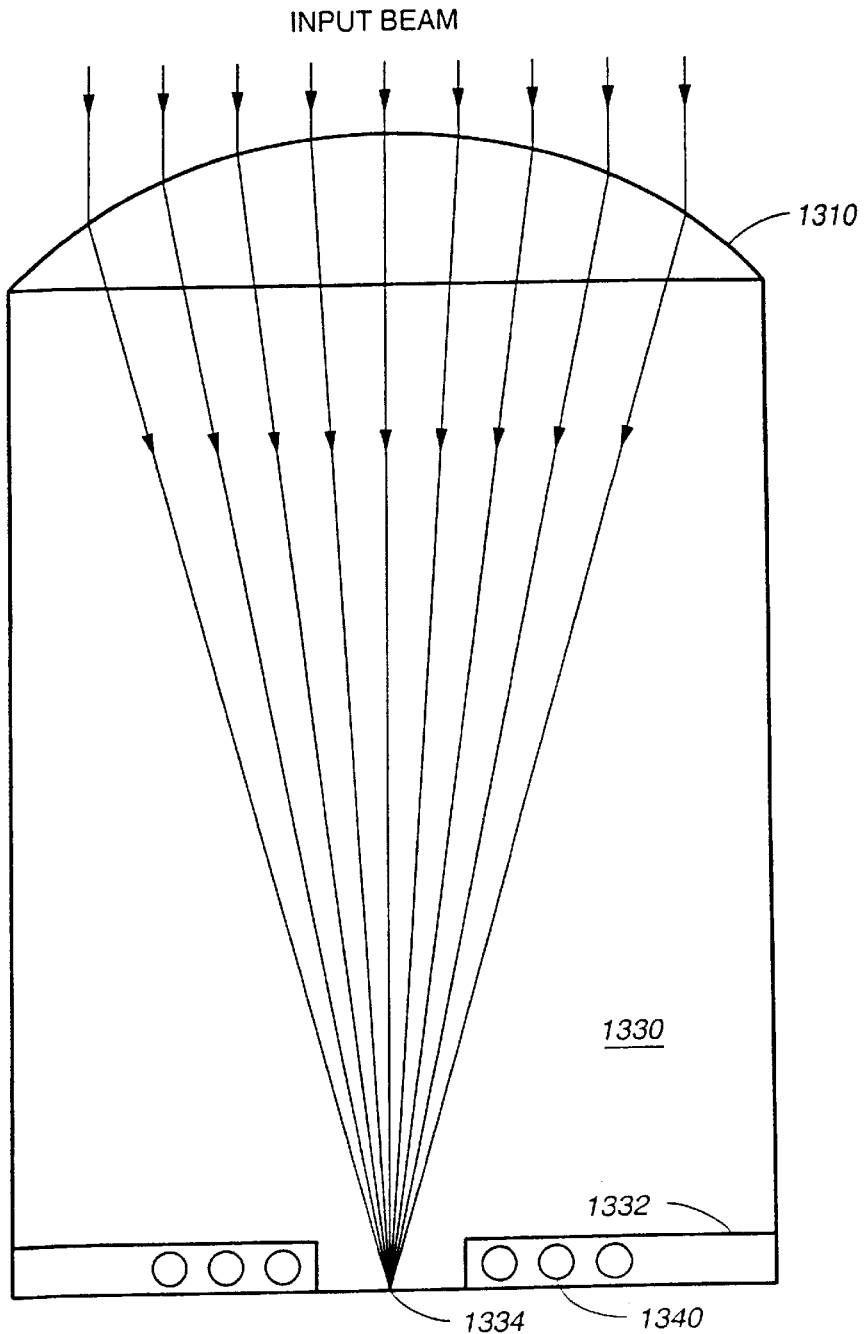
FIG._13B
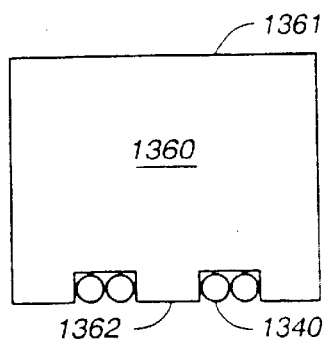
FIG._13C

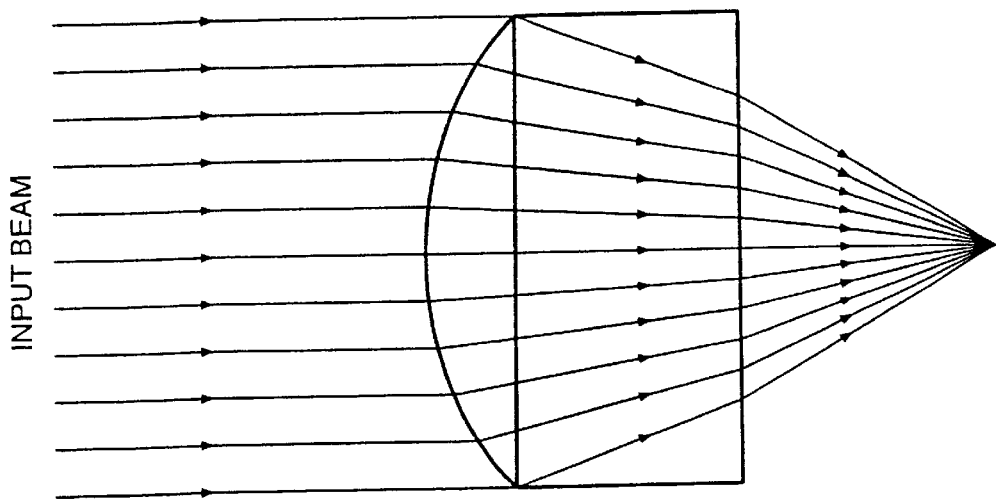
FIG._15
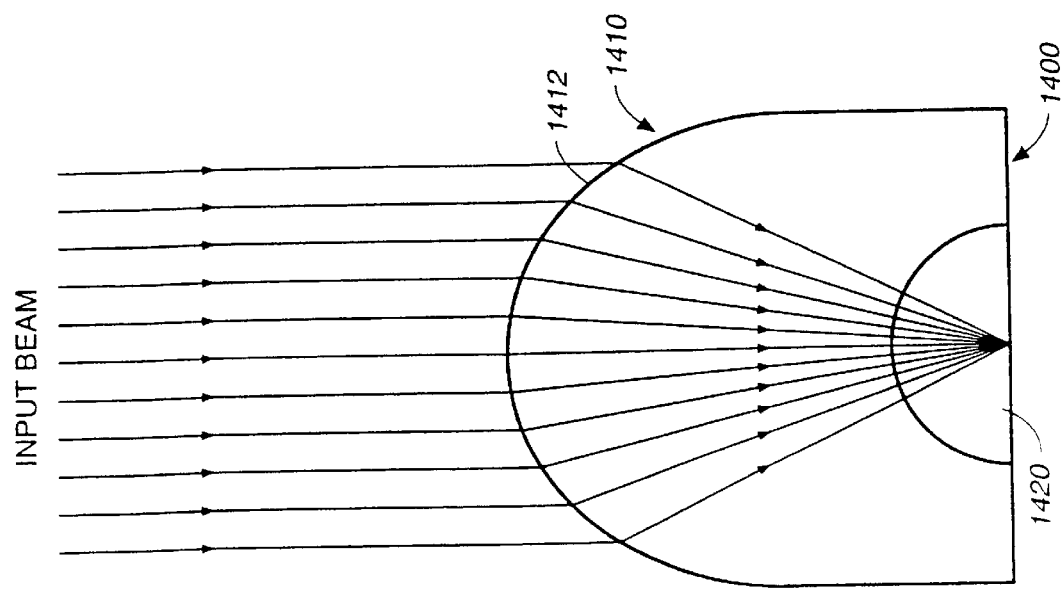
FIG._14

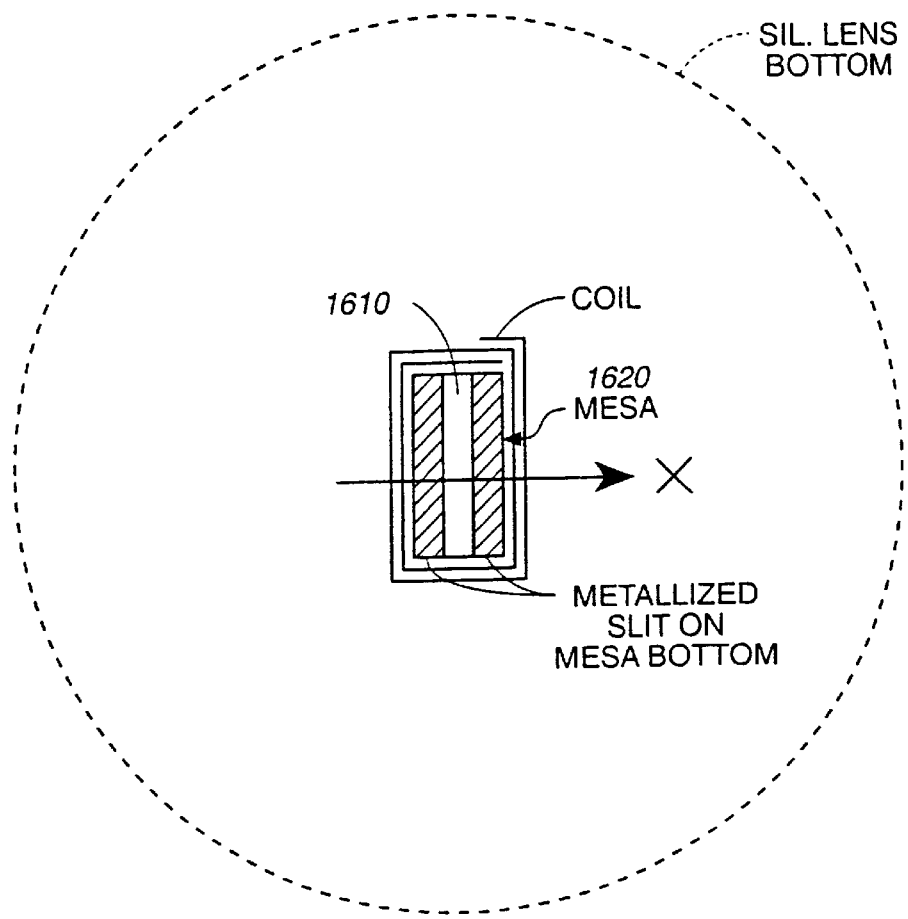
FIG._16A
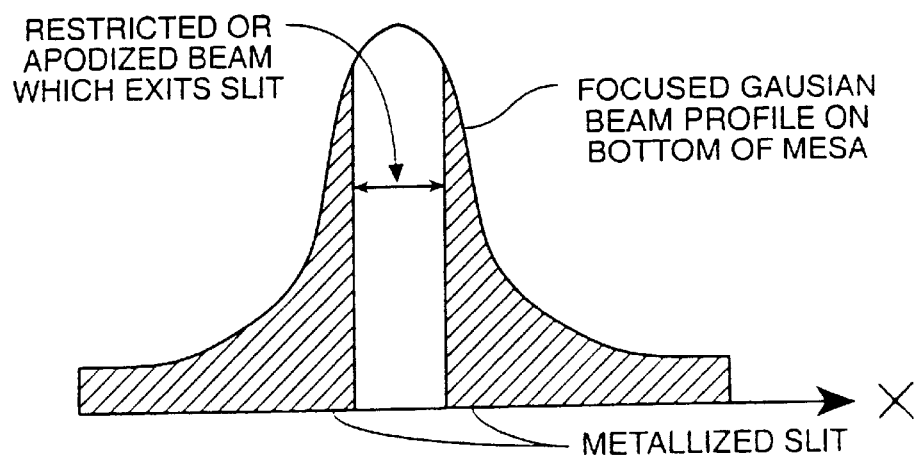
FIG._16B

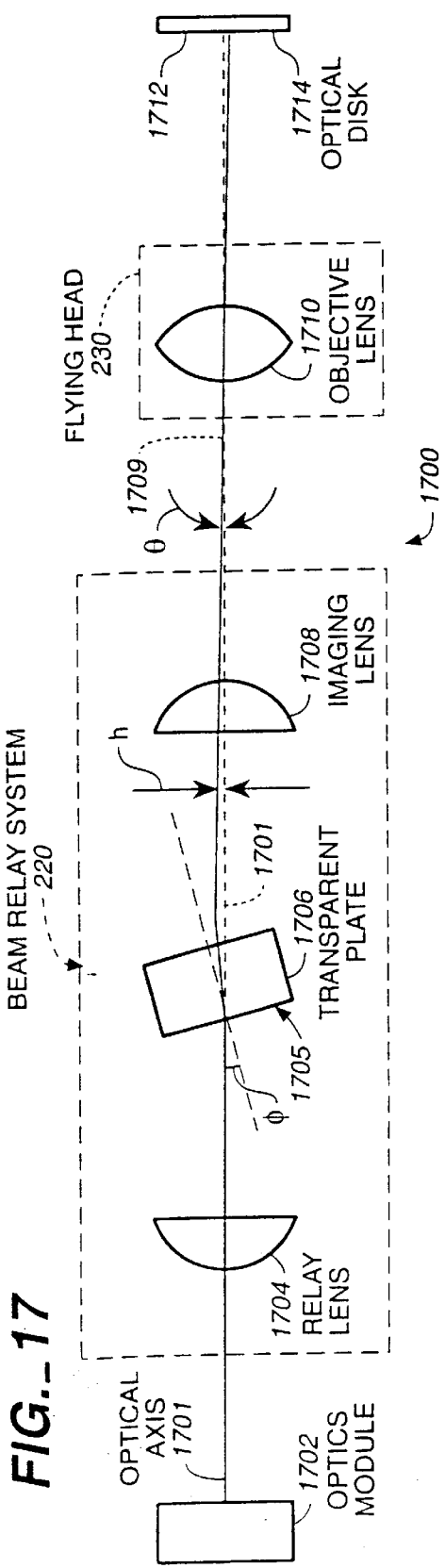
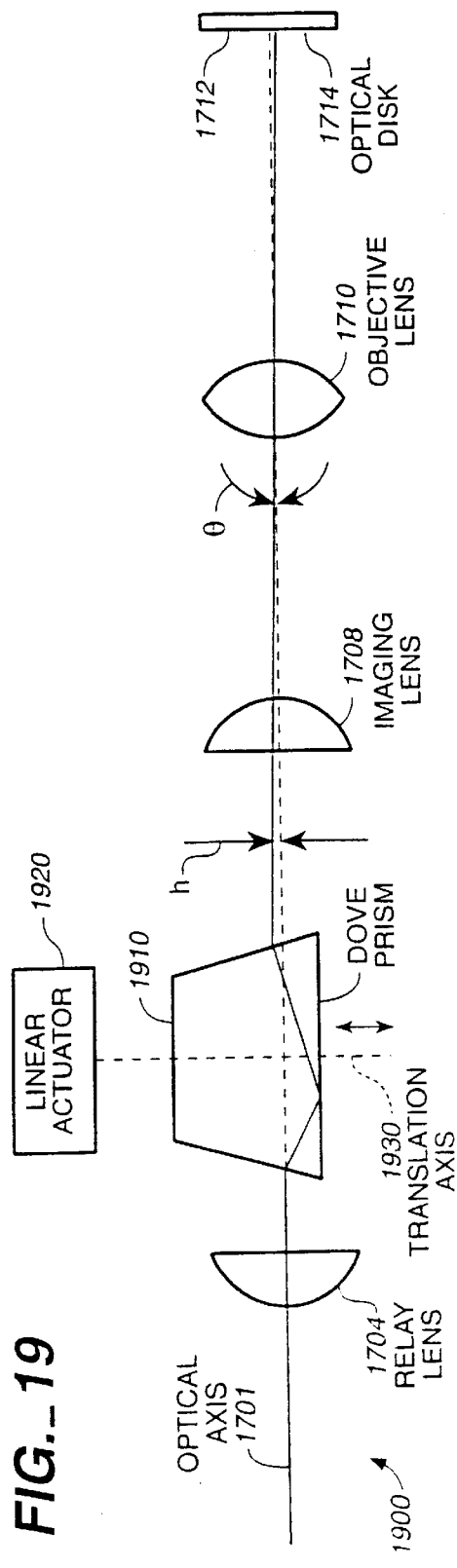

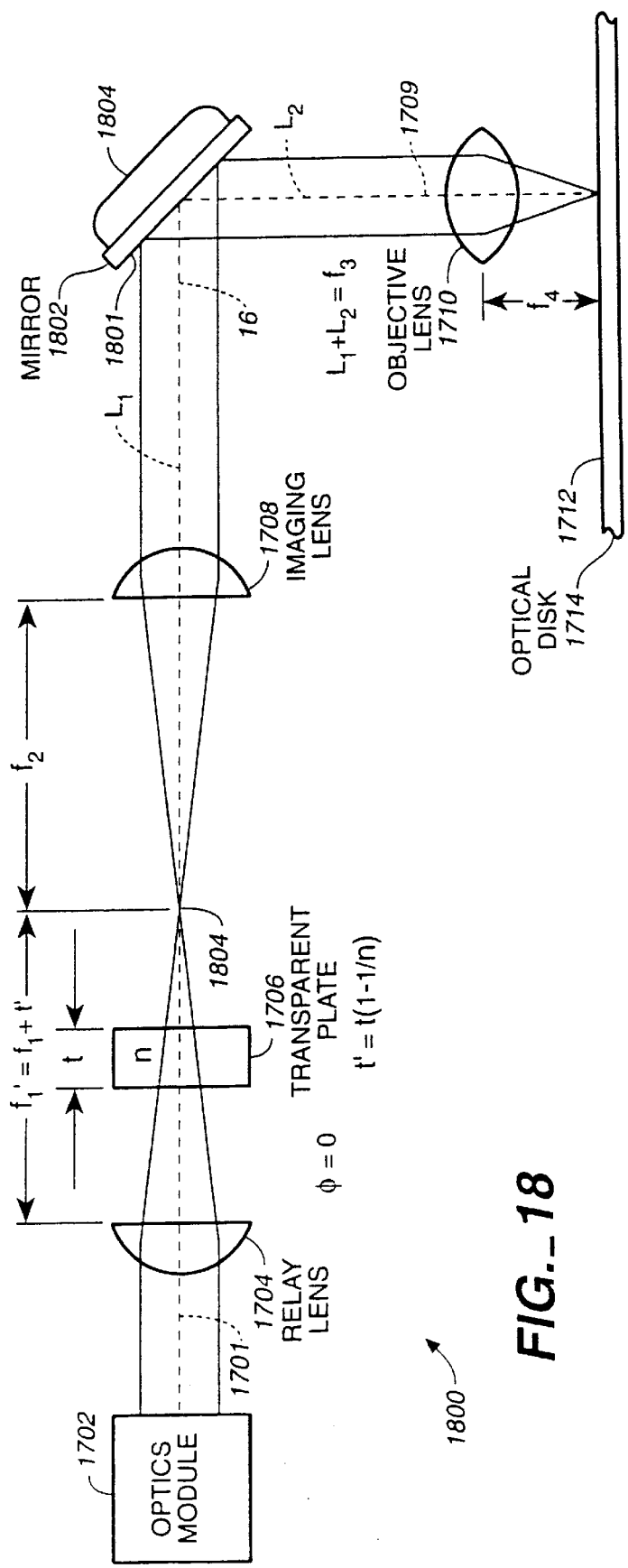
FIG._18

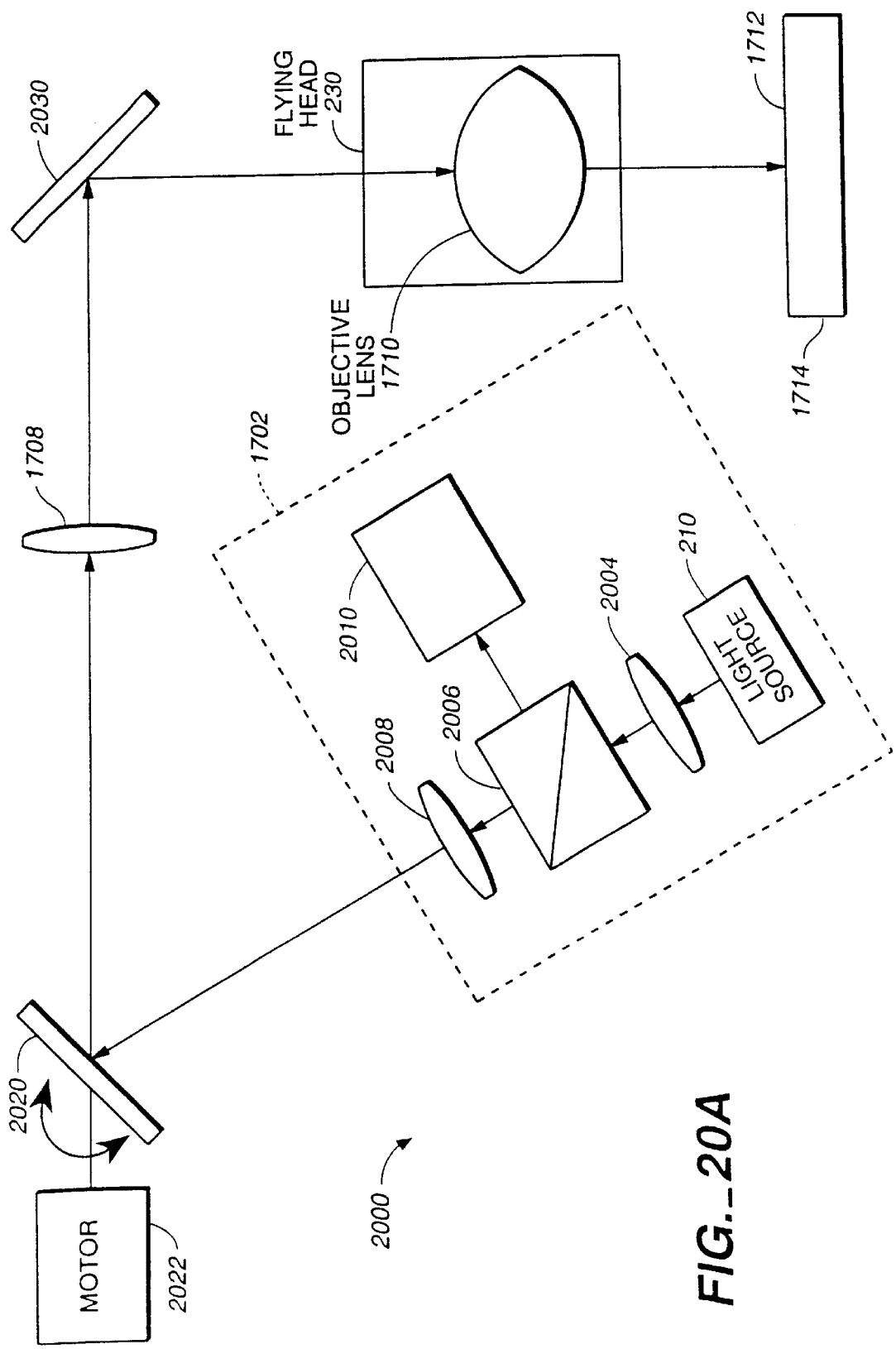
FIG._20A

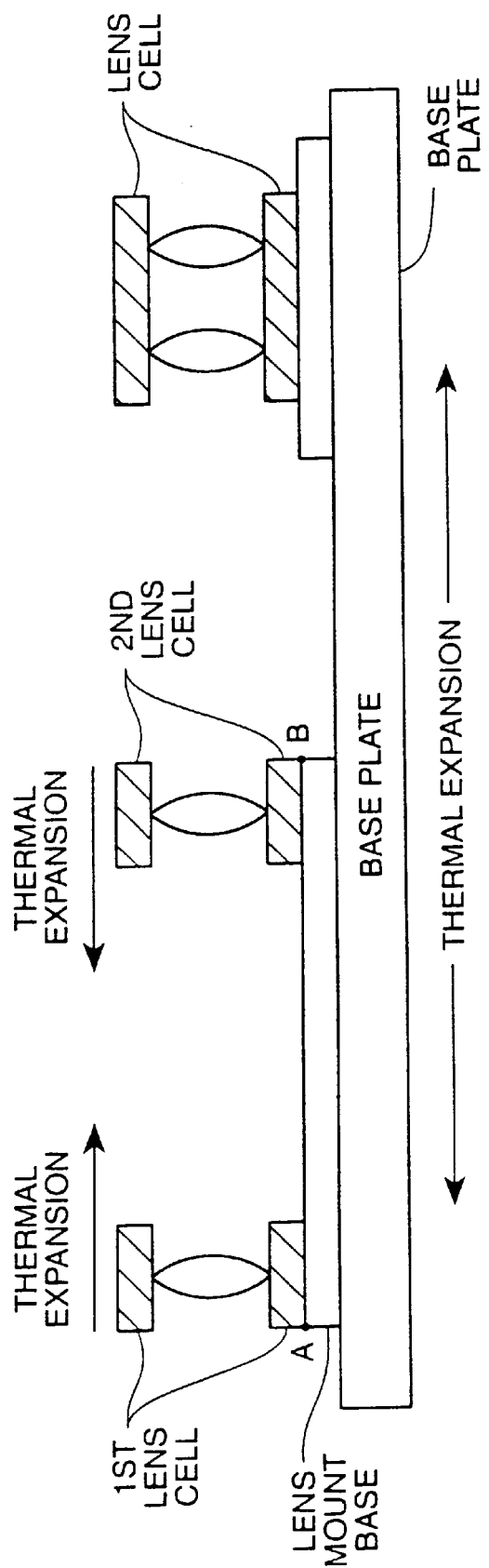
FIG._20B

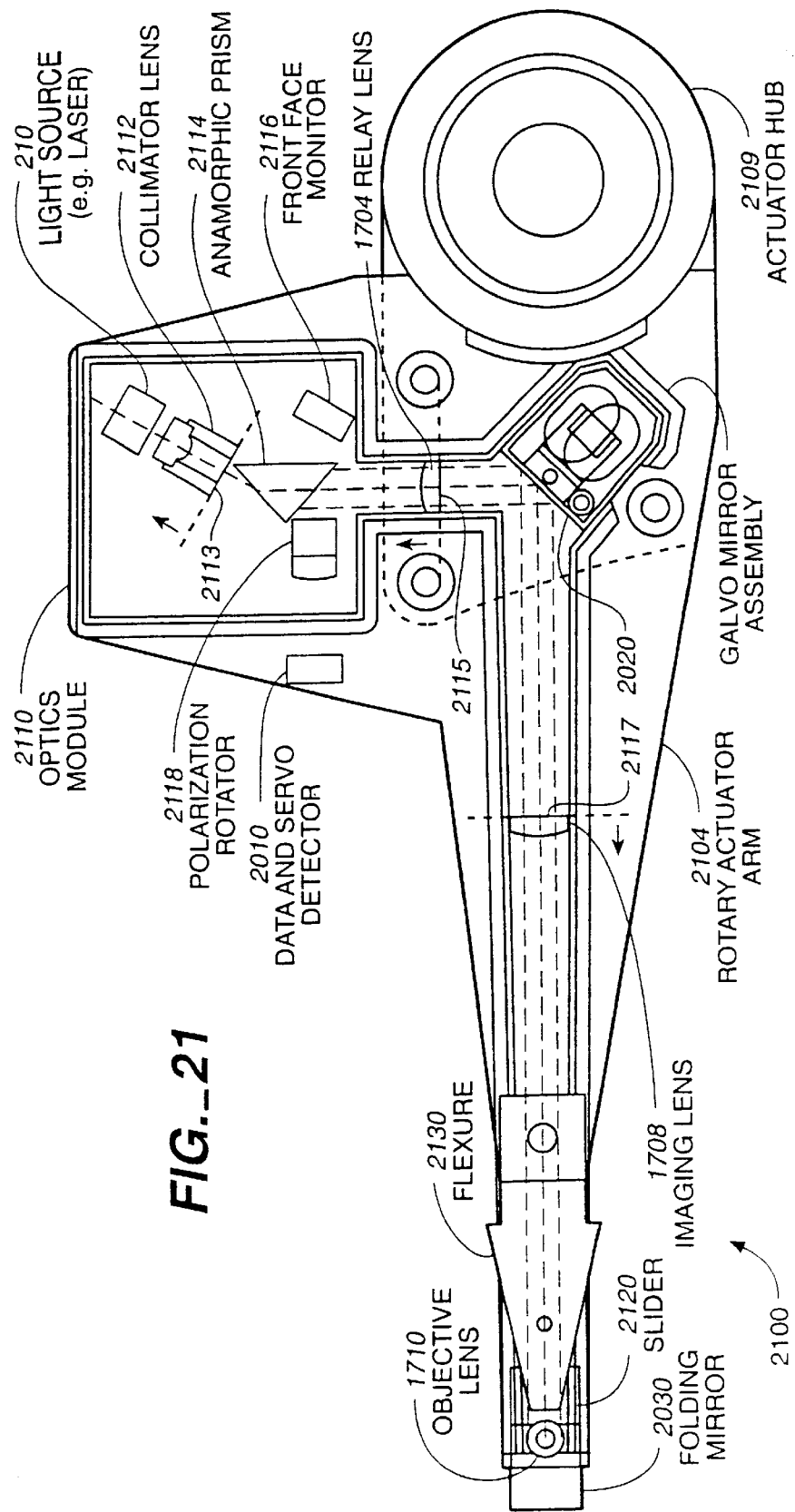
FIG._21

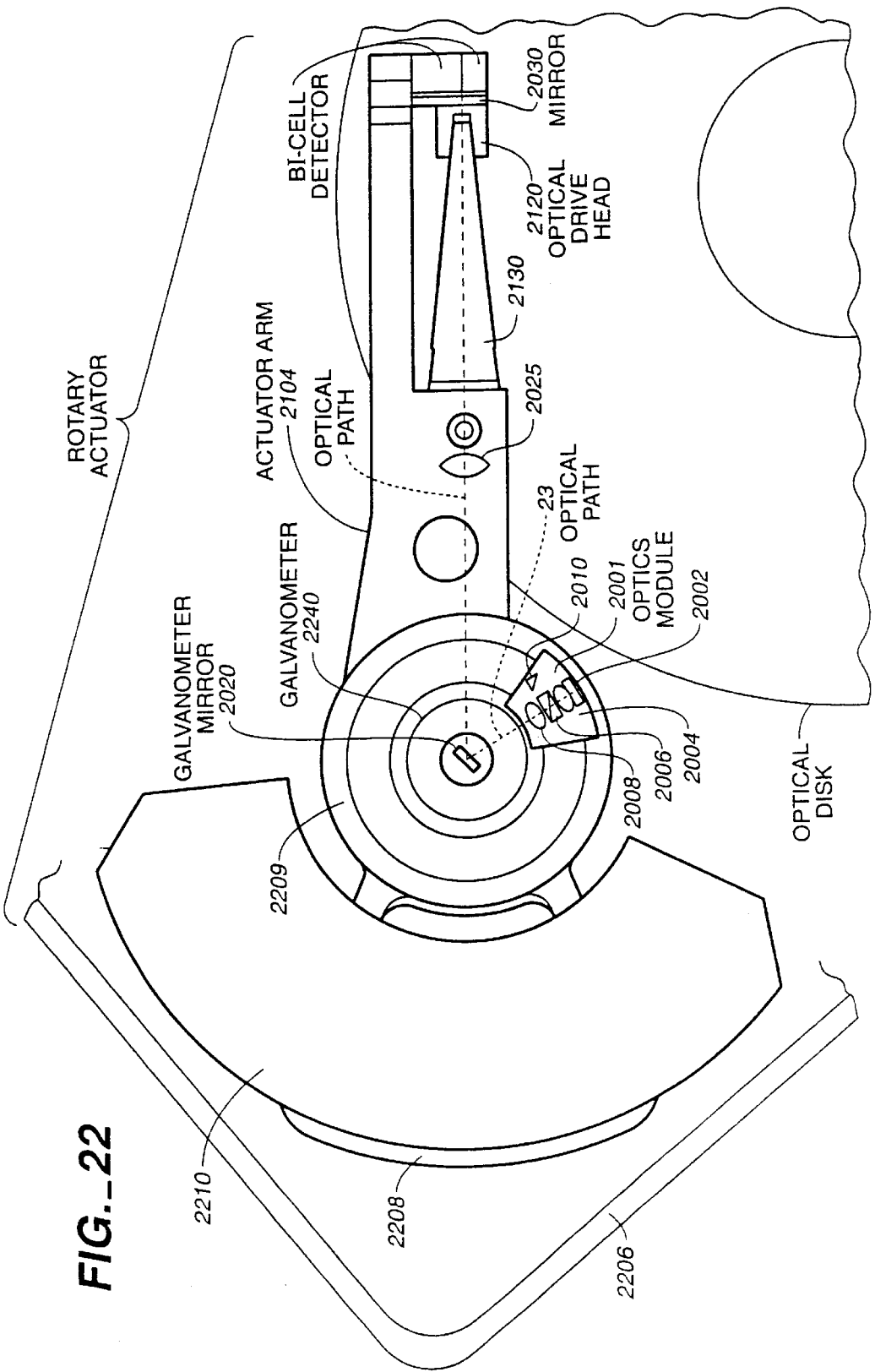
FIG._22

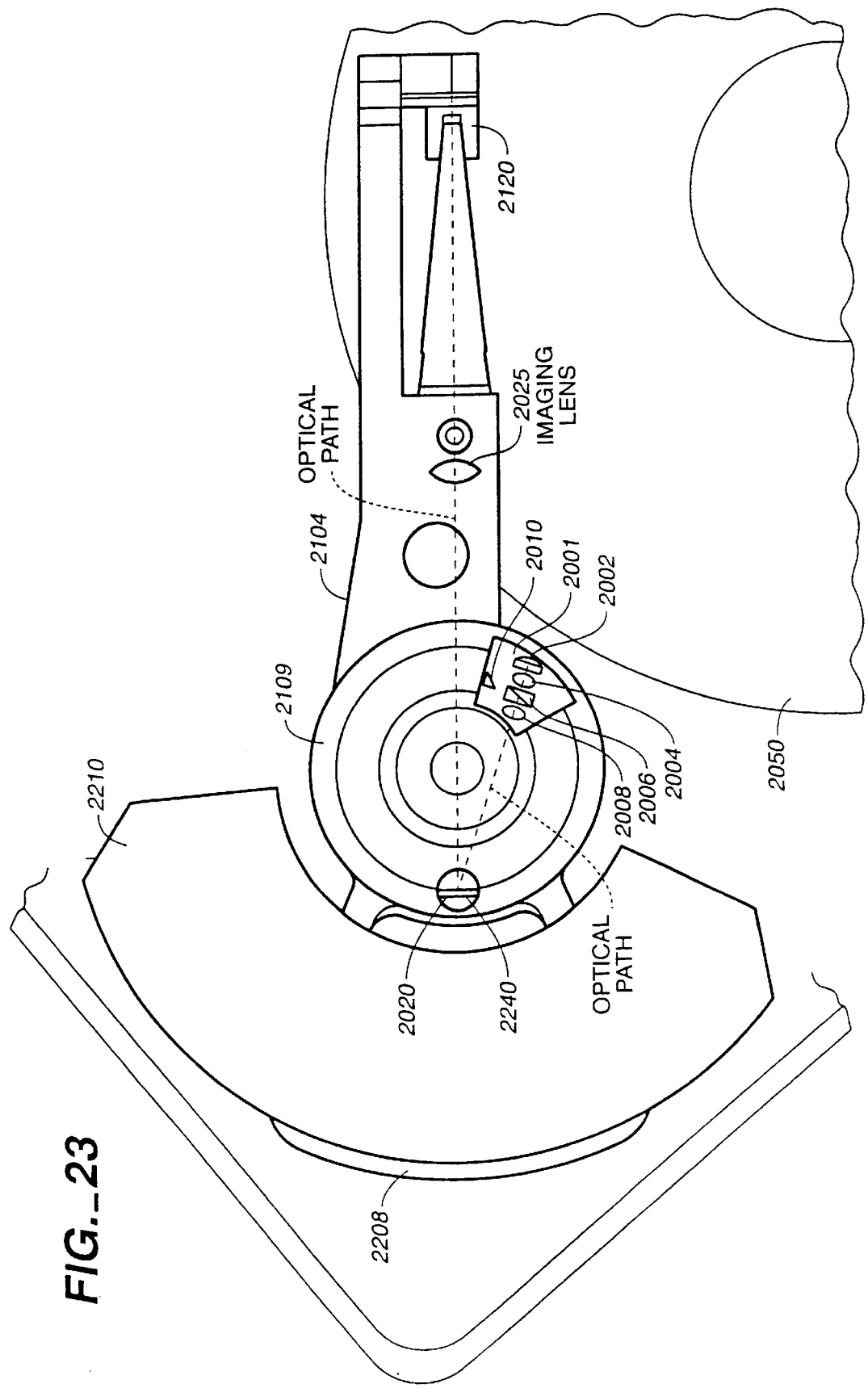
FIG._23

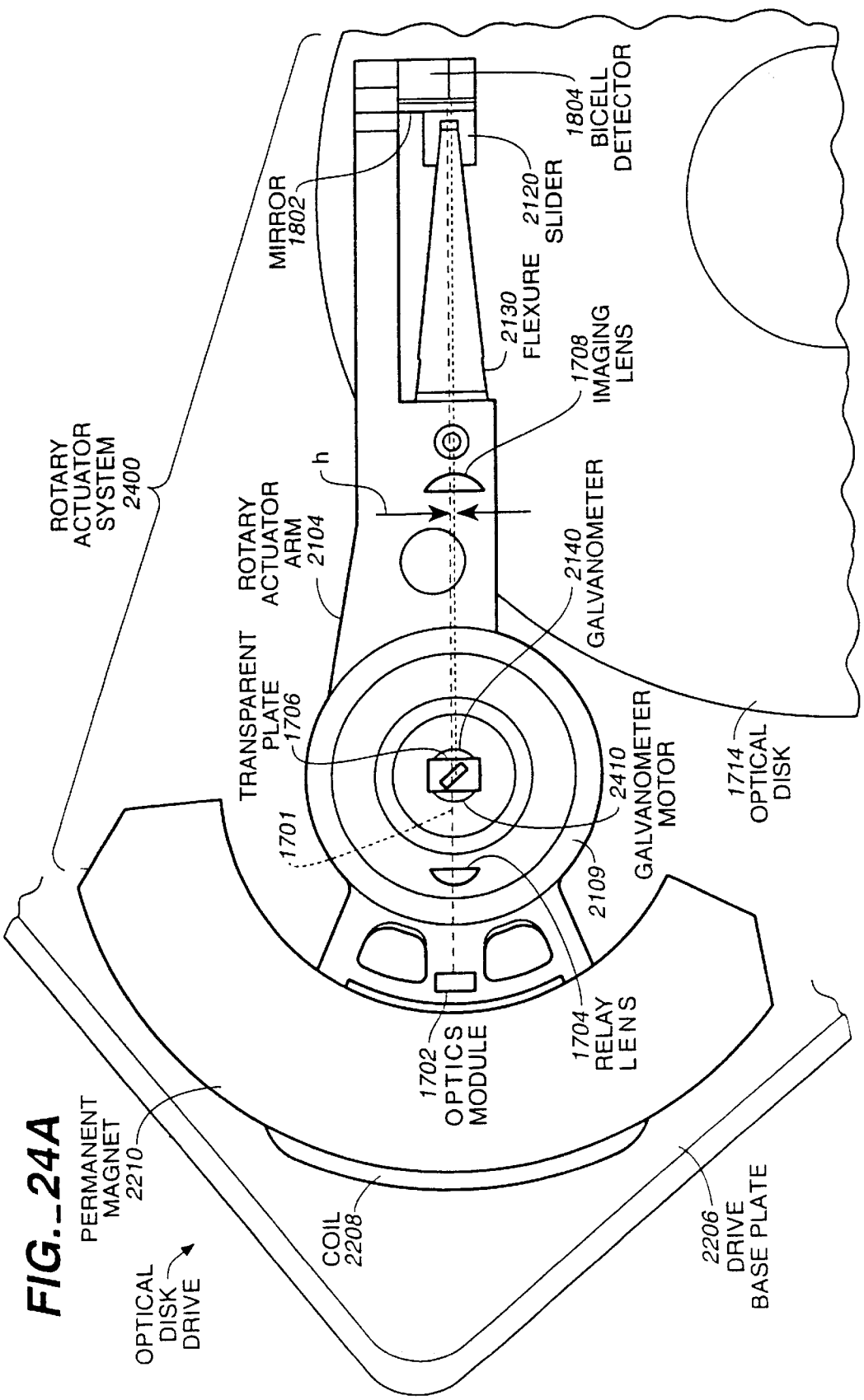
FIG._24A

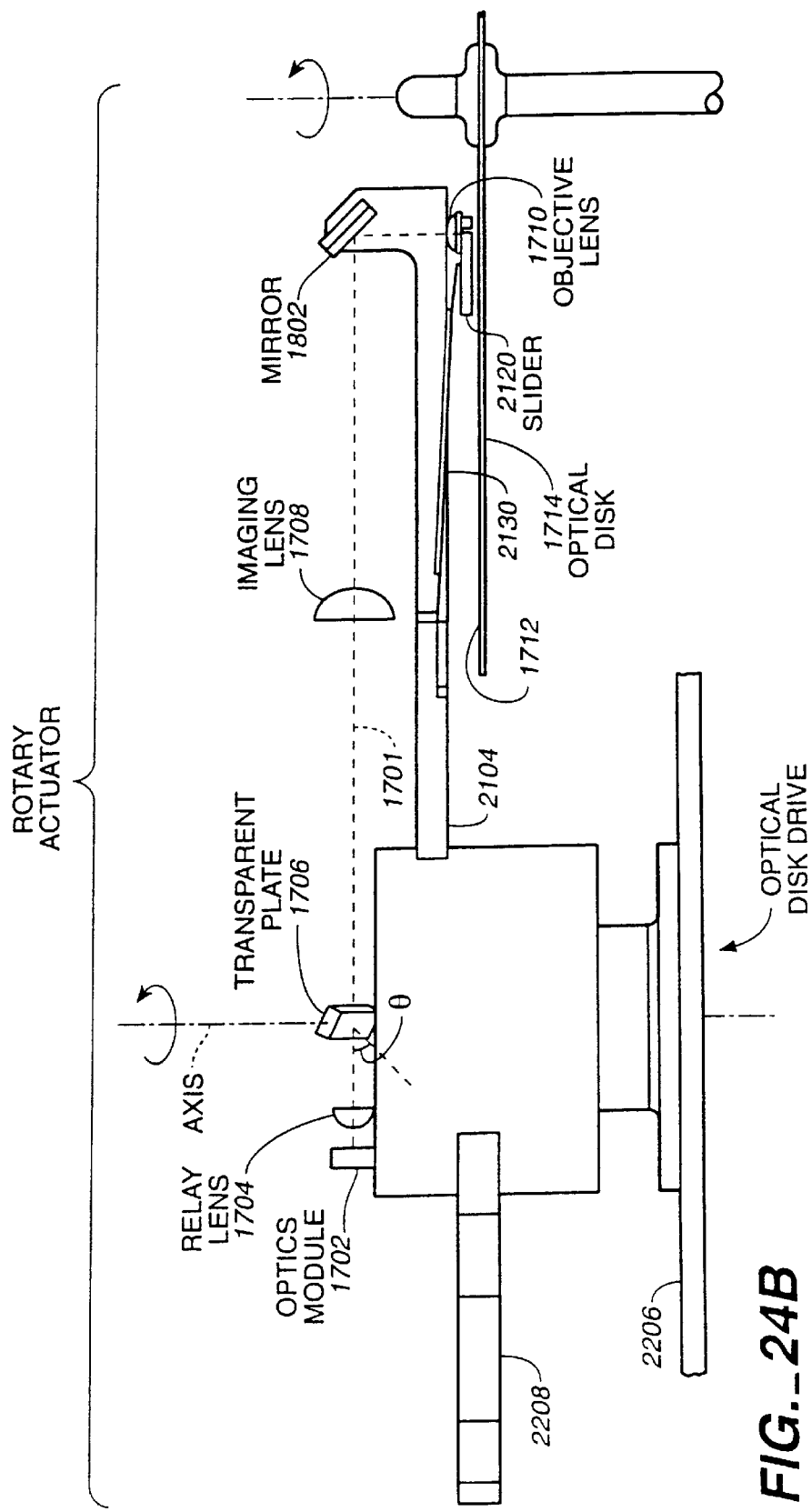
FIG._24B

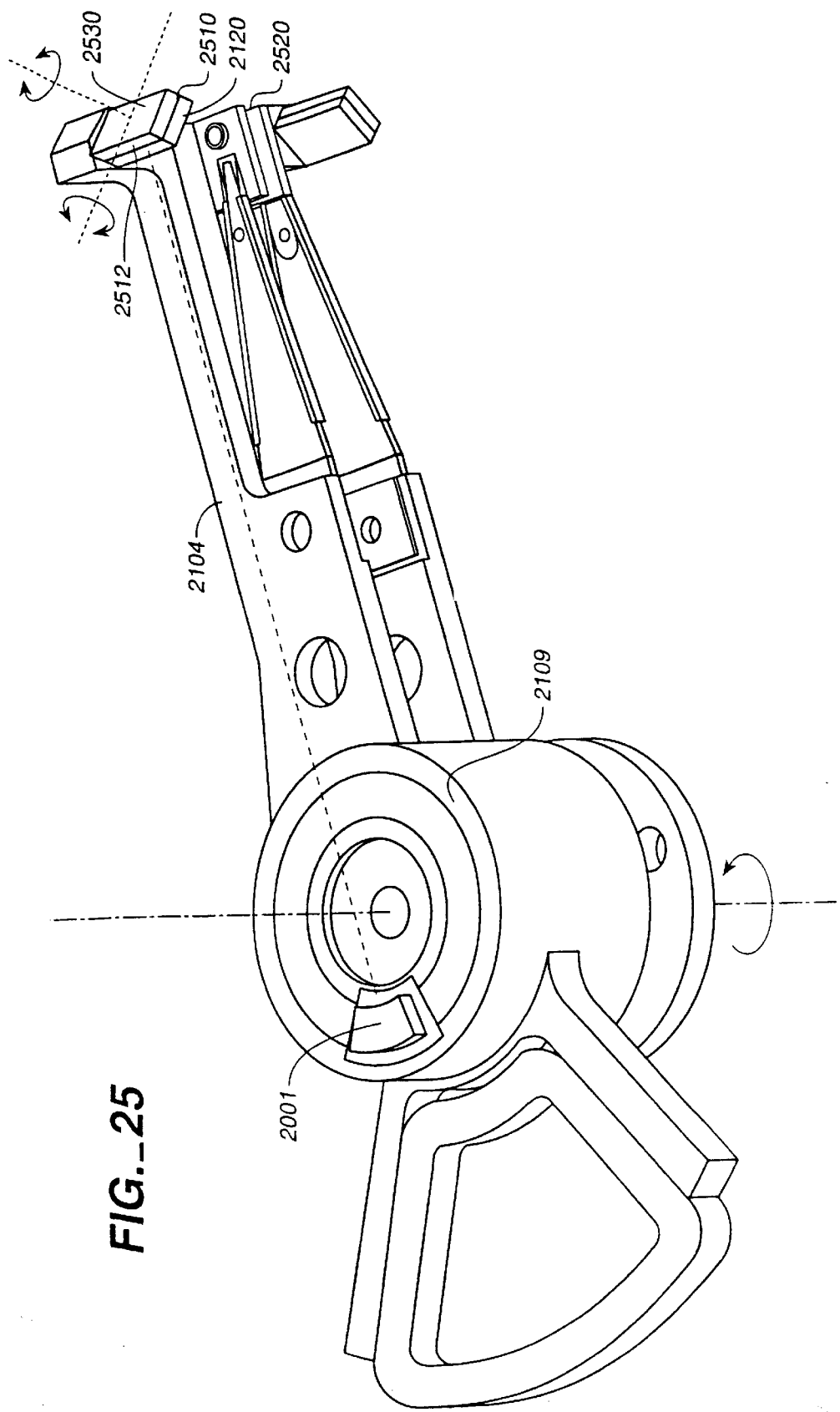
FIG._25

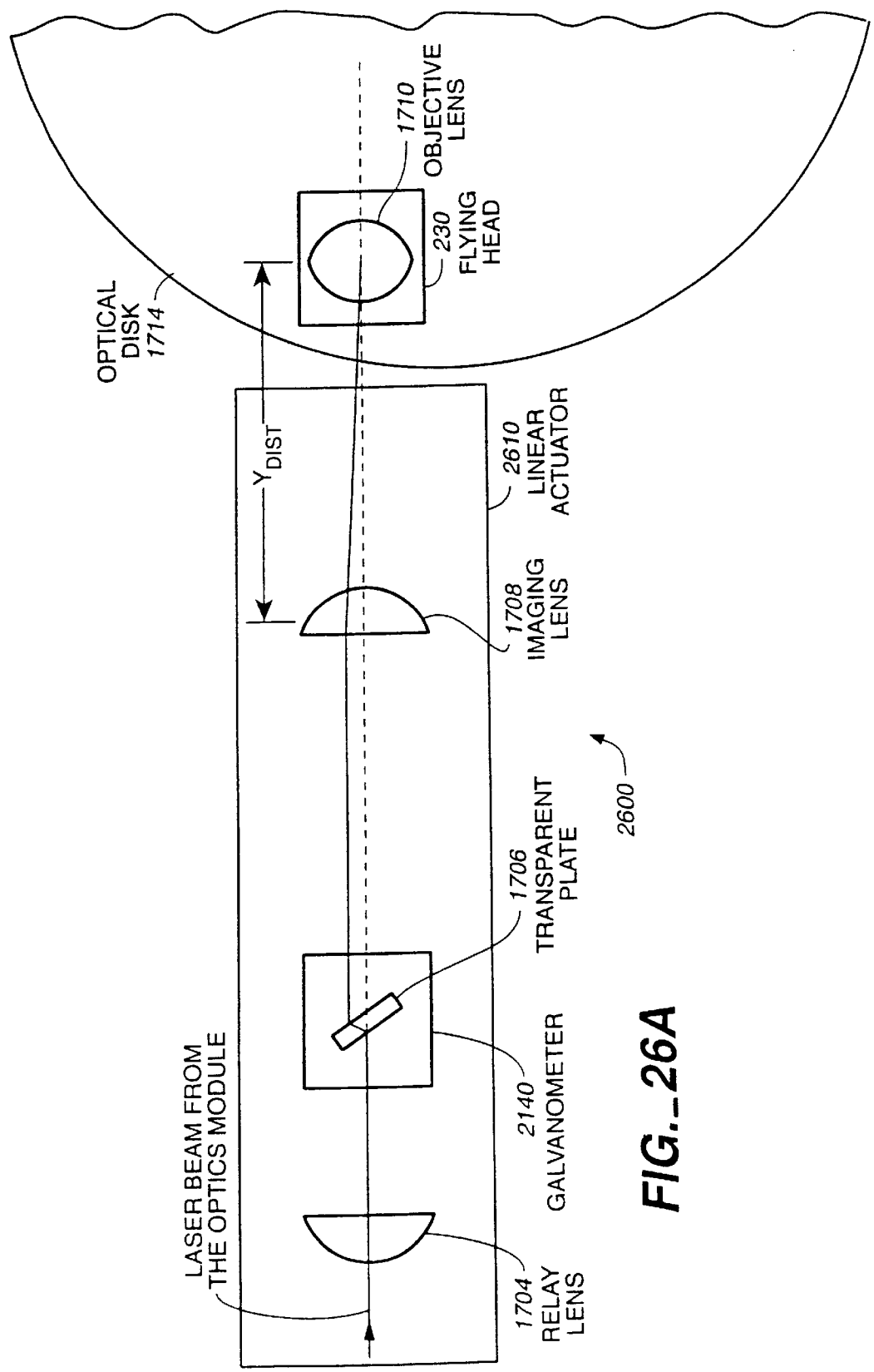

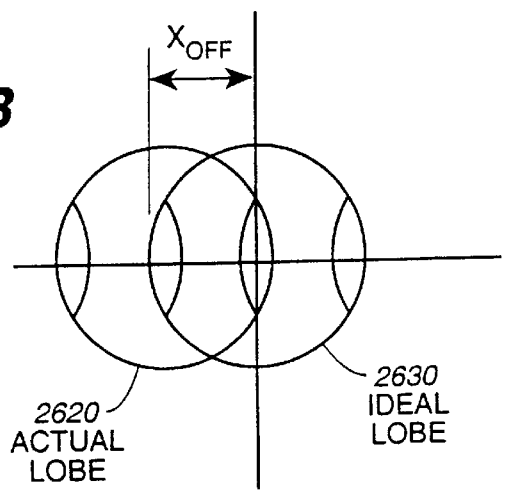
FIG._26B
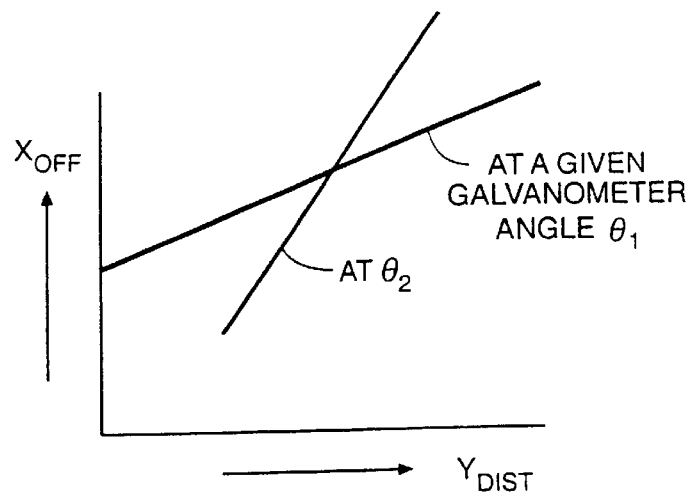
FIG._26C
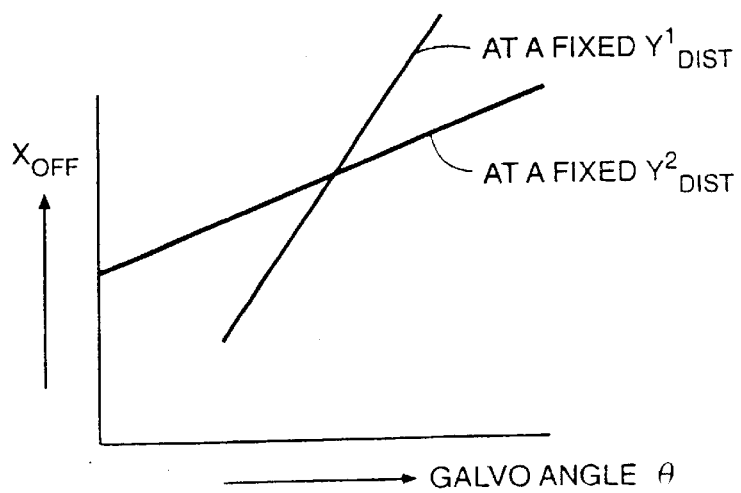
FIG._26D

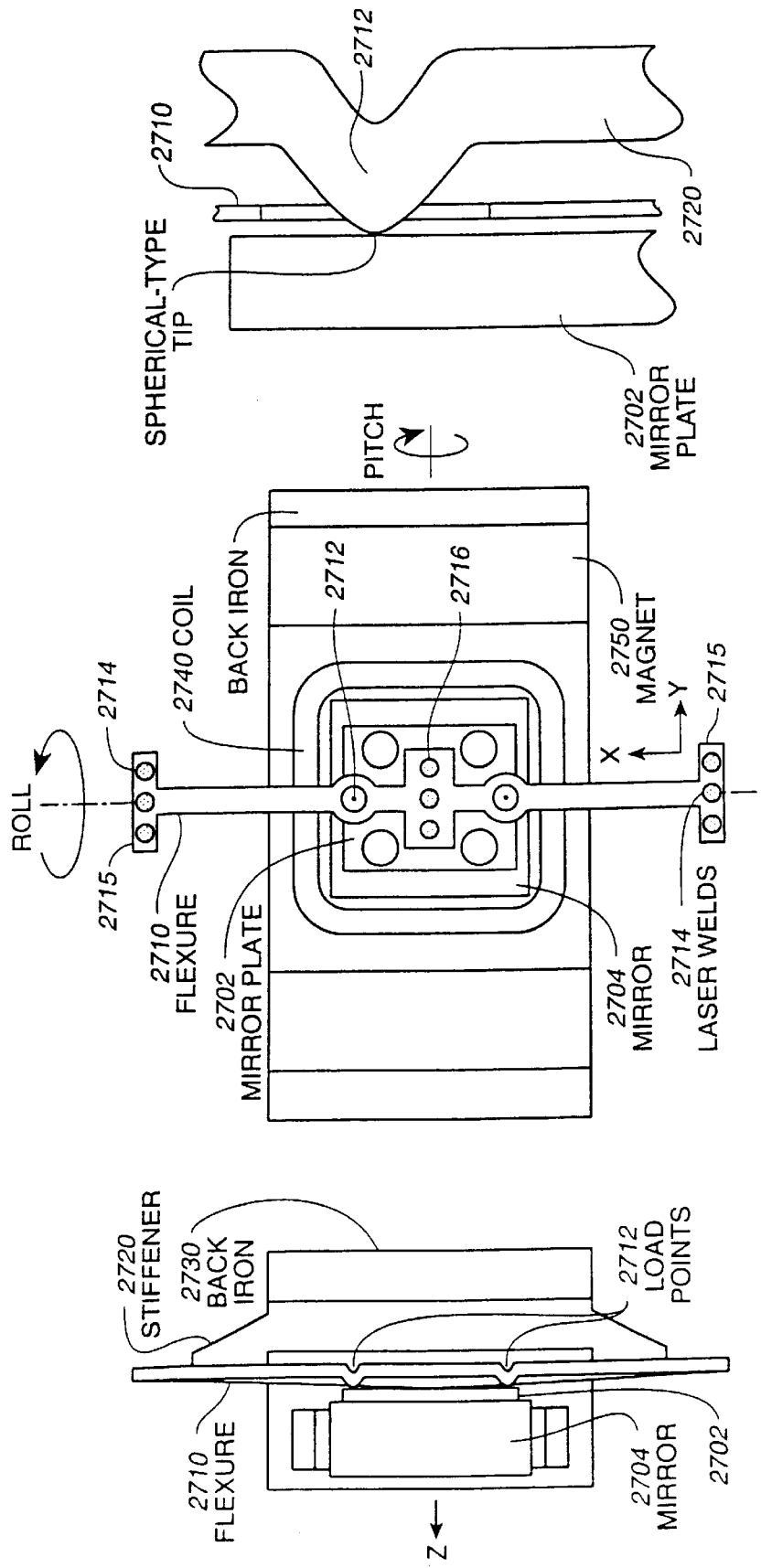

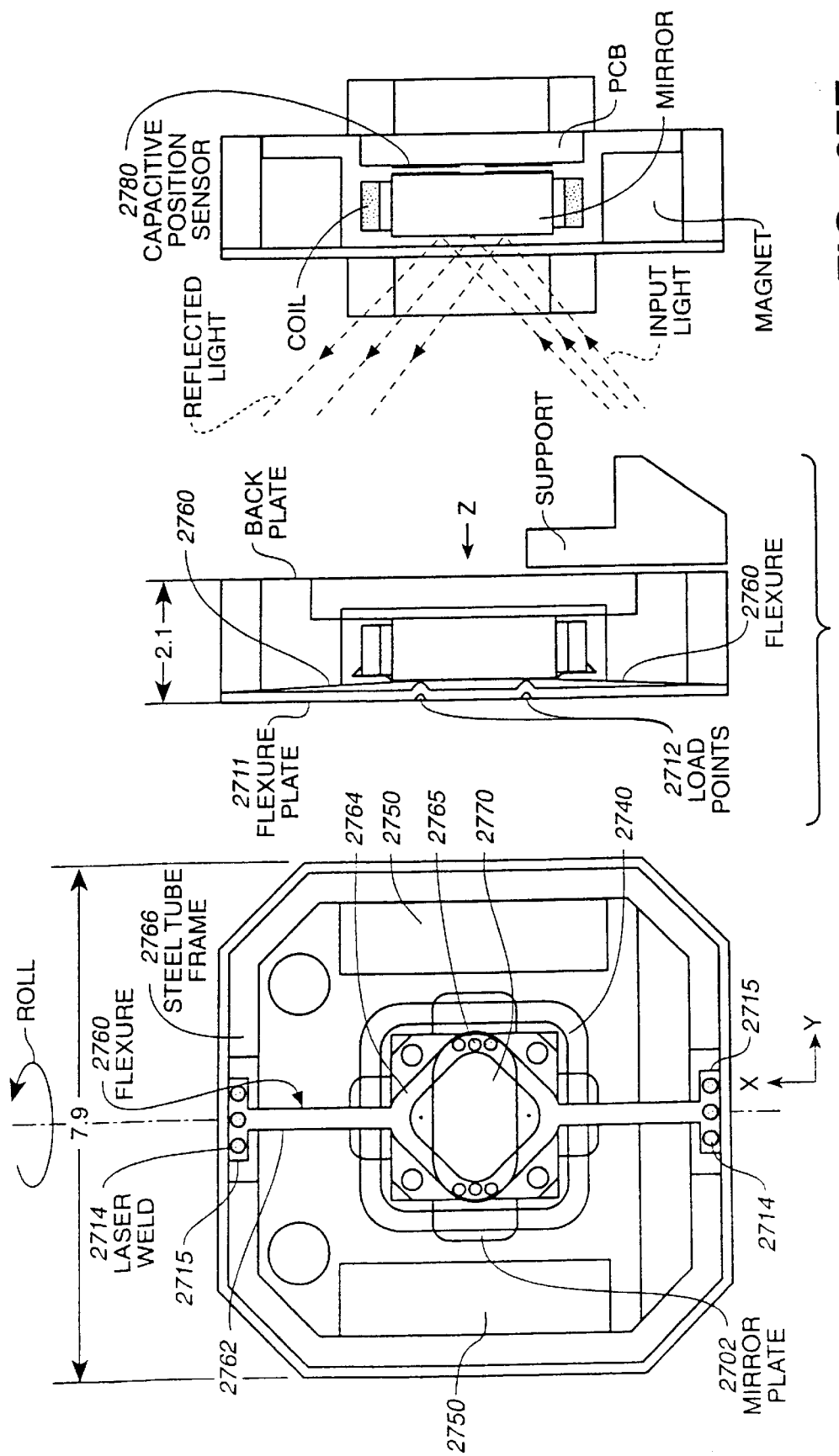

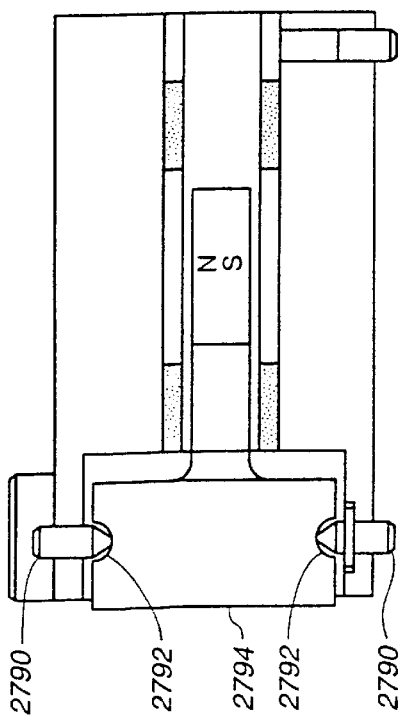
FIG._27H
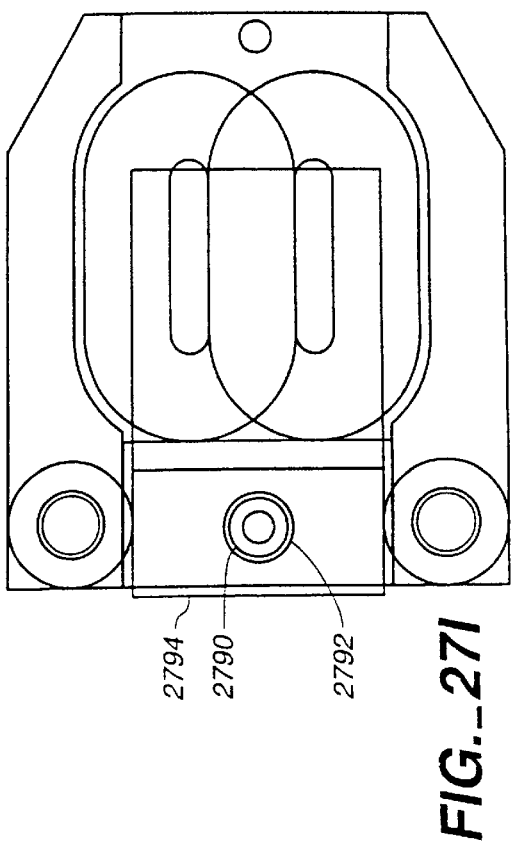
FIG._27I
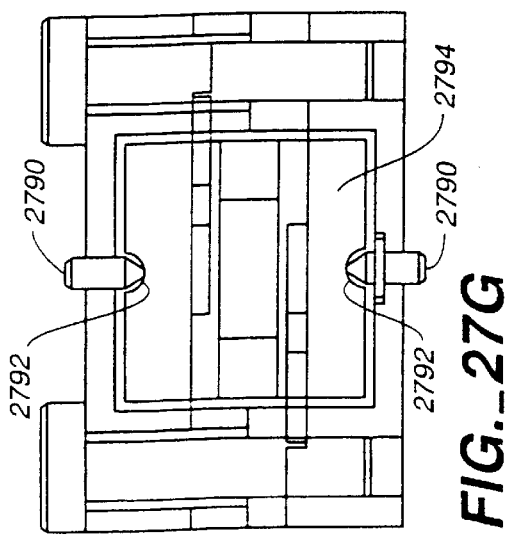
FIG._27G

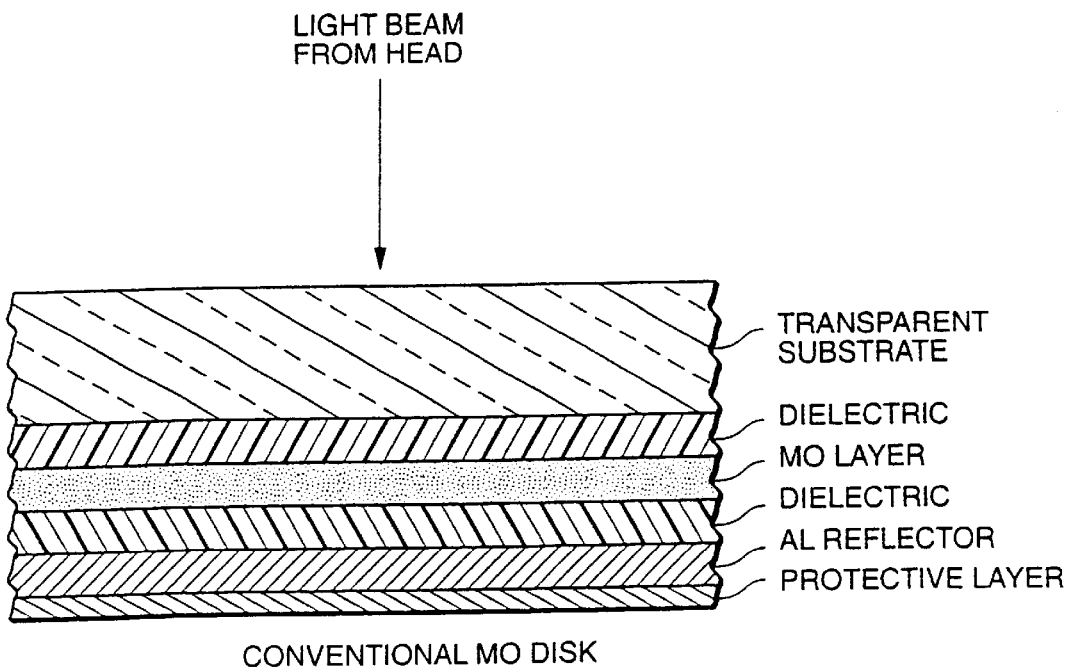
FIG._28A  CONVENTIONAL MO DISK
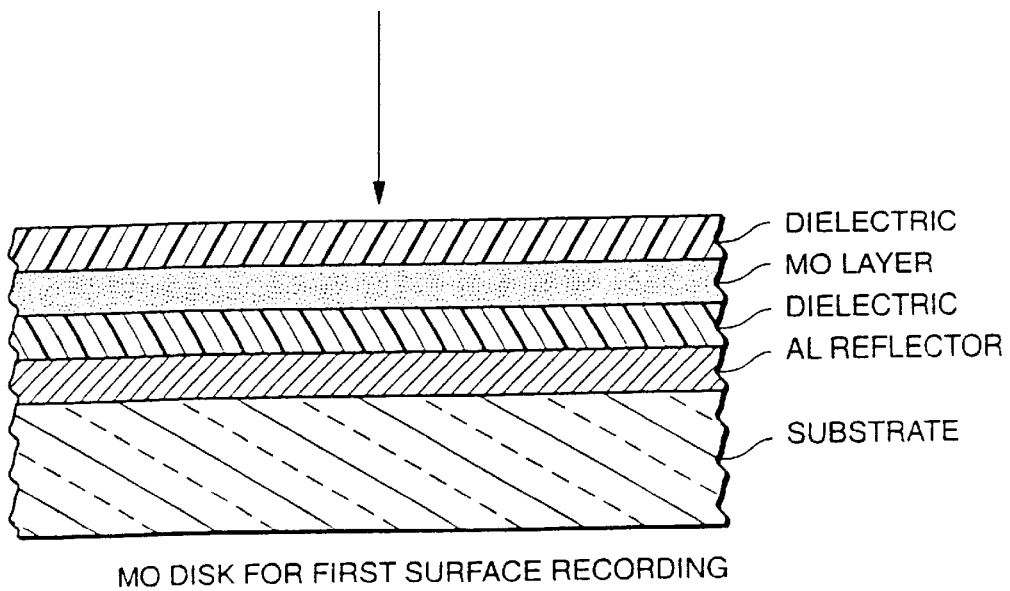
FIG._28B  MO DISK FOR FIRST SURFACE RECORDING

*FIG._28C-1*
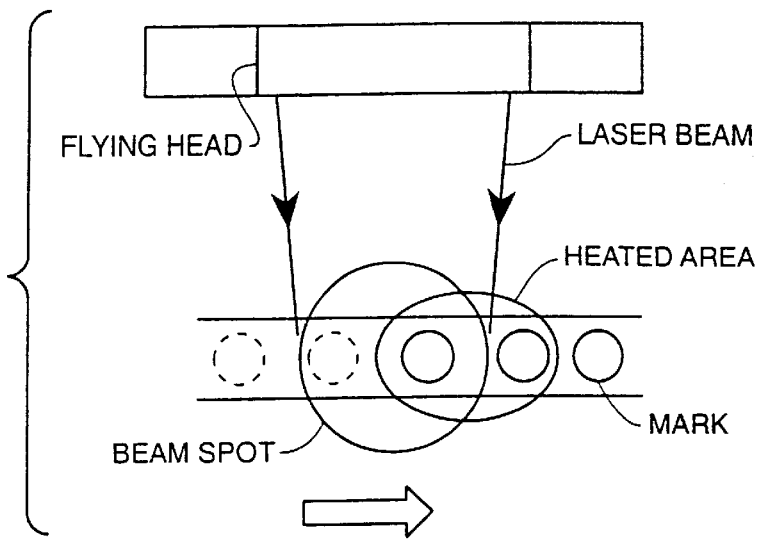
*FIG._28C-2*
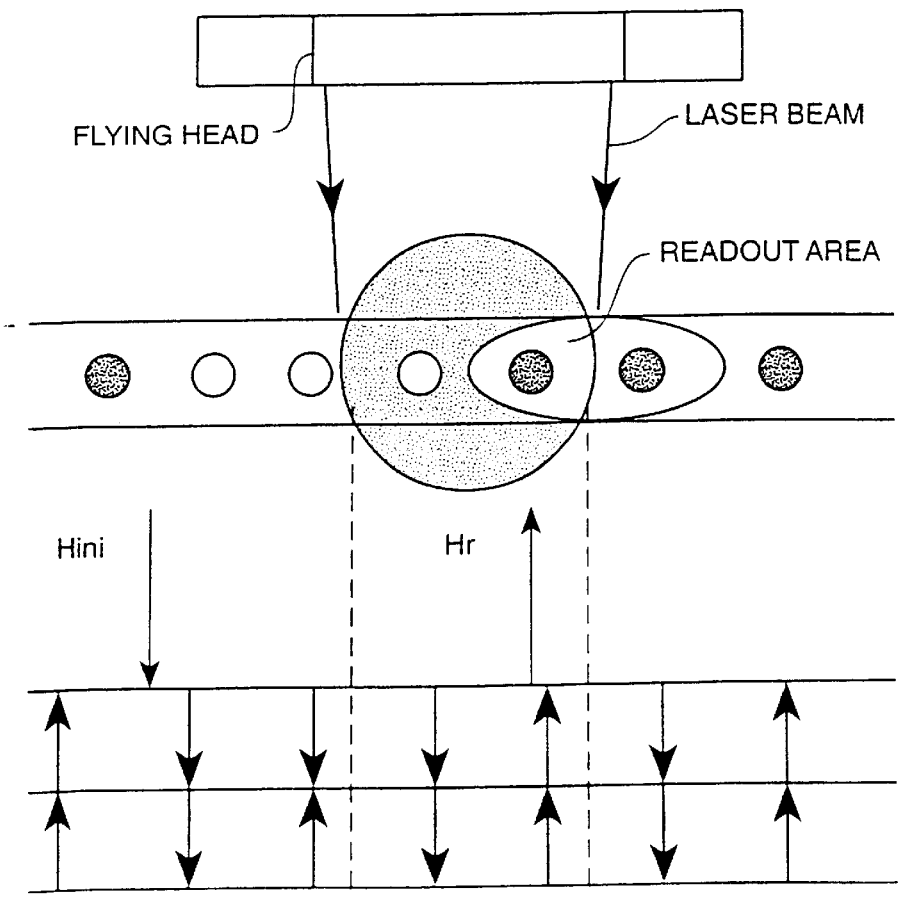

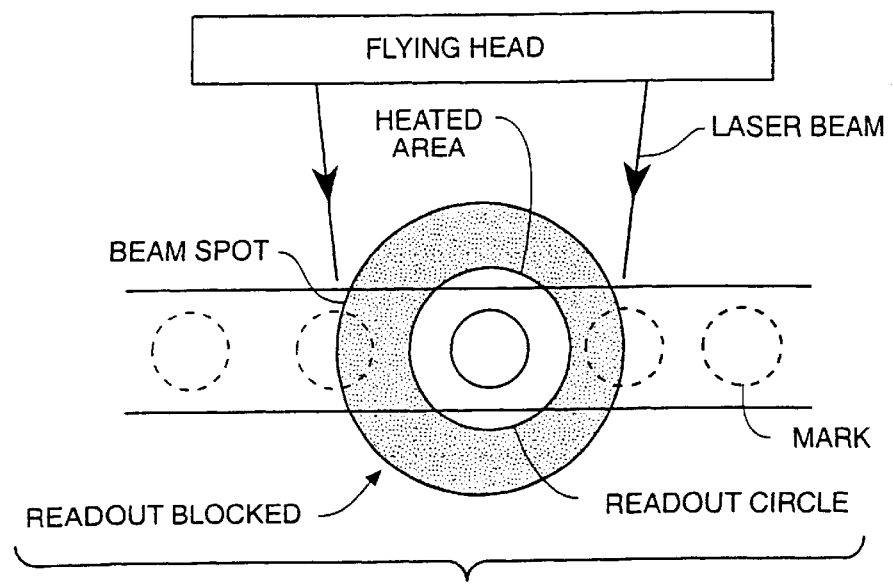
FIG._28D-1
FIG._28D-2
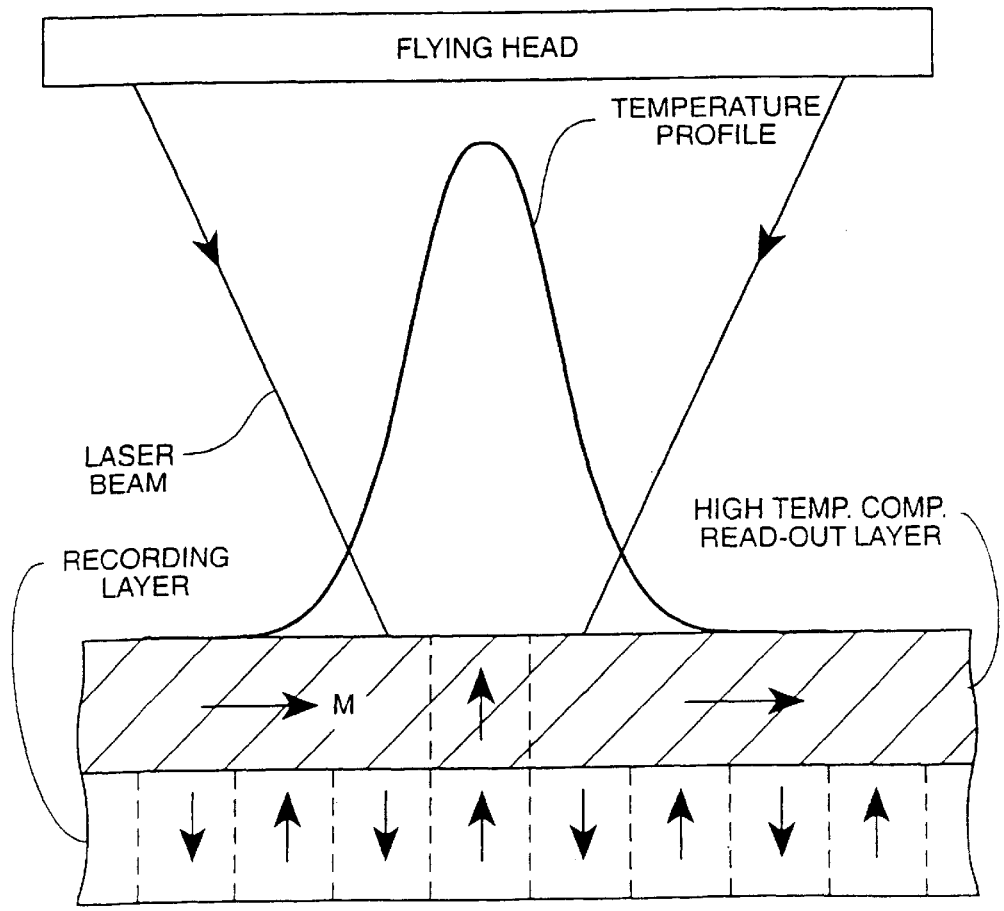

FIG._28E-1
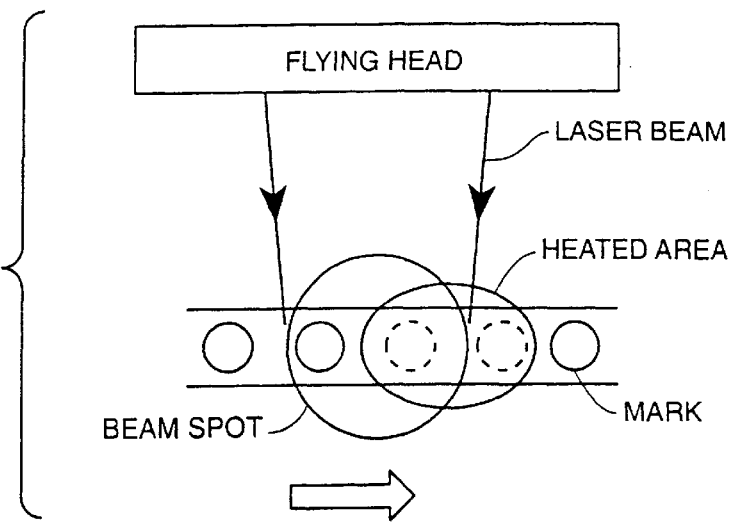
FIG._28E-2
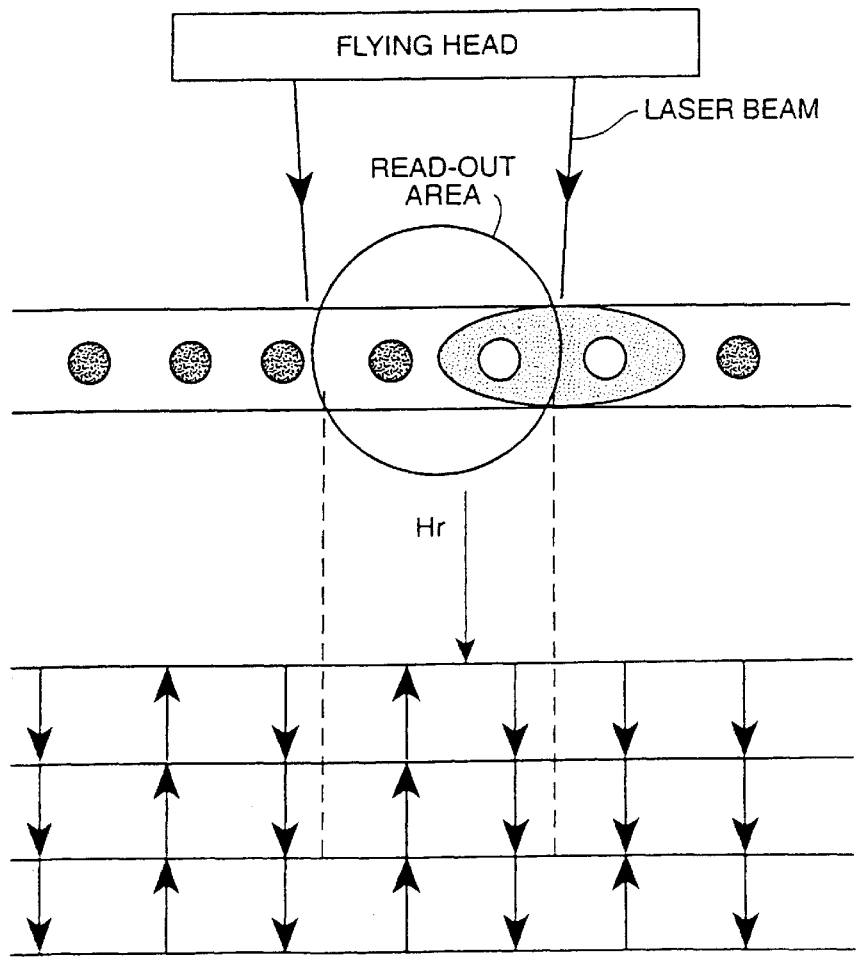

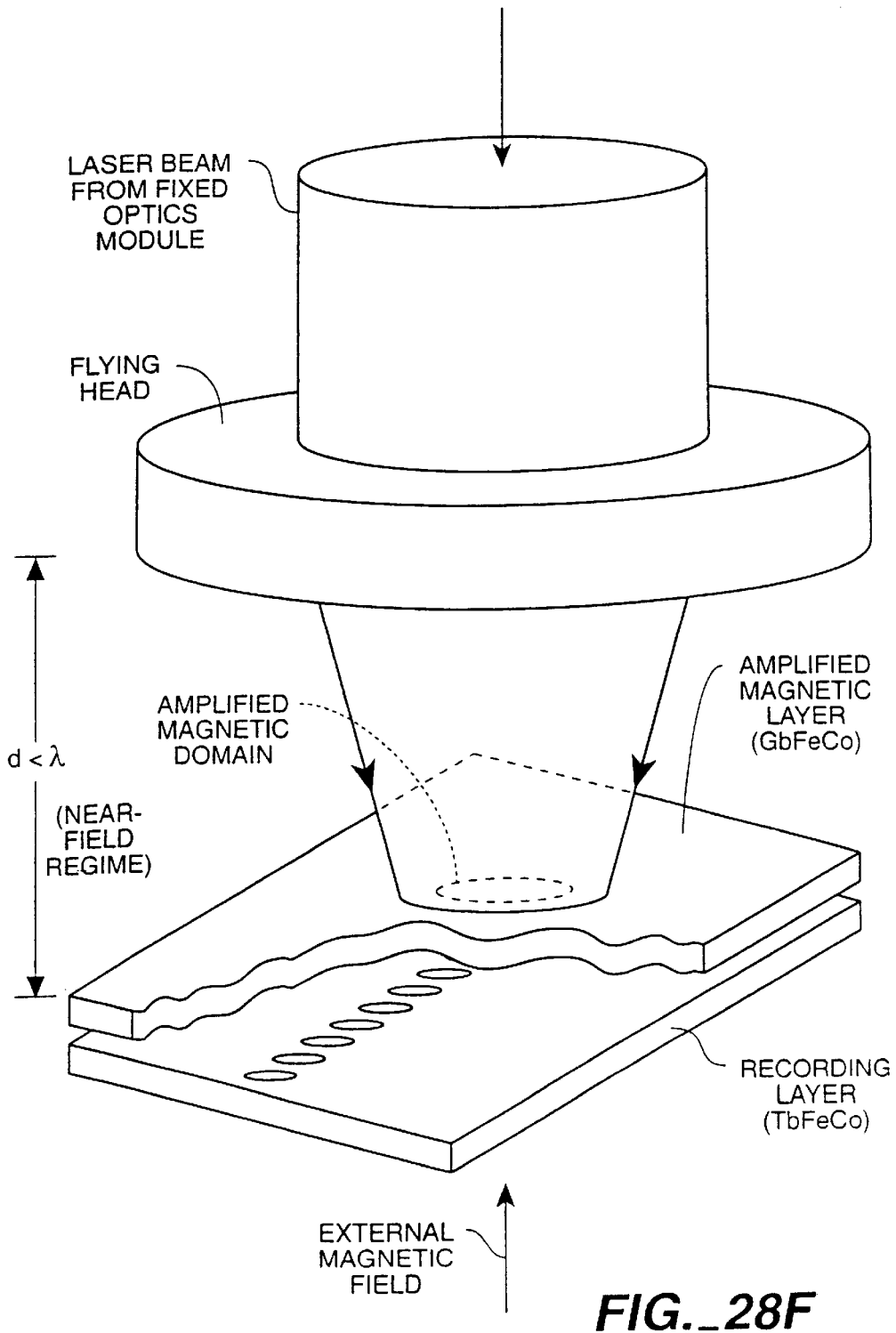
FIG._28F

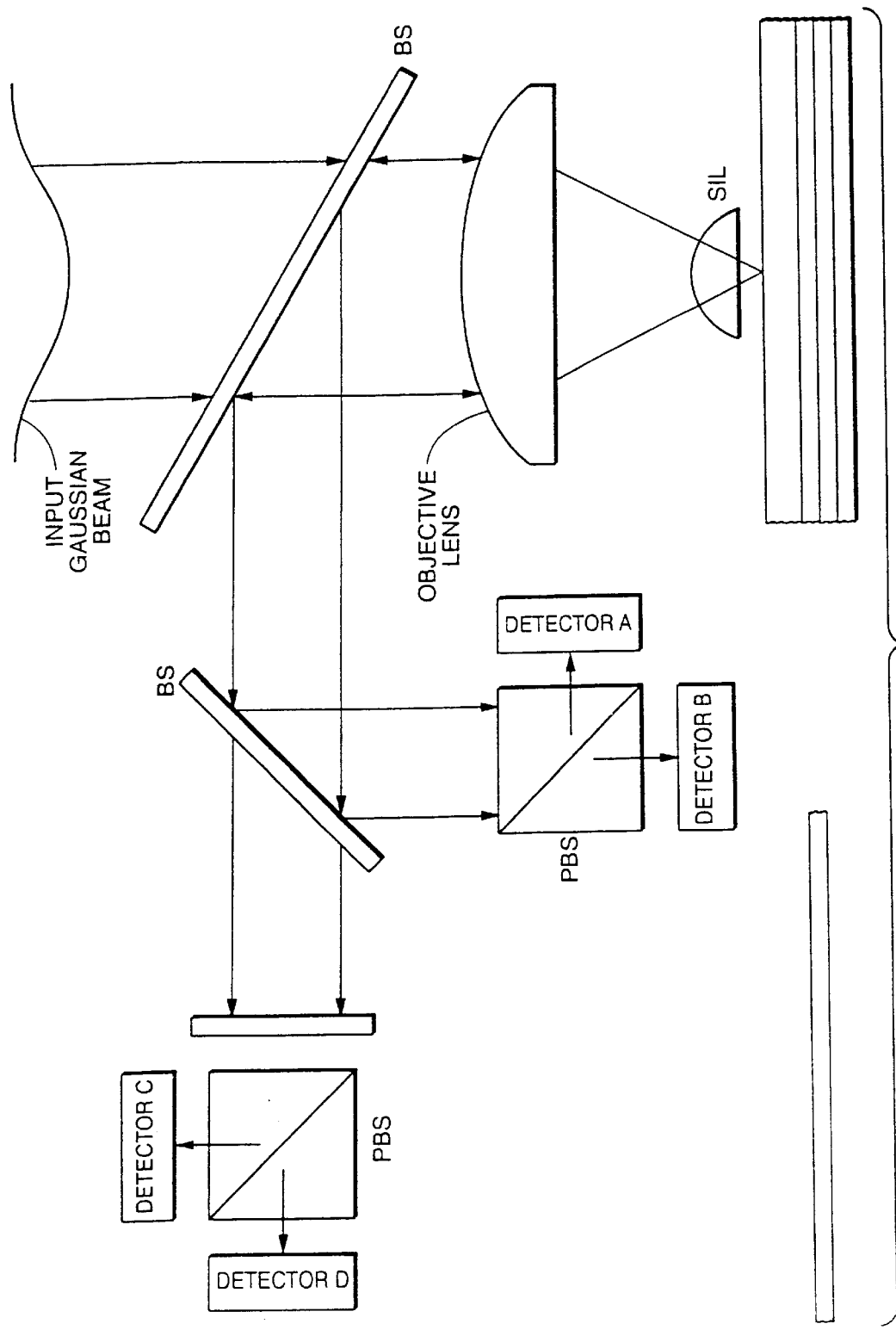
FIG._28G

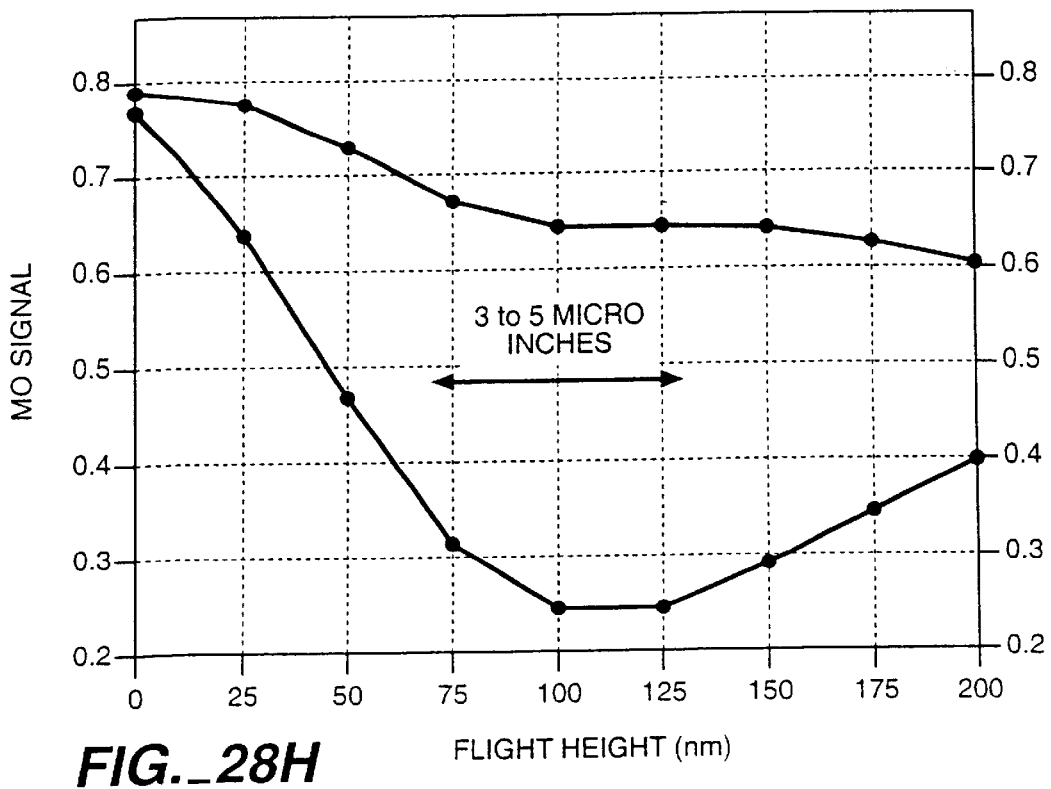
FIG._28H
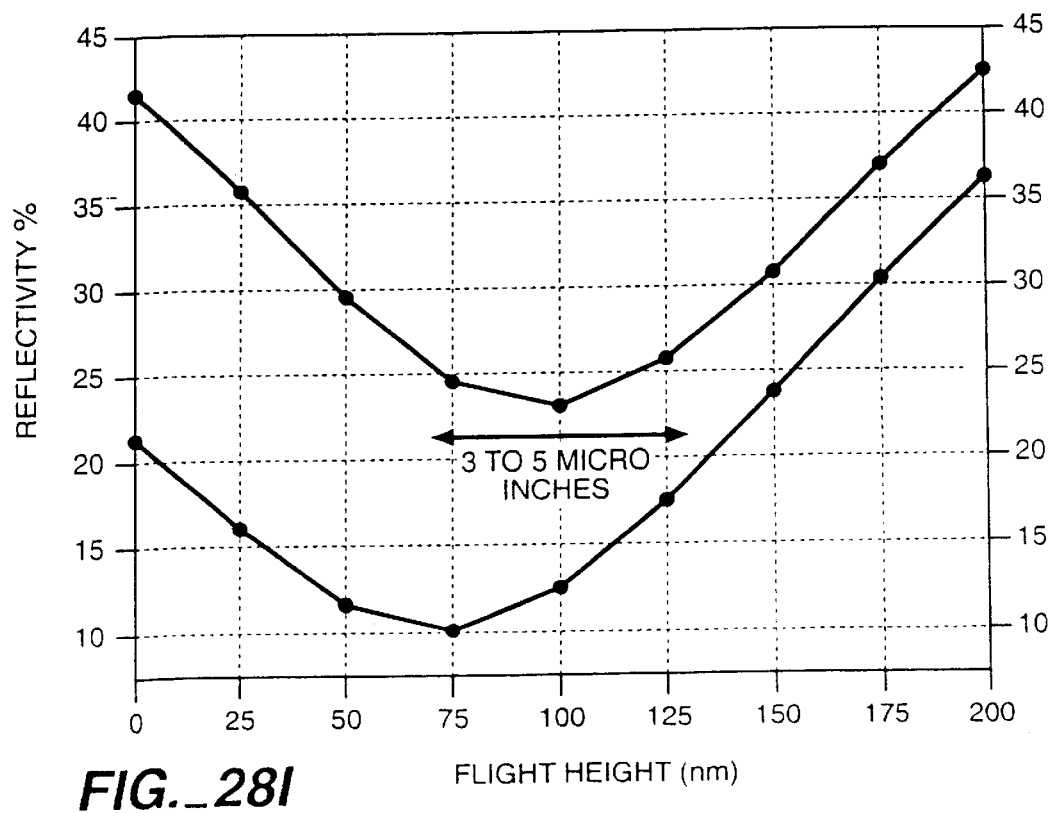
FIG._28I

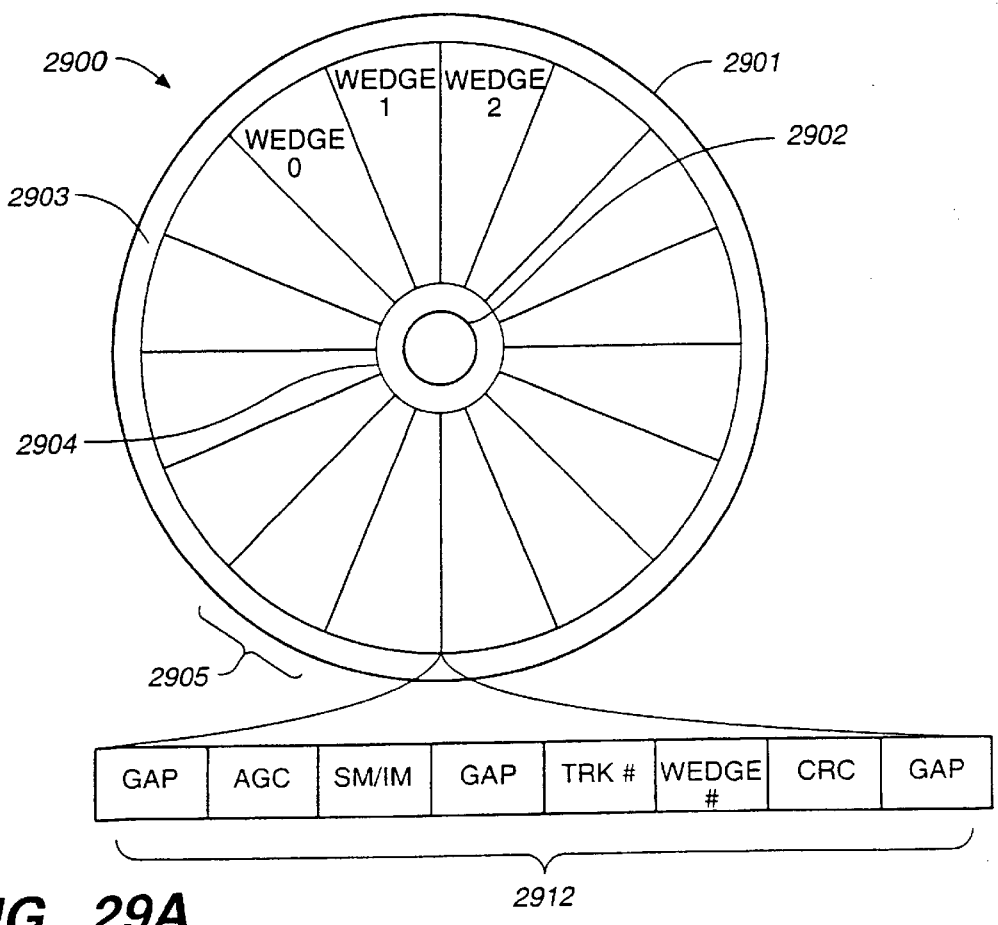
FIG._29A
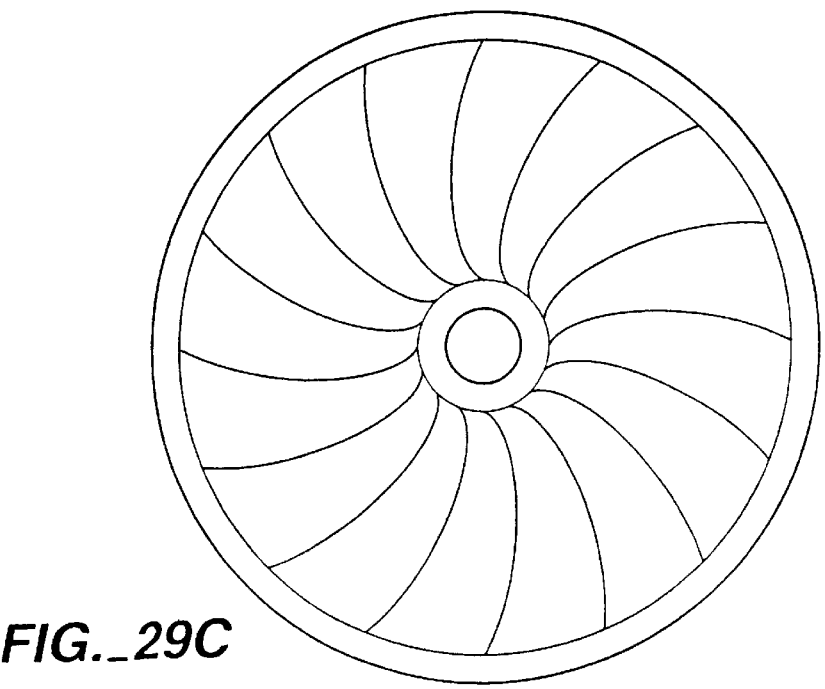
FIG._29C

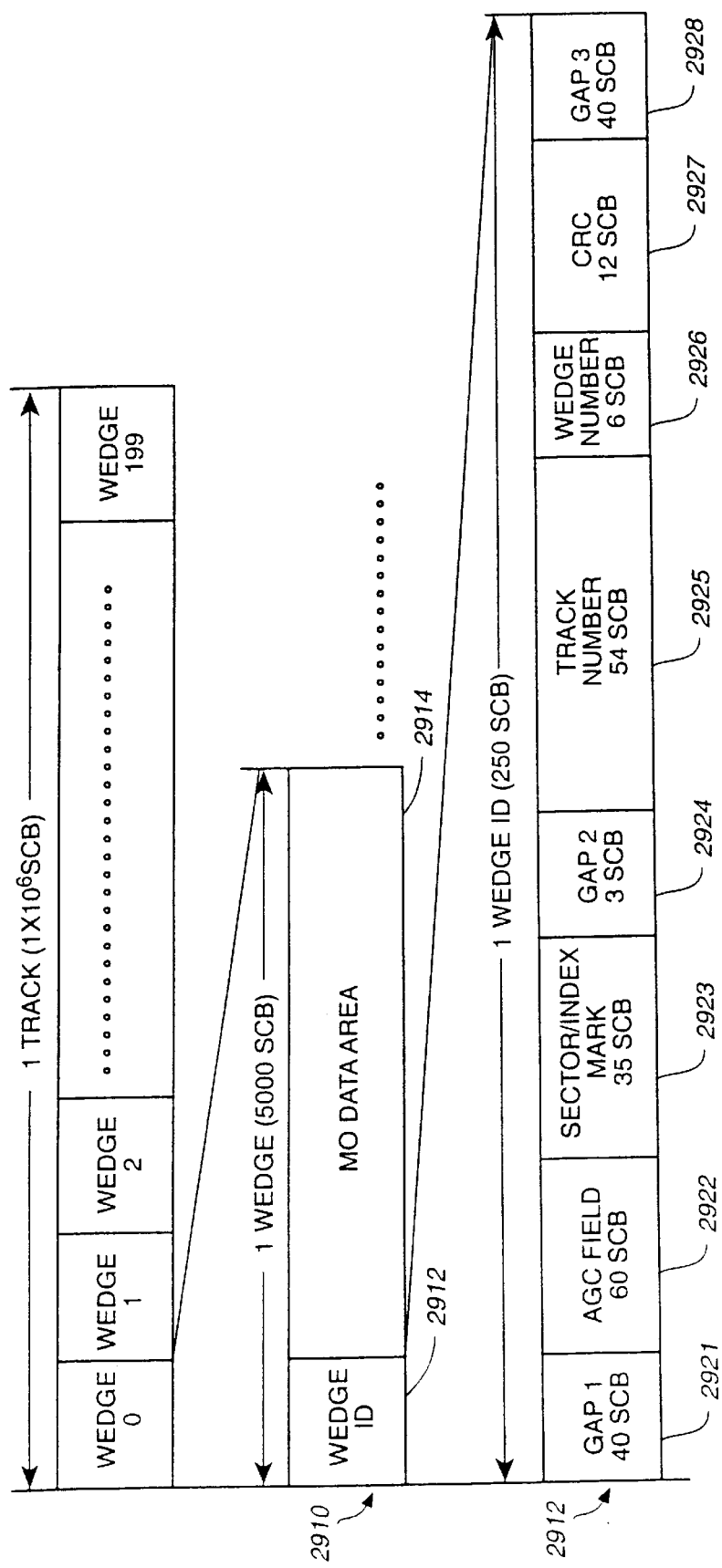
FIG._29B

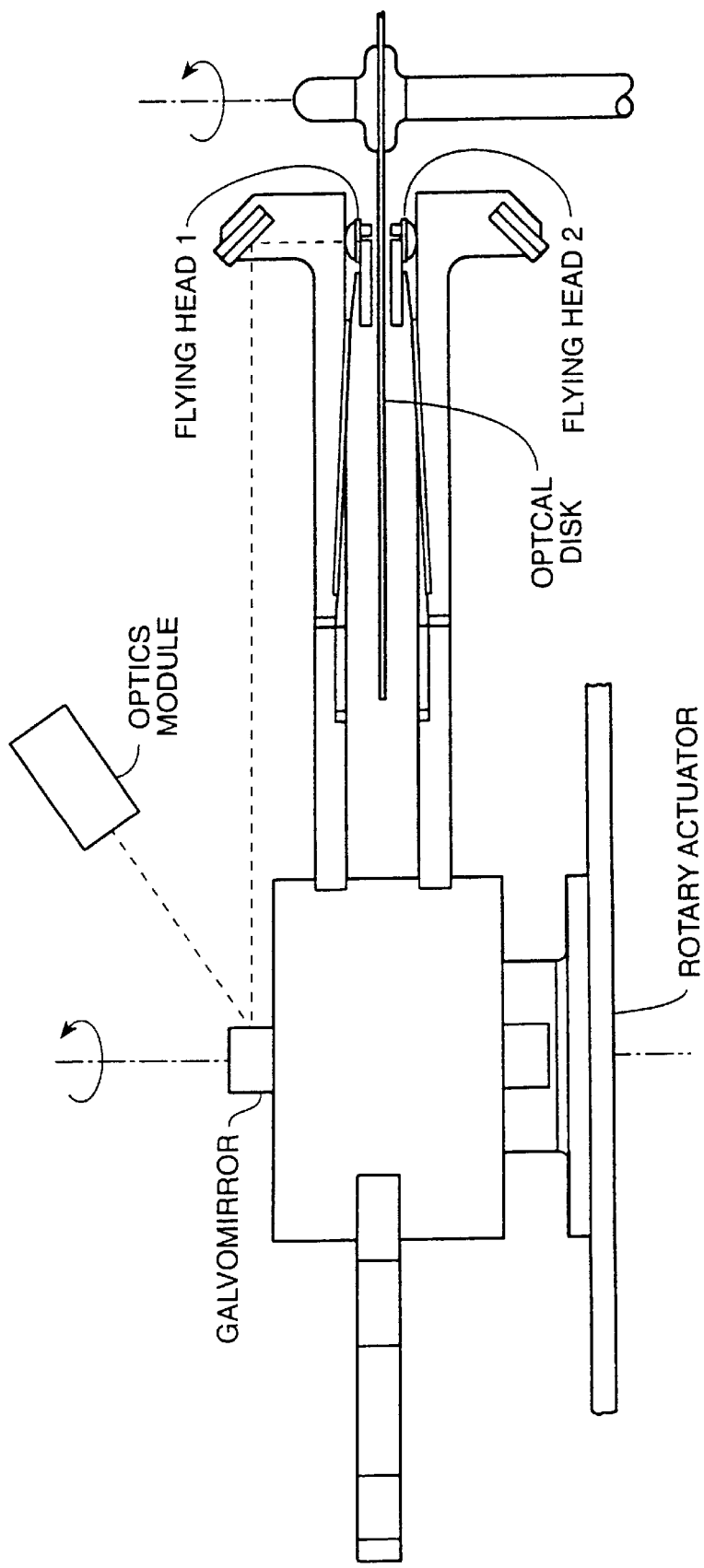
FIG._30A

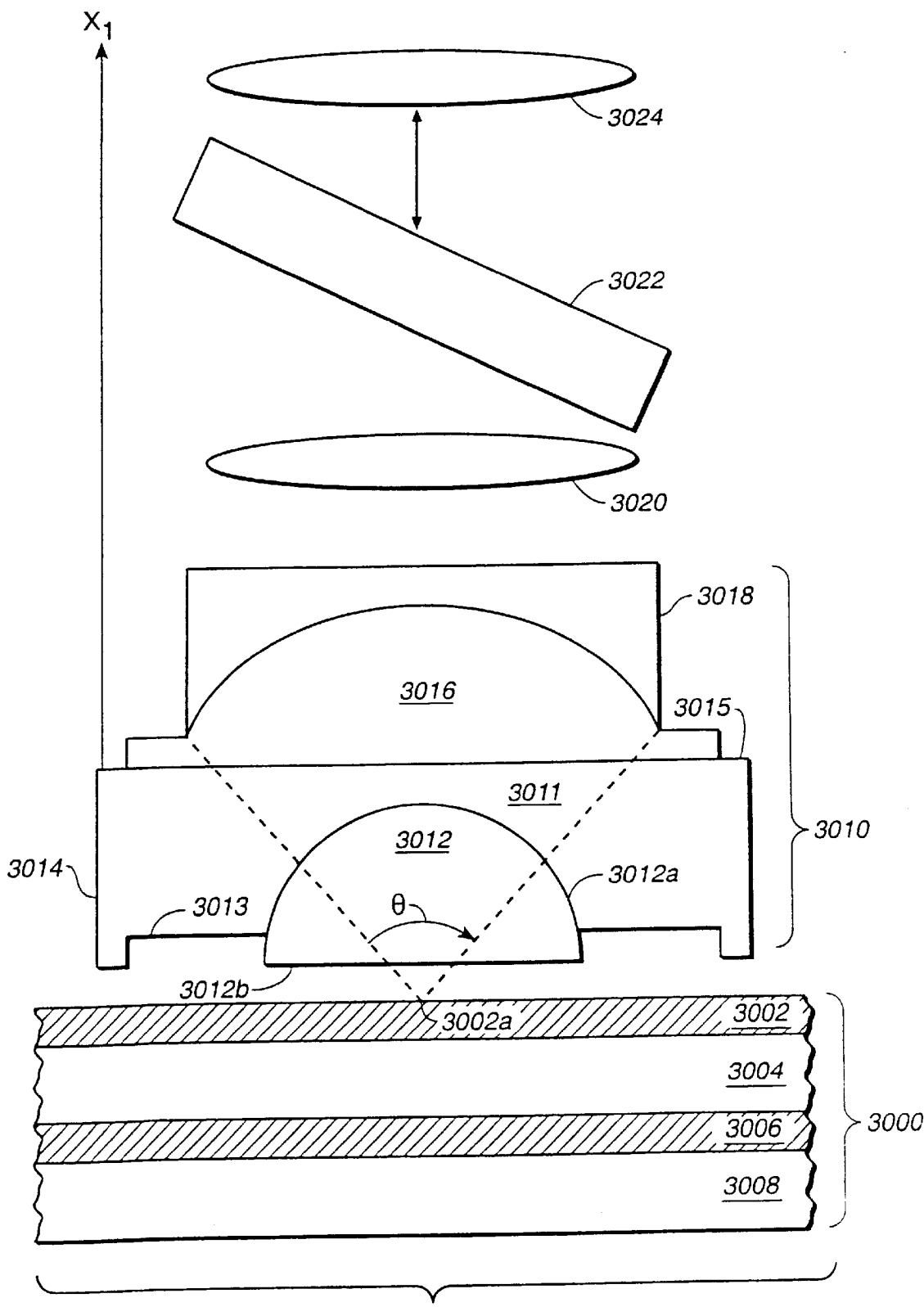
FIG._30B

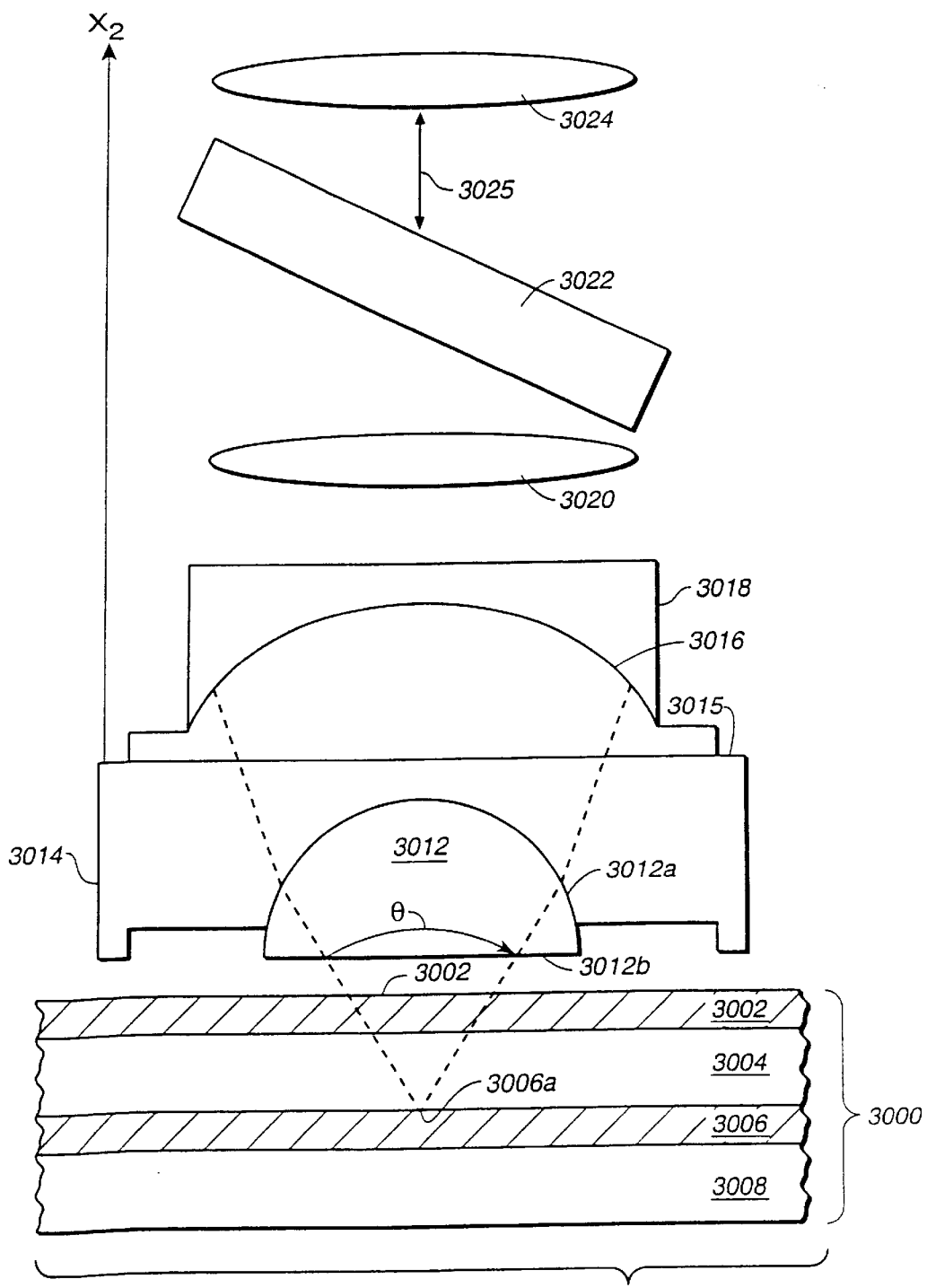
FIG._30C
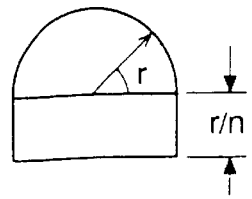
FIG._30D

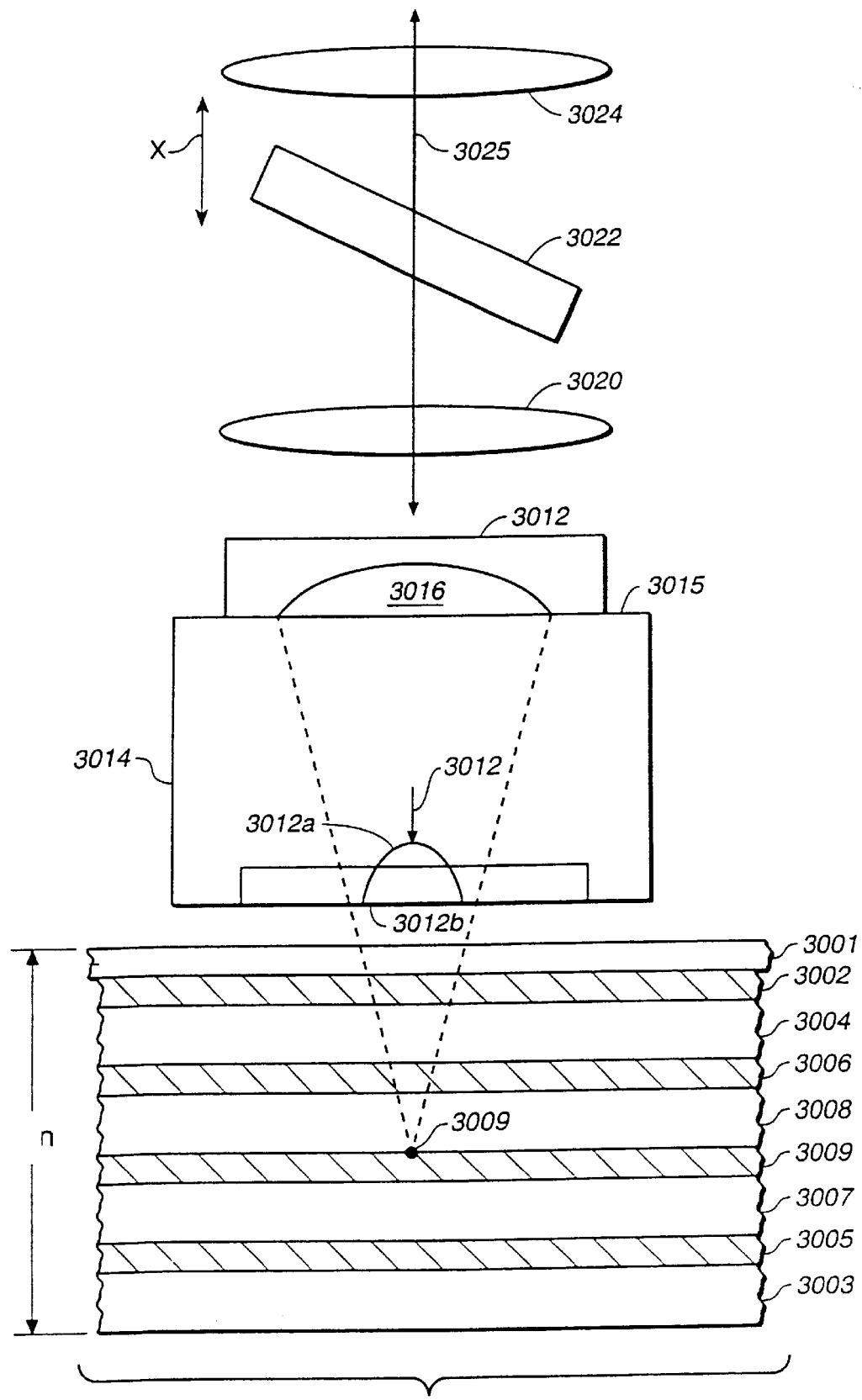
FIG._31

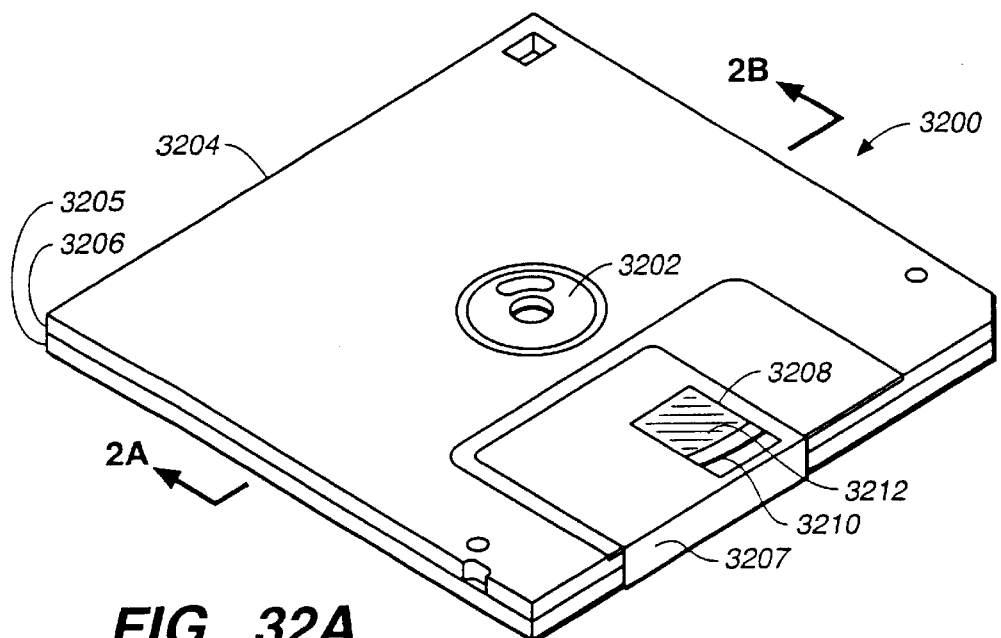
FIG._32A
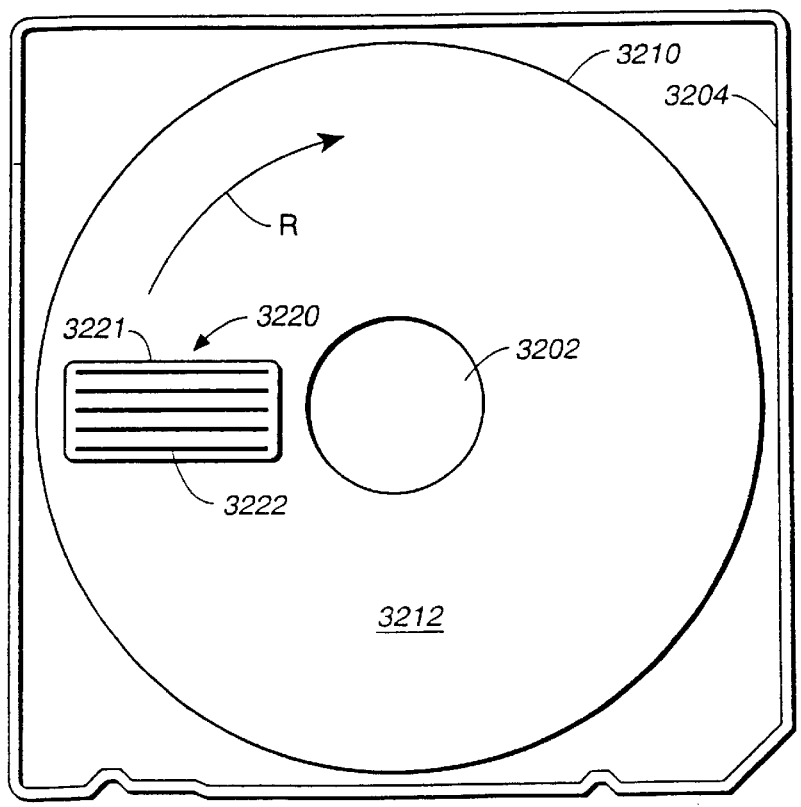
FIG._32D

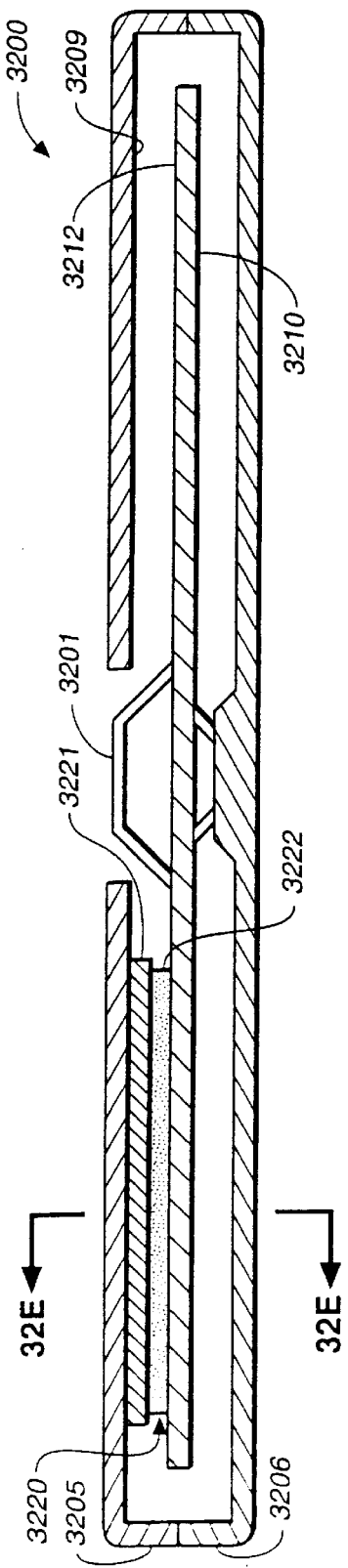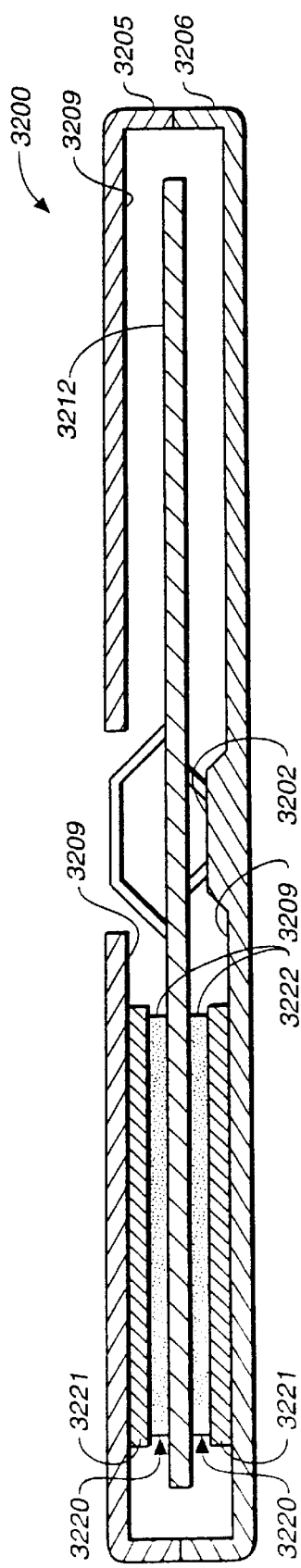

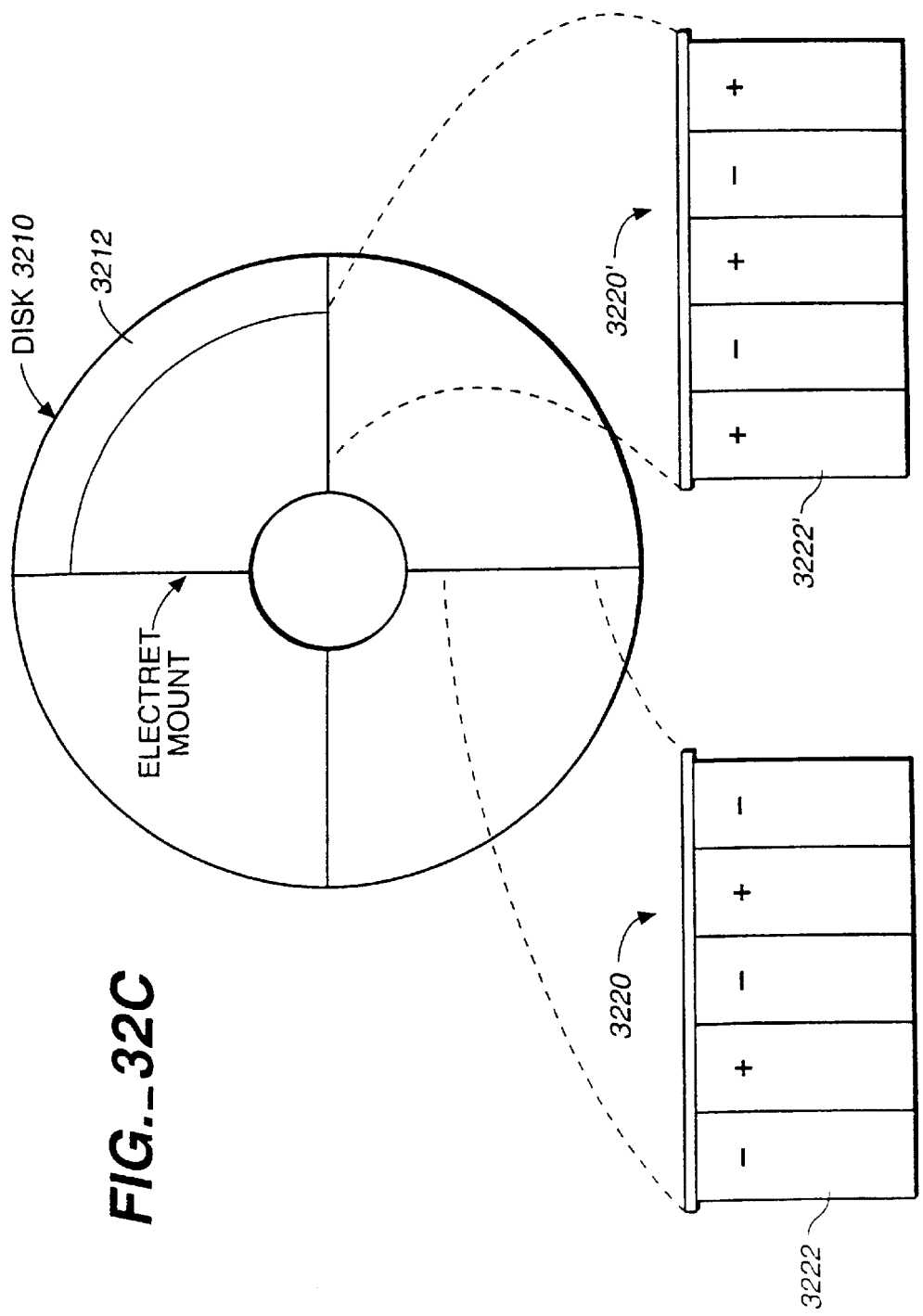
FIG._32C

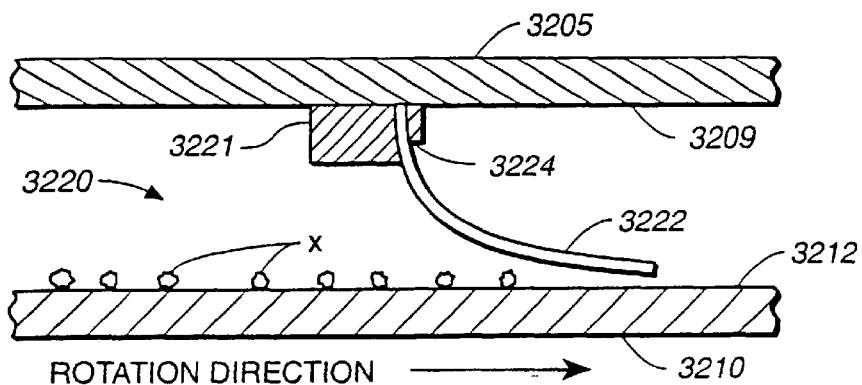
*FIG._32E*
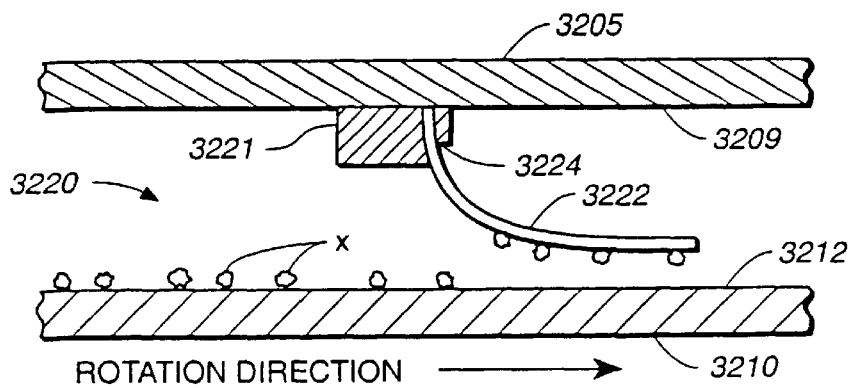
*FIG._32F*
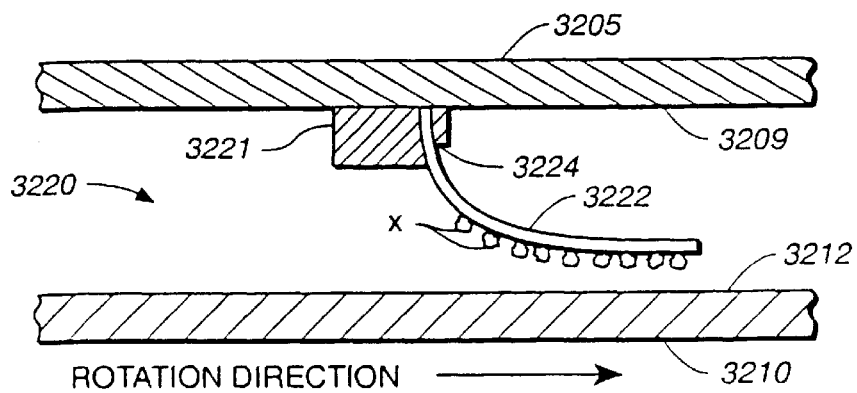
*FIG._32G*

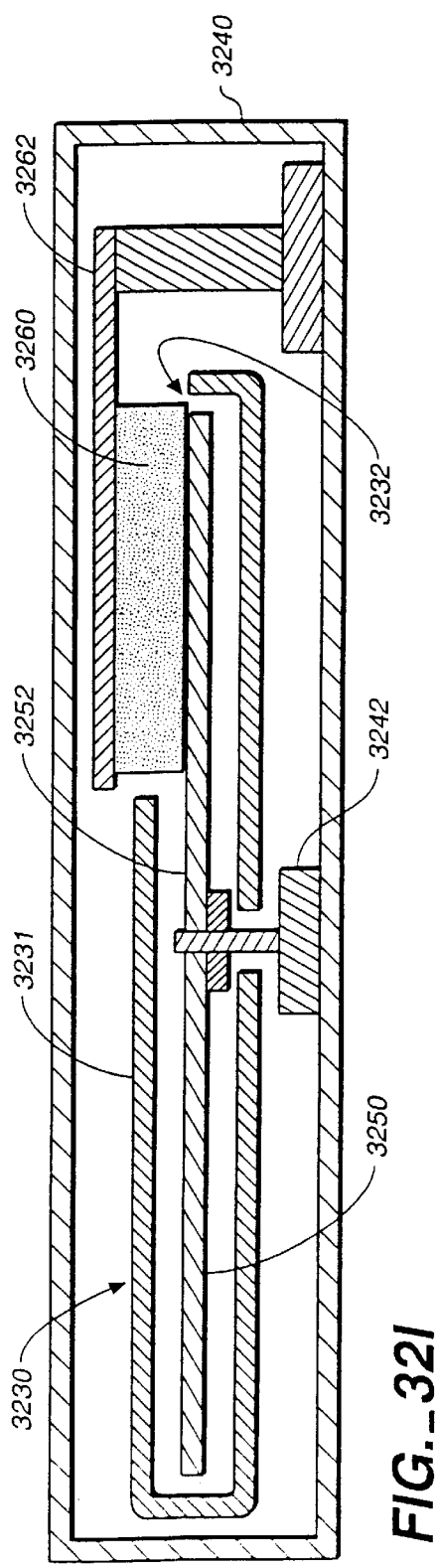
FIG._32I
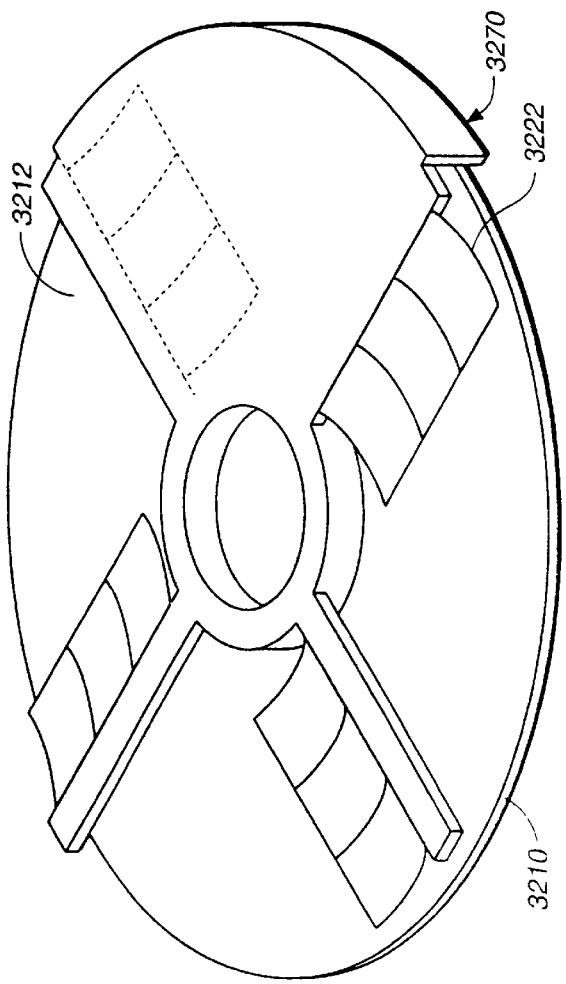
FIG._32J

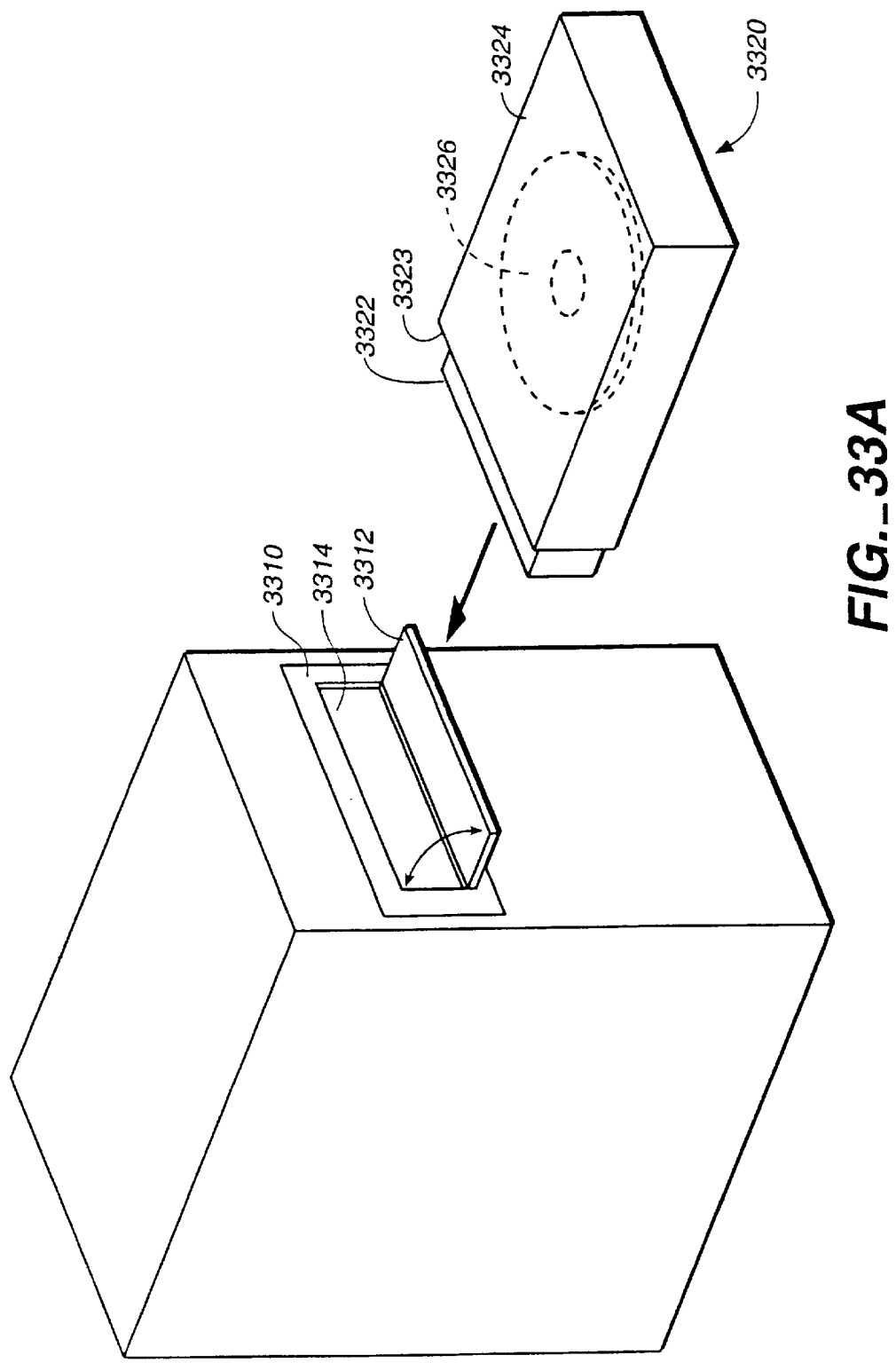
FIG._33A

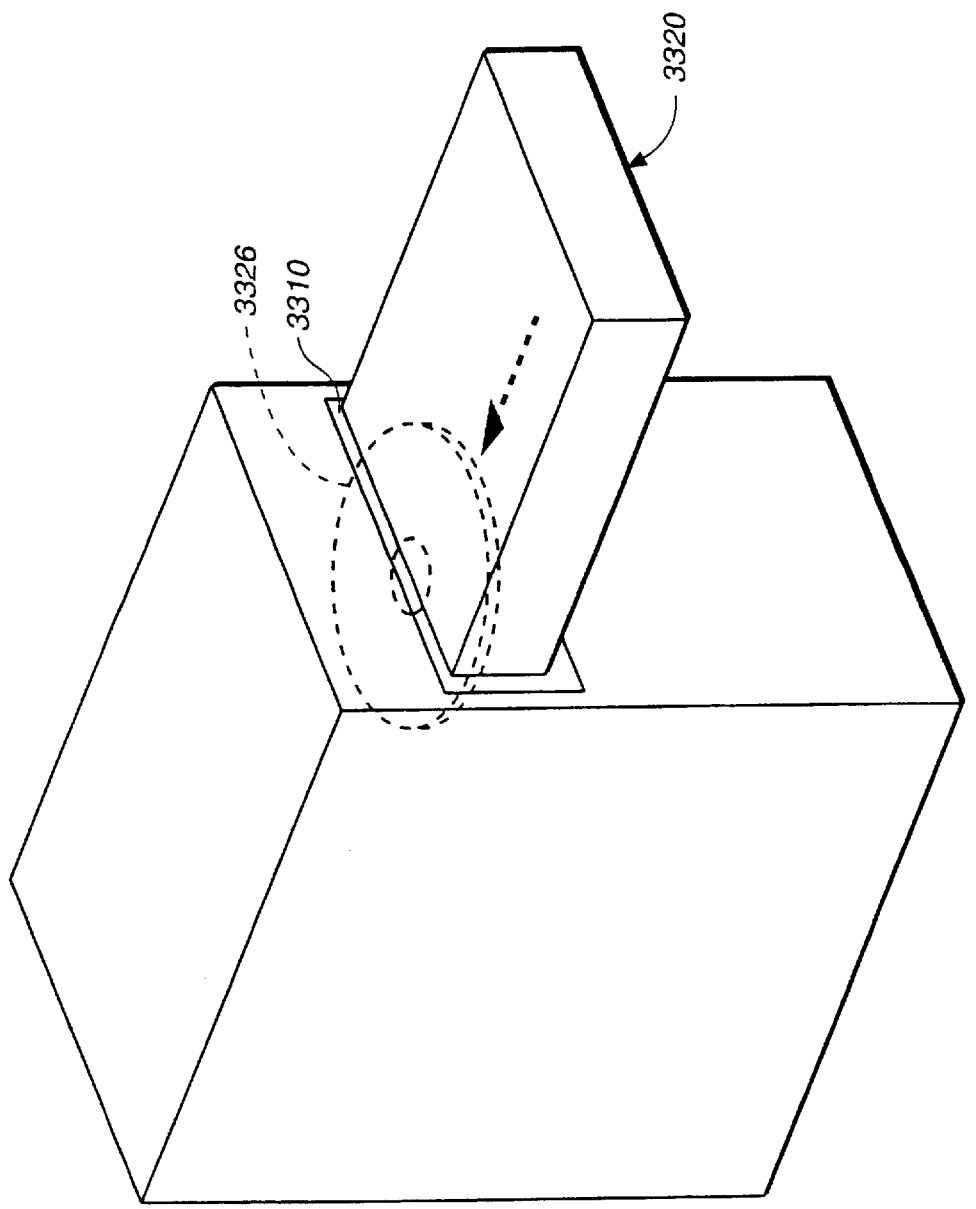
FIG._33B

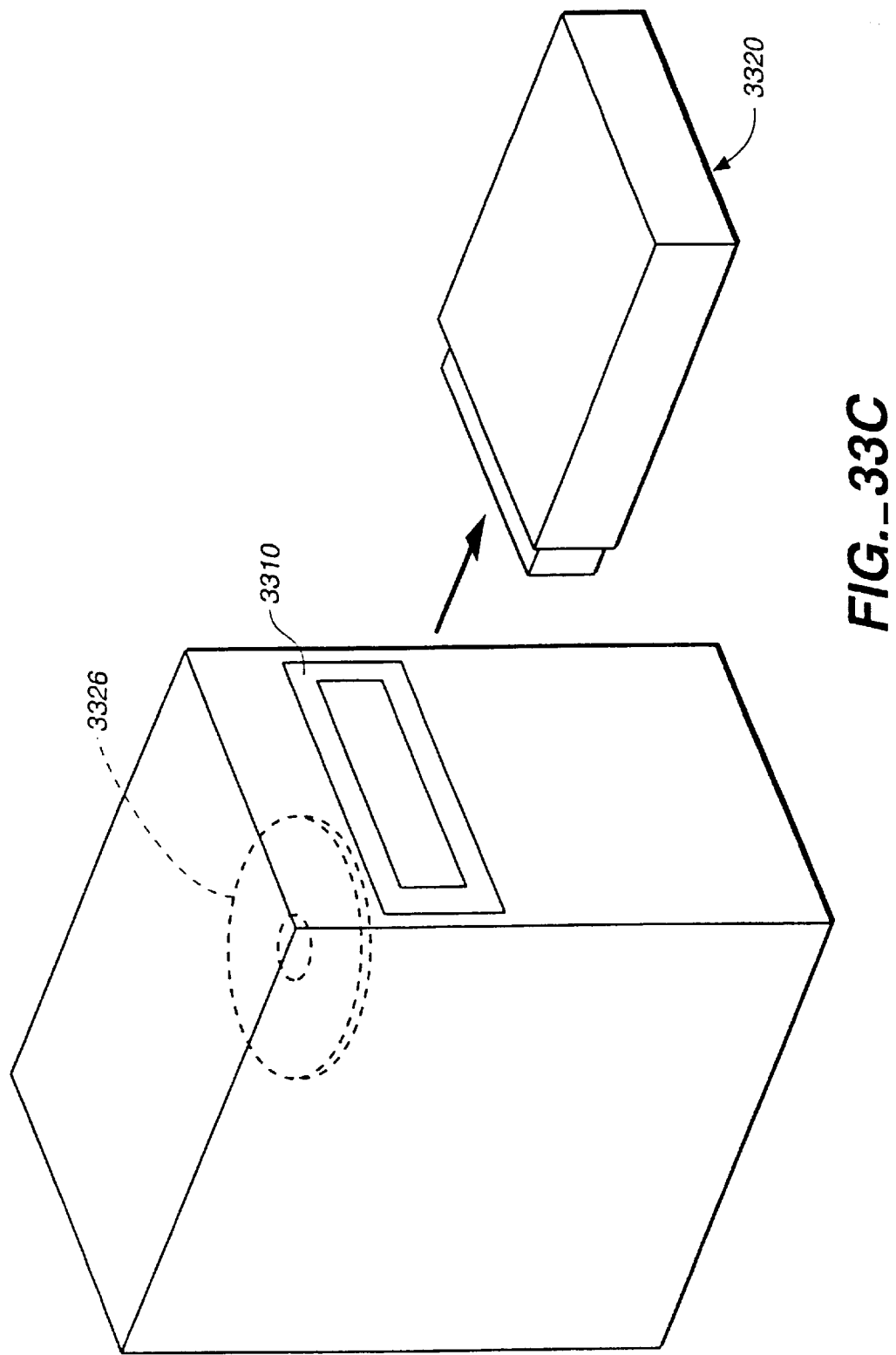
FIG._33C

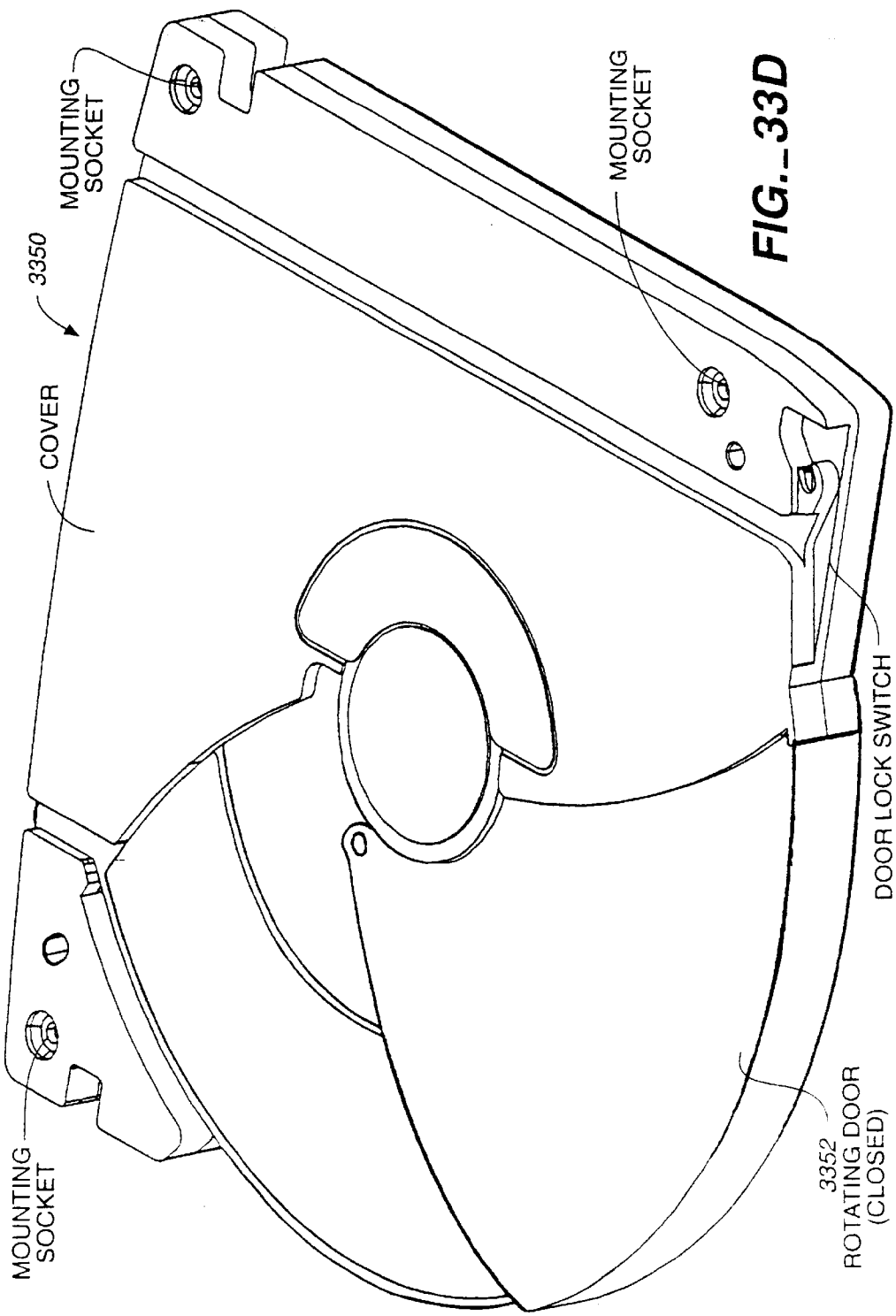

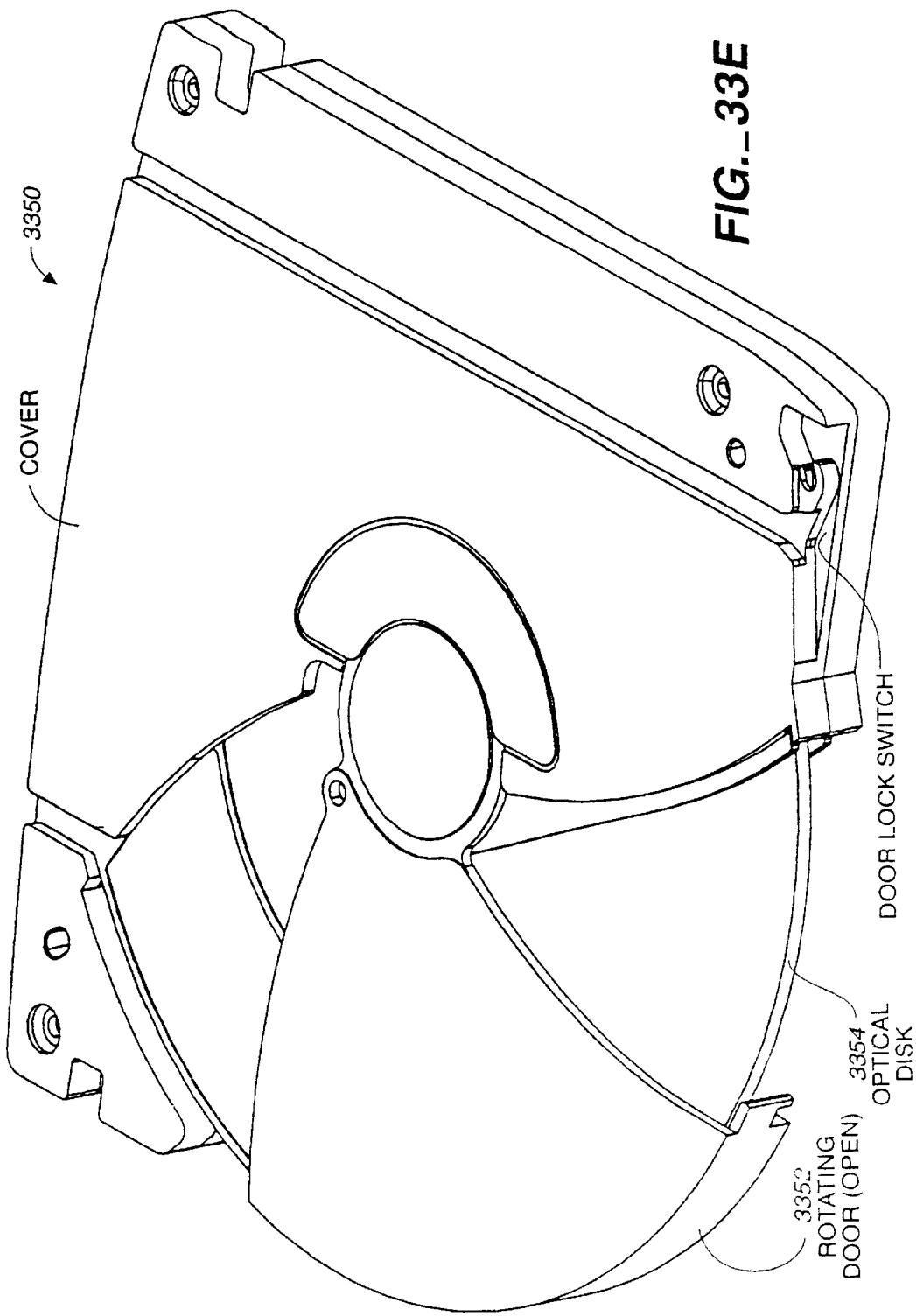
FIG._33E

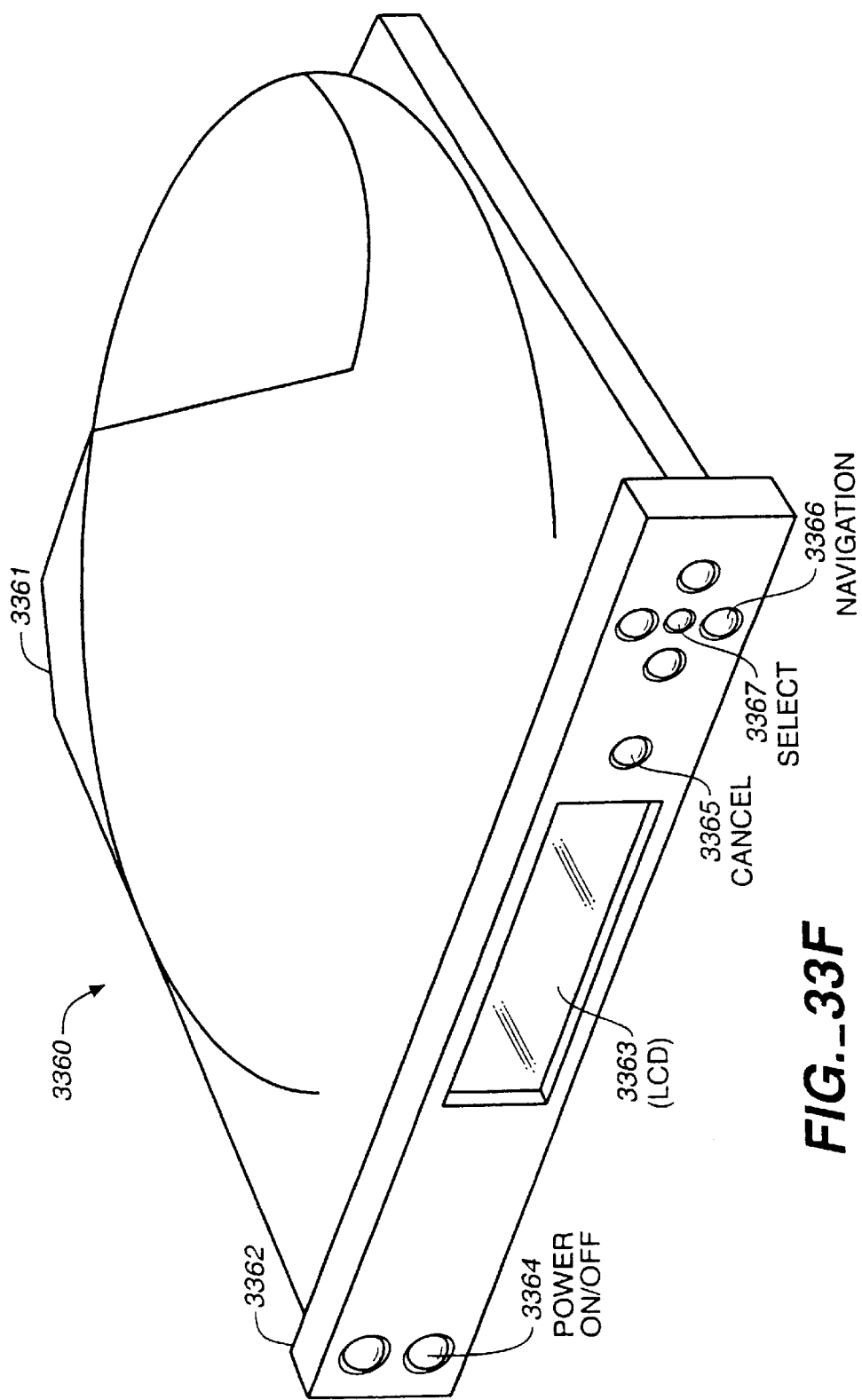

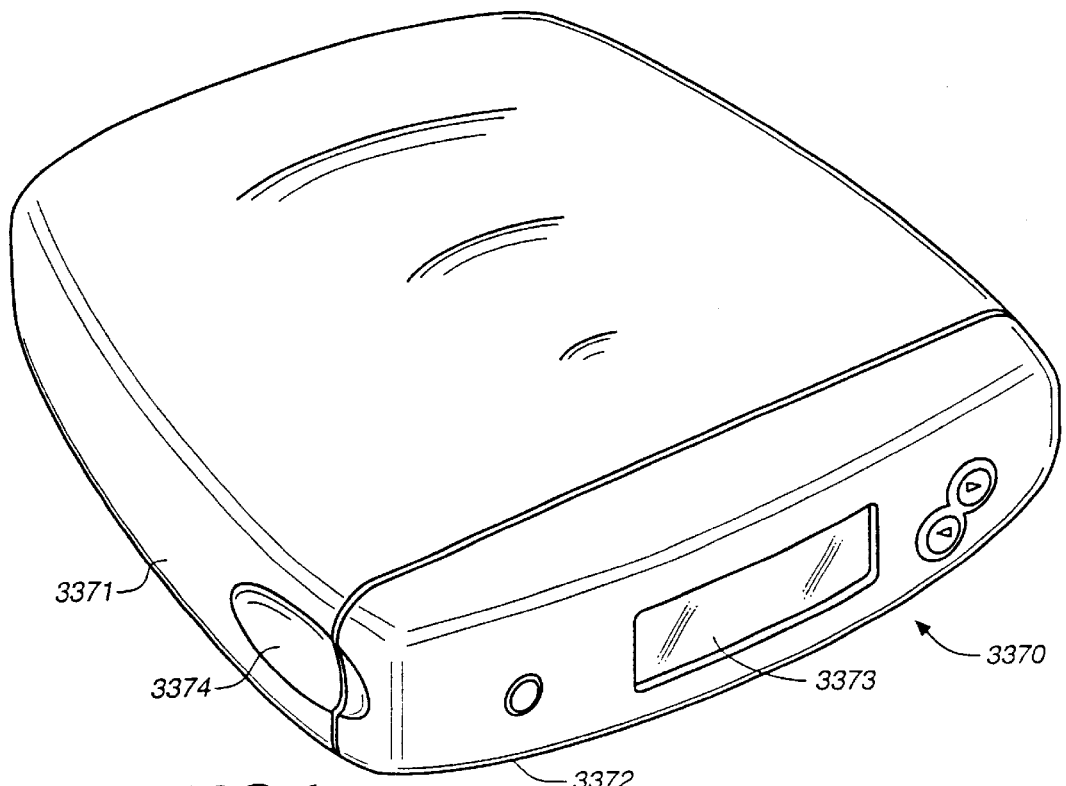
FIG._33G-1
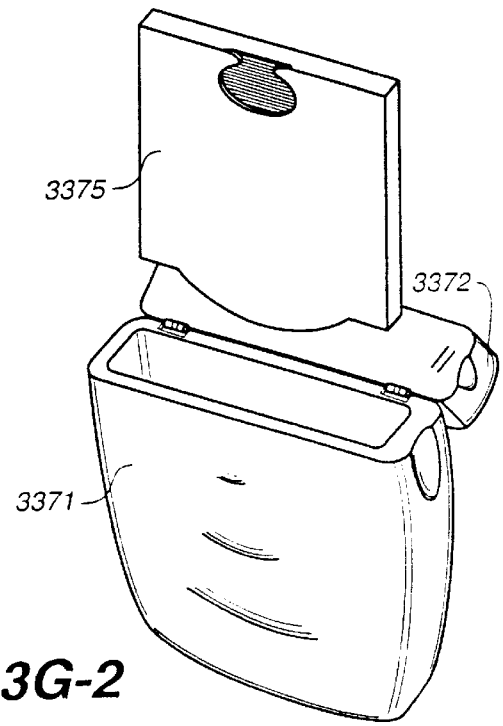
FIG._33G-2

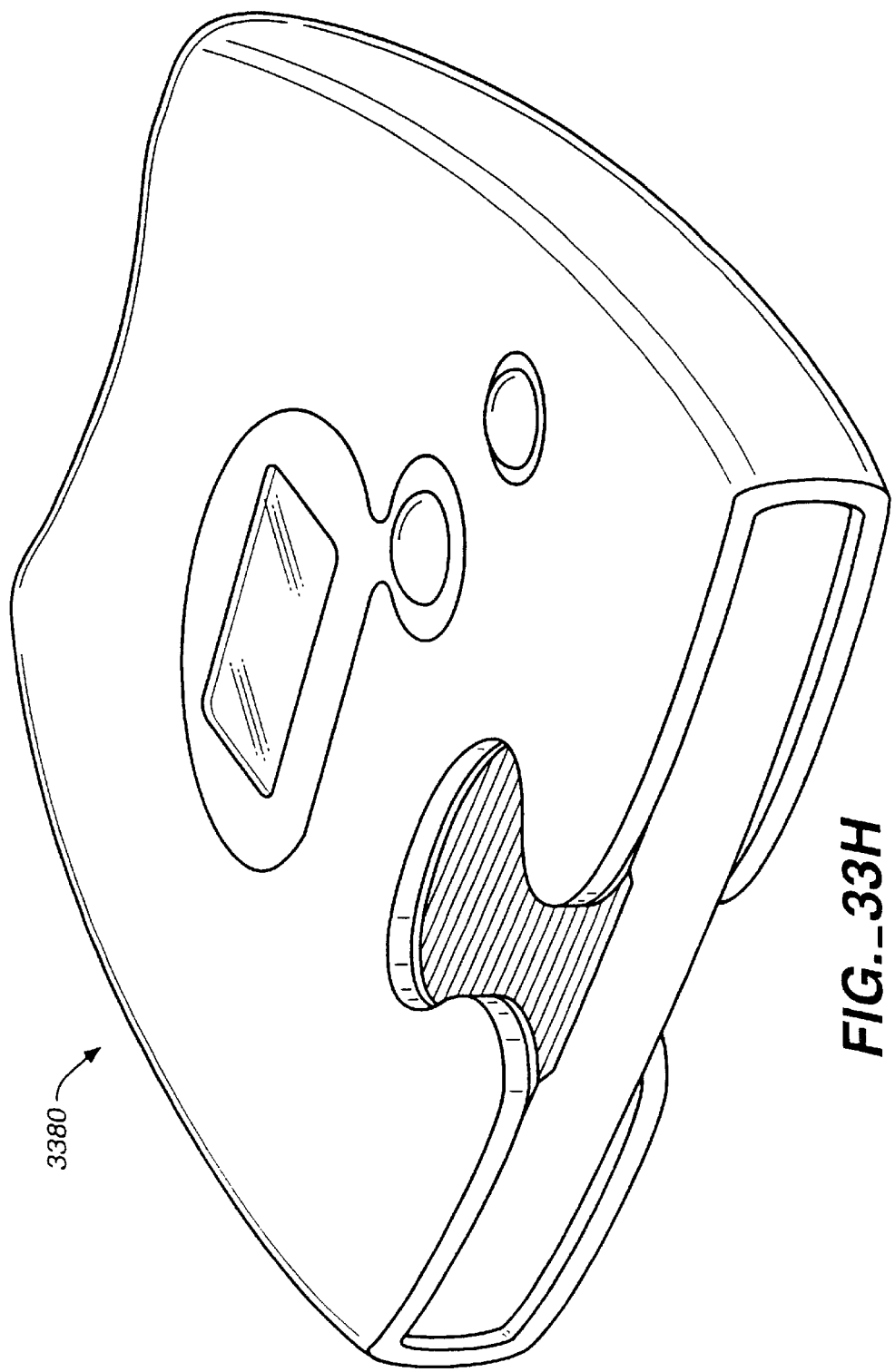

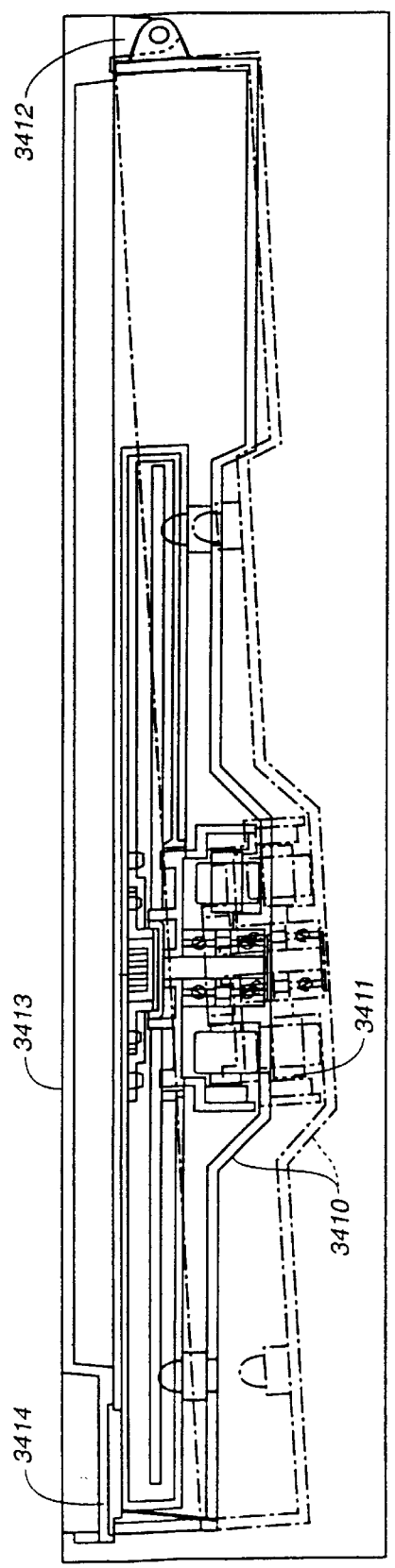
FIG._34

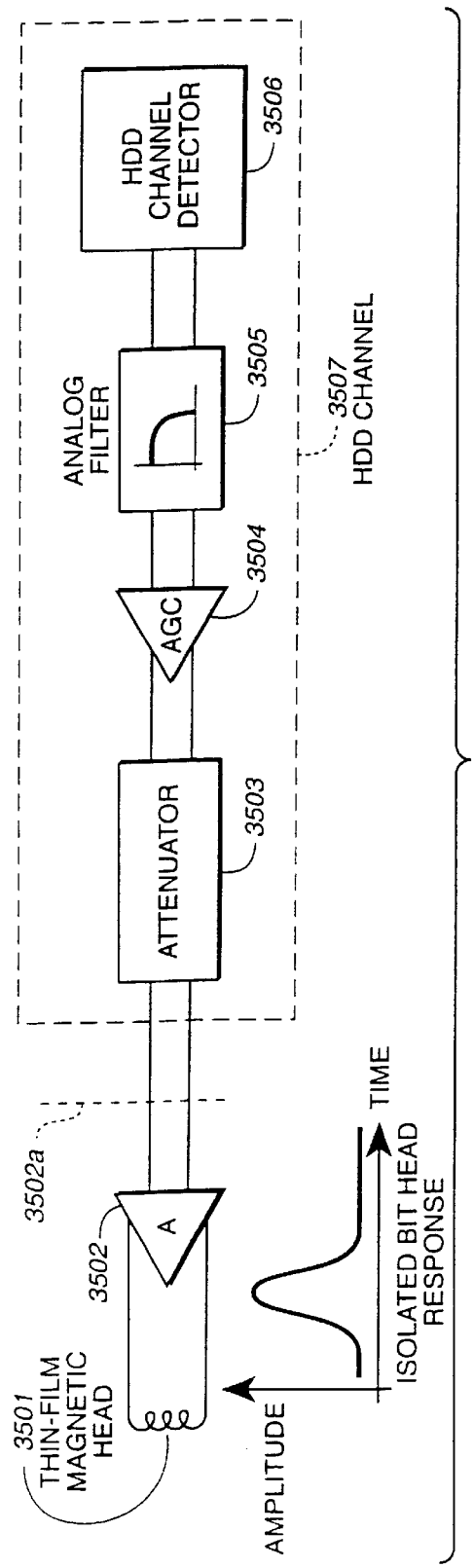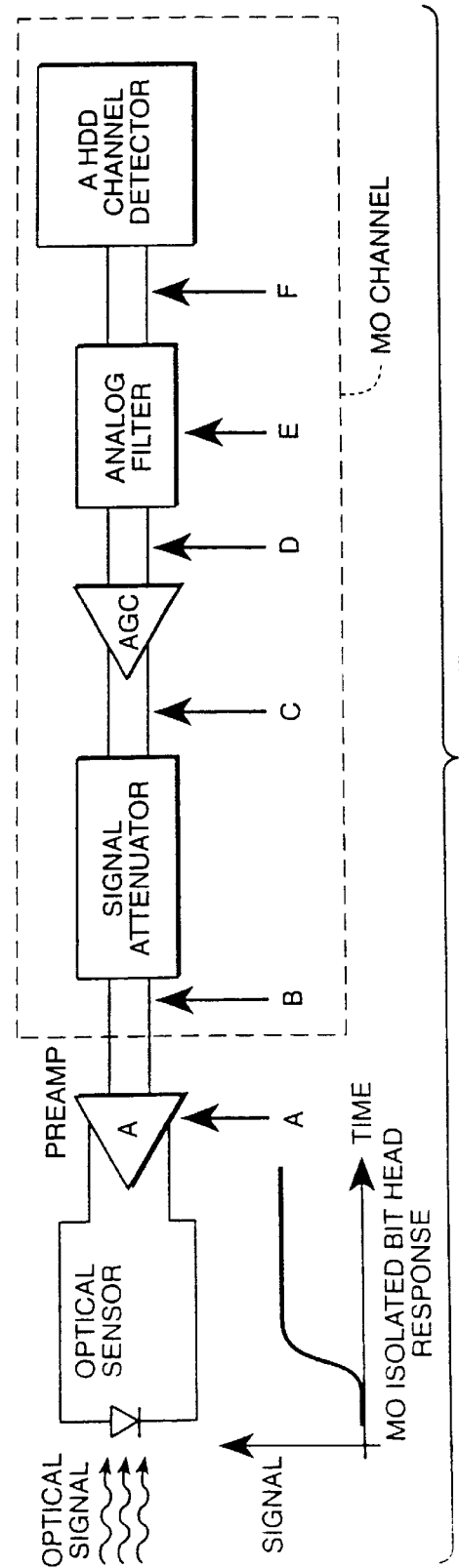
FIG._35A
FIG._35B

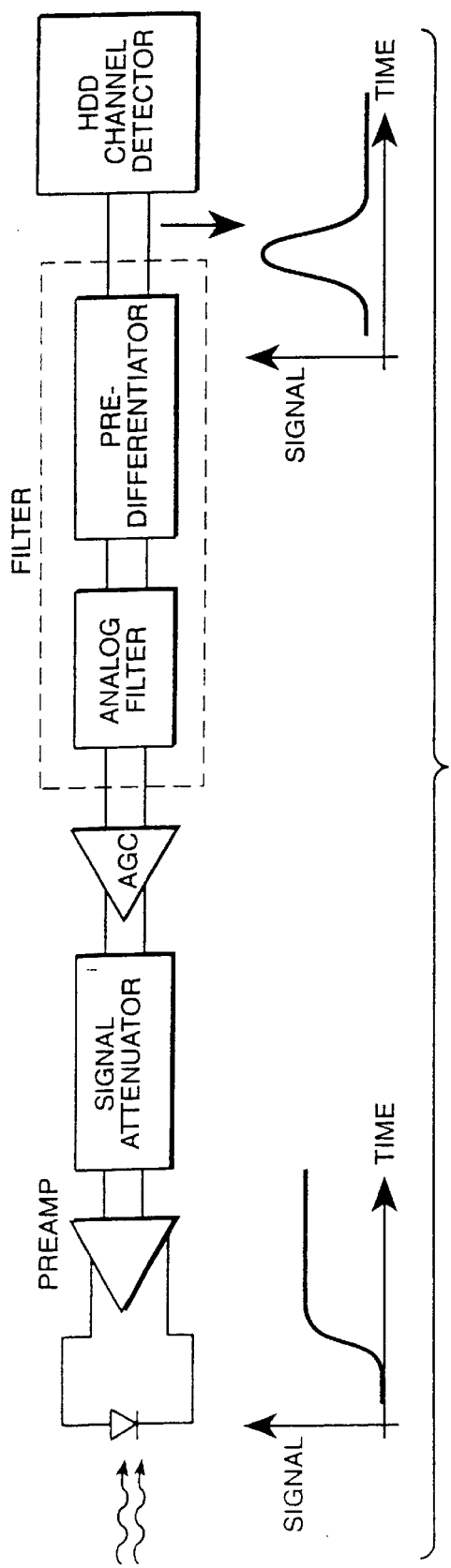
*FIG._35C*
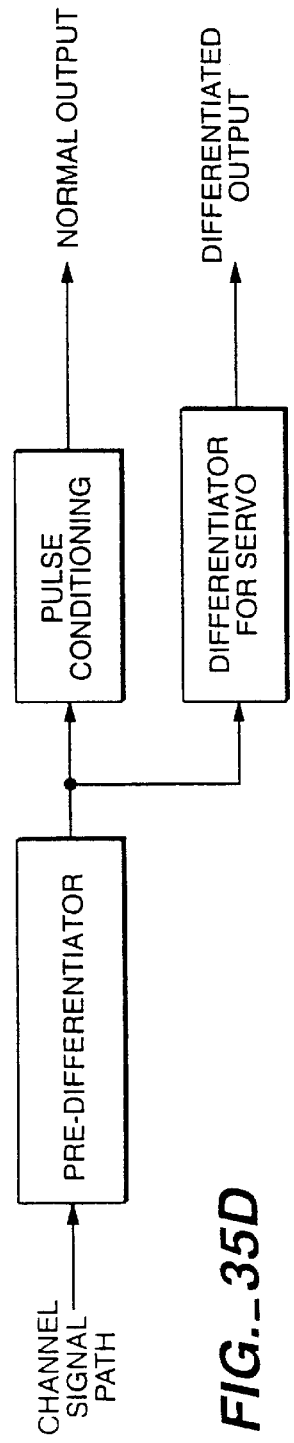
*FIG._35D*

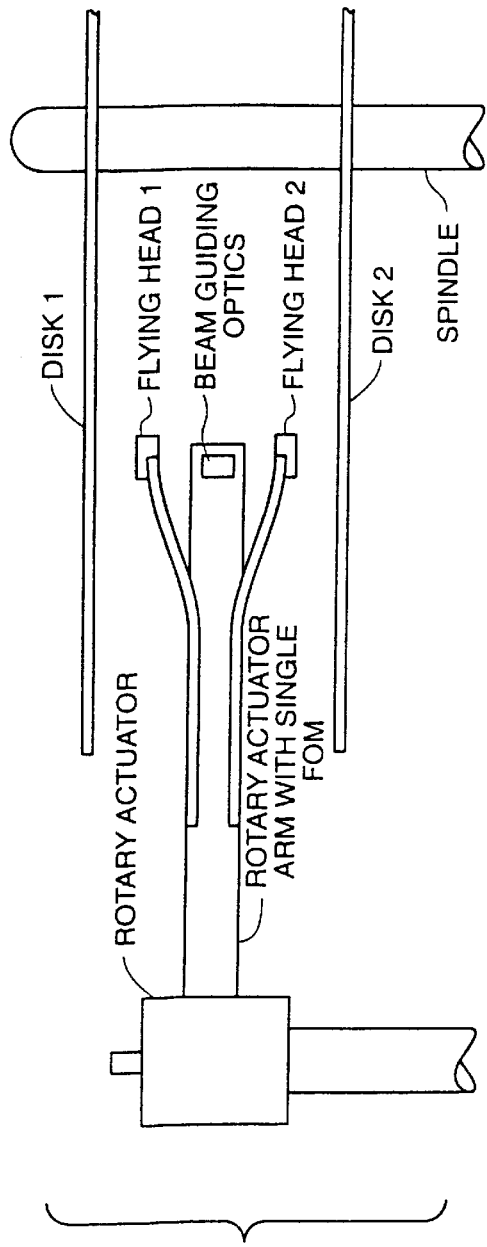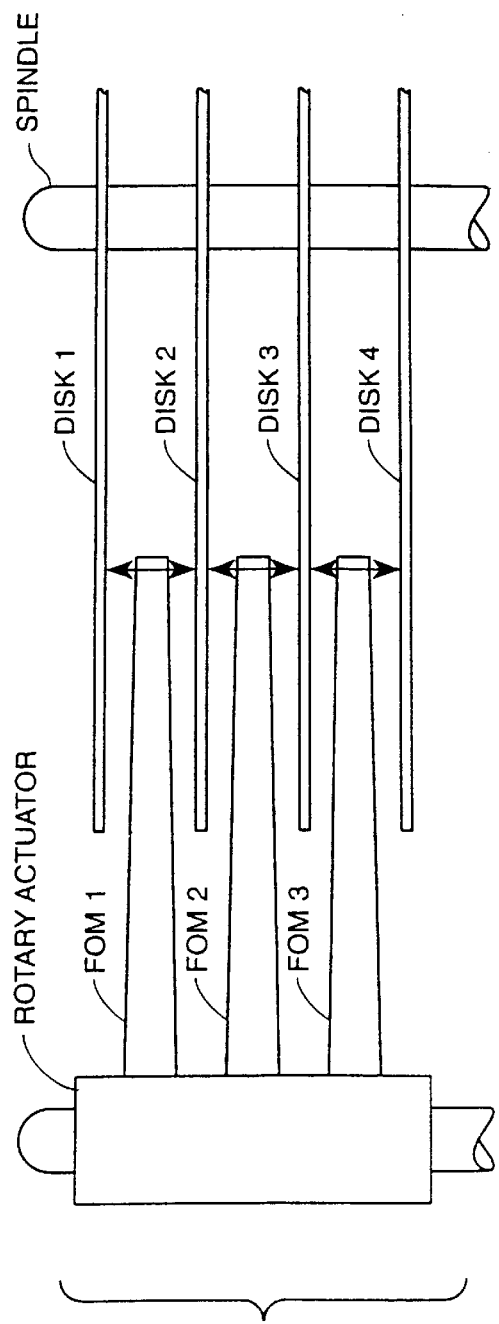

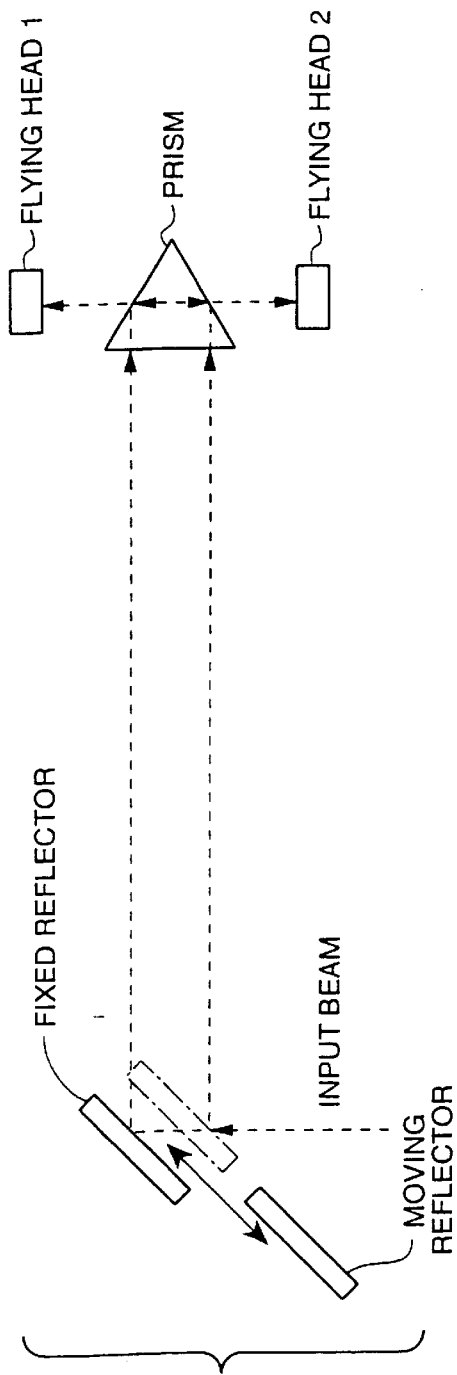
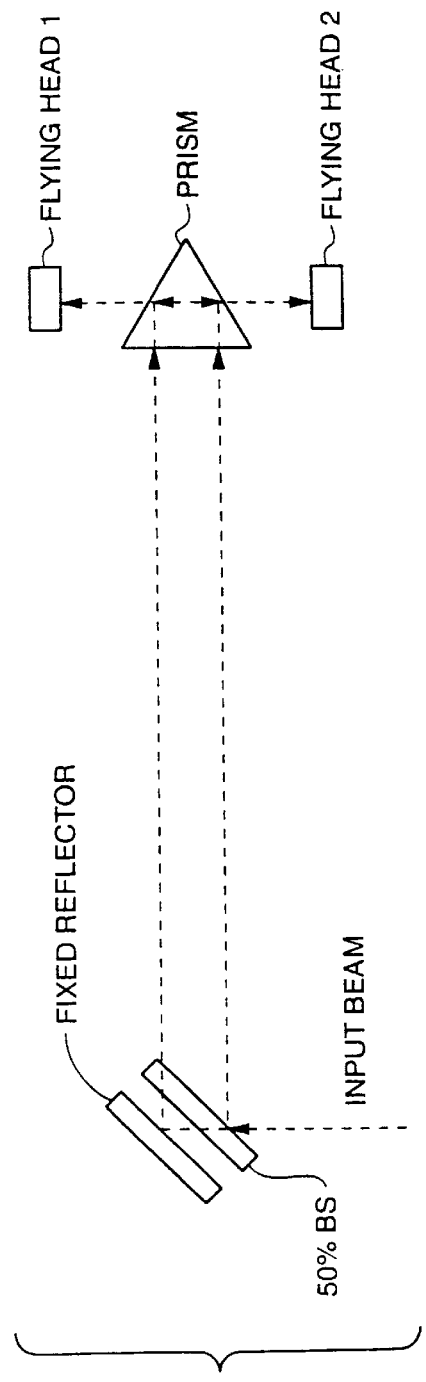
FIG._36C
FIG._36D

DISK MASTERING BASED ON NEAR-FIELD OPTICAL SYSTEMS

CROSS-REFERENCE TO RELATED APPLICATIONS

This application is a divisional of U.S. patent application Ser. No. 09/500,695 filed Feb. 9, 2000 now U.S. Pat. No. 6,449,221; which is a divisional of U.S. patent application Ser. No. 08/846,916 filed Apr. 29, 1997 (now U.S. Pat. No. 6,243,350). Further, U.S. patent application Ser. No. 08/846,916 is a CIP of U.S. patent application Ser. No. 08/641,513 filed May 1, 1996 (now abandoned), Ser. No. 08/657,145 filed Jun. 3, 1996 (now U.S. Pat. No. 6,270,696), Ser. No. 08/692,581 filed Aug. 5, 1996 (now abandoned), Ser. No. 08/720,808 filed Oct. 1, 1996 (now U.S. Pat. No. 5,936,928), Ser. No. 08/764,175 filed Dec. 13, 1996 (now U.S. Pat. No. 5,793,584), and Ser. No. 08/795,606 filed Feb. 5, 1997 (now U.S. Pat. No. 5,828,482). The disclosure of the above patent applications are incorporated herein by reference as part of this application.

FIELD OF THE INVENTION

The present specification generally relates to optical data storage. More particularly, the present specification describes an electro-optical system for data storage and retrieval in a near-field recording configuration.

BACKGROUND OF THE INVENTION

Data storage is an important aspect of today's information technology. A great deal of effort has been made by the storage industry to increase the areal data density of a storage medium in order to meet the ever increasing demand for higher capacity storage devices.

Magnetic storage devices such as fixed or removable magnetic disks and tapes are widely-used conventional storage devices. The state-of-art conventional magnetic hard drive systems can achieve extremely high linear bit densities, especially with the new MR and GMR magnetic heads. For example, the areal density of many hard disk drives is on the order of magnitude of about one gigabit per square inch. One limitation in increasing areal data density in a magnetic device is the particle size or the characteristic dimension of a typical magnetic domain of the magnetic recording materials. Other limitations include the width of the magnetic read/write head and the limitations of mechanical tracking. Therefore, these hard drives are typically limited to less than 10,000 tracks per inch.

Optical storage devices are emerging as an alternative technology to the conventional magnetic technology because of their potential for high density data storage. The areal density of an optical storage device, in principle, is only limited by the diffraction limit of an illuminating optical beam for reading or writing. One type of commercial optical storage technology is based on magneto-optical materials. These materials can currently produce an areal data density of about one giga bit per square inch.

One well-known approach to increase the areal data density in an optical storage system is using smaller beam size. Due to the diffraction limit, this may be achieved by using a light source with shorter wavelengths such as those toward the blue end of the spectrum. For example, one application for the industrial development of compact blue lasers is aimed at the optical storage. Alternatively, one may increase the numerical aperture of the objective lens in the system to focus a beam at a given wavelength to a smaller spot within the diffraction limit.

FIG. 1 shows a block diagram of a typical rewritable optical storage system or drive 100 based on magneto-optic recording in the prior art. Several servo mechanisms are needed to keep the laser beam in focus and tracking on the disk, for example, an objective lens actuator 114, a master-slave tracking servo control 130, and a focusing servo control 120. In particular, the objective lens in the prior-art system 100 is servo controlled for focusing and tracking the beam onto the storage medium layer(s) at a desired location. This type of conventional optics system is usually limited to numerical apertures of the objective lens of less than 1.0, and typically in a range about 0.55 to 0.60. Since the areal density of the data stored on the medium is directly proportional to the square of the numerical aperture, the limited numerical apertures of a conventional optical drive can significantly restrict a substantial increase in the data density.

SUMMARY OF THE INVENTION

The present disclosure includes an electro-optical storage system with an areal data density that is higher than that of the prior-art storage systems such as state-of-art magnetic hard disk drives and various optical drives. One embodiment of the systems of the present invention comprises a read/write head and a head positioning system, an optics module including beam relay optics and signal detectors, an optical medium and a corresponding medium driving unit, and an electronic control system.

The read/write head is preferably a "flying" head which is suspended over the optical medium by an air-bearing surface in a near-field recording configuration wherein the spacing between an exit facet of the flying head and a recording layer in the medium is a fraction of the wavelength. An optical read/write beam exiting the near-field lens is then coupled to the optical medium by evanescent waves. The flying head includes a near-field lens with a high index of refraction and usually has a numerical aperture greater than unity under the preferred near-field condition. A focused beam with a spot size smaller than that obtainable from a conventional optical system is thus achieved at least in part due to the use of a high index solid immersion lens ("SIL") as the near-field lens.

One aspect of the invention is the automatic optimization and maintenance of focus under the preferred near-field condition. This is accomplished, at least in part, by the use of the air-bearing surface to suspend the flying head over the surface of the optical medium by a fraction of a wavelength at a prespecified height. Therefore, a conventional focusing servo system may not be required.

According to one embodiment, a solid immersion lens is used as the near-field lens with respect to an objective lens at a desired distance. A SIL cap lens that is part of a sphere may be laminated to a transparent base plate with an optical UV epoxy layer. A spacer having a void area that is larger than the SIL cap lens may be adhered to the base plate with the optical UV epoxy layer in a way so that the SIL cap lens is enclosed in the void area of the spacer. The thickness of the spacer is preferably at least the height of the SIL cap lens. The objective lens is then fixed to the spacer with an epoxy. The desired distance between the objective lens and the SIL cap lens may be determined in an alignment process by maximizing an optical feedback signal from an exit facet of the SIL cap lens. A transparent mesa may be formed on the base plate as a part of the near-field lens for coupling light between the flying head and the optical medium. The SIL cap lens and the base are preferably made of materials that have a similar index of refraction, including but not limited to cubic Zirconia, Schott glass (LaSF35), Hoya glass (TaFd43), Cleartran, Zinc Selenide, Gallium Phosphide and others. In one implementation, the index mismatch at the operating wavelength should be less than about 2% for optimal performance.

The optics module may be a fixed optics module, i.e., the relative positions of different optical elements within are fixed at predetermined distances. In one embodiment, the fixed optics module includes a light source, a collimator lens, an anamorphic prism, a front facet monitor, a polarization rotator, a data/servo detector, a relay lens, a galvanometer ("galvo") mirror, and a folding mirror for guiding a read/write beam to the flying head. The orientation of the galvo mirror is controlled to provide a fine positioning mechanism for precisely positioning the read/write beam to a desired point on the optical medium. In accordance with one embodiment, the galvanometer may have a compact and improved Winchester flexure with two load points on a rigid stiffener to define a single axis of rotation that is close to the reflecting surface of the galvo mirror. One or more capacitive position sensors may be implemented in the galvanometer for position monitoring and controlling.

A passive thermal compensation scheme may be implemented in the fixed optics module to maintain an optimal focus. The thermal and mechanical properties of optics mounting devices supporting the optical train of the disk drive are carefully chosen with respect to one another to minimize the overall thermal variation of the optical train over a certain temperature range. In addition, various mounting techniques can be used so that thermal expansion of different parts of a device may cancel one another. Furthermore, optical component materials can be selected to minimize the overall thermal effect.

A rotary actuator may be used as a coarse positioning means for the optical disk drive although other positioning devices may also be used. The fixed optics module and the flying head are attached to an actuator arm of the rotary actuator. Hence, any user data sector on the optical medium may be addressed with a read/write beam by adjusting the rotary actuator and turning the galvo mirror.

The optical medium can be writable/erasable materials (i.e., write-many-read-many), write-once-read-many materials, and read-only materials. Preferred writable/erasable materials are the magneto-optic type, including but not limited to, rare earth-transition metal compounds such as TbFeCo. According to one embodiment, a multilayer structure with at least one magneto-optic recording layer has a reversed layer construction compared to a conventional multilayer magneto-optic medium. A first top dielectric layer, a magneto-optic recording layer, a second dielectric layer, and a reflective substrate may be formed in sequence. This unconventional multilayer construction is for the first surface recording under the preferred near-field condition wherein the distance between the recording layer and the flying head is a fraction of the wavelength.

According to the invention, the optical medium may also have a plurality of recording layers in a multilayer construction. In one embodiment, an optical flying head having a hemispherical SIL lens may be operated within the focusing tolerance range to address any one recording layer, thus effectively increasing the areal data density of the medium. In another embodiment, an optical flying head having a hemispherical SIL lens may be operated in a hemispherical regime to address a first top recording layer and operated in a super-hemispherical regime to address a second recording layer in an optical medium. In this embodiment, the top recording layer forms part of the SIL. Switching between the two operating regimes may be accomplished by, for example, adjusting the position of the relay lens.

The multilayer structure of the medium can be configured for optimized signal detection by minimizing variations in the signal reflectivity and in compensating for variations in the flight height of the flying head. In one embodiment, a multilayer structure sequentially comprises a first dielectric layer with a high refractive index (e.g., SiN), a second dielectric layer with a low refractive index (e.g., SiOx), a magneto-optic recording layer, a third dielectric layer of a high refractive index, a reflective layer (e.g., Al), and a substrate which may be made of plastics, glasses or metals (e.g., Al).

A headerless magneto-optic disk format may be used with advantages in accordance with an embodiment. In one preferred wedge format, the disk includes a plurality of wedges intersecting all the tracks by "spoke" type wedge ID fields and the track numbers and wedge numbers are written along the radial lines at a fixed frequency on a magneto-optic disk and are independent of radial locations. Each wedge comprises a small ID field and a data field for storing the actual user data. The wedge ID field may be further partitioned into multiple sub fields including three gap fields of different sizes, one sub field for an automatic-gain-control field, one sub field for the sector/index address mark, one sub field for the track number, one sub field for the wedge number, and one sub field for the cyclical redundancy code to verify error-free readout of the track number and the wedge number.

One aspect of the invention is a disk cartridge with a self-cleaning mechanism based on electrostatic forces to remove contaminant particles from the disk surface. In one embodiment of the invention, a cleaning element is mounted on an interior surface of the cartridge facing a recording surface. The cleaning element includes a base with one end of a lightweight flexible tape fixed thereon. The tape may be made of a flexible electret polymer material capable of holding a high electric charge for a long period of time. The cleaning tape may also be self-charging by, for example, constructing the tape with two materials that, when rubbed together, generate equal and opposite charges. The tape may be made as strands or fibers to increase the rubbing surface area.

A disk drive may implement a disk cartridge carrier to minimize contamination by keeping a disk out of reach of a user at all times. A special box-like carrier is used to "lock" a cartridge therein when the disk is not in use. The carrier includes a door for loading and unloading the cartridge. A special docking system is implemented in the disk drive. This system keeps a cartridge from being in direct contact with any objects other than the carrier and the disk drive. In loading a disk, the carrier is temporarily docked to the drive. The carrier door is then opened and the cartridge is automatically removed from the carrier and transferred into the disk drive. At this time, the empty carrier can be removed from the disk drive. In unloading a disk, an empty carrier is temporarily docked to the drive. The docking system automatically transfers the cartridge from the disk drive to the carrier. The cartridge enclosed in the carrier is then removed from the disk drive. The carrier door remains closed and locked if the carrier is not docked to the disk drive.

A near-field lens in accordance with the invention may be implemented in a mastering station to reduce the track pitch since a numerical aperture higher than conventional lenses can be achieved with either a solid immersion lens or a graded index lens. A flying head with the solid immersion lens or a graded index lens is suspended over a photoresist layer coated on a glass mastering blank disk during a photoresist exposure.

The various optical storage systems in accordance with the invention can have many advantages over the conventional systems. For example, the use of a flying optical head to maintain focus through an air-bearing action of a slider mechanism can eliminate the focus servo electronics and lens actuator system in the conventional systems. The near field recording mechanism in accordance with the invention allows the numerical aperture of the focusing optics to be much greater than 1.0 and typically more than 2.0. This can be used to increase the data areal density by an order-of-magnitude over any optical storage system today despite the laser wavelength used.

In addition, one implementation of an optical storage system described herein may use a two-stage tracking system through the near-field optical head, allowing the use of a high bandwidth tracking galvanometer mirror. This type of optical tracking can be used to achieve greater than 100,000 tracks per inch, thereby providing much greater areal storage density than either conventional optical or magnetic storage systems in use today.

BRIEF DESCRIPTION OF THE DRAWINGS

These and other aspects and advantages of the present invention will become more apparent in light of the following detailed description of preferred embodiments thereof, as illustrated in the accompanying drawings, in which:

FIG. 1 is a block diagram showing a typical rewritable magneto-optic disk system in the prior art.

FIG. 2 is a block diagram showing a preferred optical rewritable storage system of the invention.

FIG. 3 is a schematic illustration showing one embodiment of a preferred optical flying head assembly with a super-hemispherical SIL.

FIG. 4 is a schematic illustration showing another embodiment of a preferred optical flying head assembly with a hemispherical SIL.

FIG. 5 is a schematic illustration showing one preferred molding method to form a SIL.

FIG. 6 is a schematic illustration showing another embodiment of a flying head assembly with a molded SIL.

FIG. 7 is a schematic illustration showing one embodiment of a preferred optical flying head assembly with a partial SIL in a substrate.

FIGS. 8A and 8B are schematic illustrations showing one embodiment of a preferred optical flying head assembly with a partial SIL formed on a substrate that has a mesa structure and a coil.

FIGS. 9A, 9B, 10A, 10B, 11A, 11B, 11C, 12A, 12B, and 12C are schematic illustrations showing examples of an optical flying head assembly with an integrated construction of a SIL, a slider, an objective lens, and a mesa structure.

FIGS. 13A, 13B, and 13C are schematic illustrations showing various embodiments of an optical flying head with a GRIN lens.

FIG. 14 is a schematic illustration of a flying head having a SIL integrated with a GRIN lens.

FIG. 15 shows a GRIN rod lens and a conventional lens combined to form an objective lens.

FIGS. 16A and 16B are a schematic illustration and a graph, respectively, showing the light apodization of a metallized slit on the mesa of a preferred flying head.

FIGS. 17, 18, and 19 are schematic illustrations showing various embodiments of an optical train using light-shifting devices for precisely positioning the read/write beam on an optical medium.

FIG. 20A is a schematic illustration showing another embodiment of the optical train using a galvo reflector for precisely positioning the read/write beam on an optical medium.

FIG. 20B is a schematic illustration showing an example of passive thermal compensation in an optical system according to an embodiment of the invention.

FIG. 21 is a schematic illustration showing a preferred rotary actuator holding a fixed optics module and a flying head with a galvo mirror for fine positioning.

FIGS. 22 and 23 show other examples of rotary actuators having fixed optics modules.

FIGS. 24A and 24B show a rotary actuator with a fixed optics module using a beam-shifting transparent plate for fine beam positioning.

FIG. 25 is a schematic illustration showing another embodiment of a rotary actuator with a fixed optics module using a micromirror device for fine positioning.

FIGS. 26A, 26B, 26C, and 26D illustrate a linear actuator and graphs showing the operation thereof for an optical disk drive according to an embodiment of the invention.

FIGS. 27A, 27B, and 27C are schematic illustrations showing one embodiment of a compact flexure galvanometer that may be used in embodiments of the invention.

FIGS. 27D, 27E, and 27F are schematic illustrations showing another embodiment of a compact flexure galvanometer that may be used in embodiments of the invention.

FIGS. 27G, 27H, and 27I are schematic illustrations showing one embodiment of a compact galvanometer with pivot support that may be used in embodiments of the invention.

FIG. 28A illustrates a typical structure of a conventional magneto-optic disk in the prior art.

FIG. 28B shows an example of the preferred multilayer structure for first surface recording in accordance with an embodiment of the invention.

FIGS. 28C-1, 28C-2, 28D-1, 28D-2, 28E-1, and 28E-2 show three configurations of a magneto-optic medium known as "magnetic super resolution medium" that can be used in accordance with an embodiment of the invention.

FIG. 28F illustrates a magnetic amplifying magneto-optical system and media that can be used in accordance with an embodiment of the invention.

FIG. 28G shows a modeled magneto-optic recording system for reading and/or writing to a multilayer magneto-optic medium in accordance with an embodiment of the invention.

FIGS. 28H and 28I are charts showing the magneto-optic signal and reflectivity as a function of the flight height for two exemplary film structures in accordance with an embodiment of the invention.

FIG. 29A is a schematic illustration showing one exemplar magneto-optic disk having a wedge format according to an embodiment of the invention.

FIG. 29B illustrates one preferred embodiment of the wedge format in accordance with an embodiment of the invention.

FIG. 29C is a schematic illustration showing another exemplar magneto-optic disk in a wedge format according to the invention.

FIG. 30A shows a disk drive system having two flying heads on two separated actuator arms attached to the same rotary actuator, one accessing the disk from the top surface and one addressing the disk from the bottom surface.

FIGS. 30B, 30C, and 30D illustrate an optical system capable of operating in both super-hemispherical and hemispherical regimes of a SIL so as to address either of two different recording layers in an optical medium.

FIG. 31 illustrates an optical system capable of operating in the hemispherical regime of a SIL to address any of two or more different recording layers in an optical medium based on the spherical tolerance.

FIGS. 32A and 32B show one embodiment of the preferred Self-cleaning removable cartridge.

FIG. 32C shows one example for mounting electret elements in the preferred self-cleaning removable cartridge.

FIG. 32D shows another embodiment of the preferred self-cleaning removable cartridge.

FIGS. 32E, 32F, and 32G illustrates the operation of an electret cleaning element.

FIG. 32H shows a self-cleaning removable cartridge with a disk having two recording surfaces and therefore two cleaning elements.

FIGS. 32I and 32J show examples of a self-cleaning disk cartridge.

FIGS. 33A, 33B, and 33C are schematics showing an optical disk drive with a docking system for implementing cartridge protection carriers.

FIGS. 33D and 33E show one embodiment of the preferred cartridge illustrating two positions of a rotating door.

FIG. 33F is a schematic illustration of a first embodiment of the smart cartridge carrier in accordance with invention.

FIGS. 33G-1 and 33G-2 are schematic illustrations of a second embodiment of the smart cartridge carrier in accordance with invention.

FIG. 33H is a schematic illustration of a first embodiment of the smart cartridge carrier in accordance with invention.

FIG. 34 illustrates an optical disk drive in a "clamshell" configuration.

FIG. 35A is a block diagram showing a typical signal path of a magnetic hard disk drive and a differentiated signal from the drive head in the inserted graph.

FIG. 35B shows one embodiment of the preferred signal path of the magneto-optic disk drive.

FIG. 35C shows one exemplar of a magneto-optic signal path with a differentiator in the analog filtering block in accordance with one embodiment of the invention.

FIG. 35D is a block diagram showing a channel signal flow downstream of the pre-differentiator of the circuit of FIG. 35C.

FIG. 36A shows a disk drive with a rotary actuator arm having a single fixed optics module to support two flying heads.

FIG. 36B shows a disk drive with multiple rotary actuator arms, each having a single fixed optics module to support two flying heads.

FIG. 36C shows a use of a moving reflector in a fixed optics module and a prism for addressing two flying heads.

FIG. 36D shows a use of a beam splitter in a fixed optics module and a prism for addressing two flying heads.

DESCRIPTION OF THE PREFERRED EMBODIMENTS

One embodiment of an optical storage system configuration 200 in accordance with the present invention is shown in a block diagram of FIG. 2. An arrow line is used to indicate a communication signal by either optical or electrical carriers or both.

An optical storage medium 270 in the form of a disk or other format can be of a read-only type, or write-once-read-many type, or a write-many-read-many type. Data is spatially distributed and stored in the medium 270 through a predetermined encoding method. The medium 270 can be removable with a cartridge-type of protection housing and a respective load/unload system. Alternatively, the medium 270 can also be configured as a fixed medium such as a hard disk drive. A light source 210 produces a light beam at a wavelength to which the optical medium 270 is responsive. A beam relay system 220 shapes the beam in a desired spatial profile and delivers the beam with desired propagation characteristics to a flying read/write head 230. The flying head 230 further shapes and focuses the beam generated by the light source 210 onto the optical medium 270 to read and/or write data thereon.

Preferably, the flying head 230 and the optical medium 270 are positioned relative to each other so that the optical spacing therebetween is less than one wavelength of the light produced by light source 210. This is known as the "near-field" configuration. In particular, the optical spacing can be less than one half of the wavelength (e.g., about one sixth of a wavelength). An air-bearing surface is preferably implemented at the base of the flying head 230 to maintain a desired focus without conventional servo optics for focusing. Alternatively, a non-near-field configuration can also be used with the flying head 230, in which case the separation between the flying head and the recording layer does not allow efficient coupling of evanescent waves and thus a conventional servo focusing system is needed to directly focus the beam onto the recording surface.

The relative position and motion of the flying head 230 and the optical medium 270 are determined and controlled by both the position and movement of the flying head 230 and optical medium 270. In particular, an electrical-mechanical control 280 is used to control the position and motion of the optical medium 270. For example, a motorized spindle system can be included in the electrical-mechanical control 280 if the optical medium 270 is in a disk format.

The light beam incident on the optical medium 270 is reflected. In a recording operation, the reflected beam from the optical medium 270 is encoded with beam-tracking information. In a readout operation, the reflected beam usually is modulated with both tracking information and the data stored on the optical medium 270. The reflected beam from the optical medium 270 is received by the flying head 230 and routed to a detection system 240 that includes photodetectors for both data extraction and beam tracking.

Recording data onto the optical medium 270 can be done by either modulating a writing beam via an optical modulation including beam intensity, phase, and polarization either at the light source 210 or at the beam relay system 220, or directly modulating the state of the optical medium 270 through thermal or electromagnetic methods.

A main electronic control 202 is preferably implemented to monitor and control all components and subsystems. A user interface 204 includes, but is not limited to, a computer keyboard, a display, electrical and mechanical switches and control buttons.

The above system components and operation thereof are now described in detail with reference to various specific embodiments. It should be understood that these embodiments are only intended to be examples for illustrating the present invention and the limitations that these embodiments may have should not be construed as limitations of the invention.

Flying Head for Near-Field Recording and Reading

1. Optical Assembly

Optical data storage systems are known for their high data density. However, unlike magnetic recording wherein data density may be limited by the size of a magnetic domain, the density of optical recording may be limited by the beam size on the optical medium. The smallest beam size that can be achieved through focusing is usually diffraction limited to about the dimension of the wavelength. Therefore, it is desirable to use a light source with a short wavelength and to focus the beam as small as possible within the diffraction limit. For a given wavelength, the focused beam size can be reduced by increasing the numerical aperture ("NA") of a focusing optical element (e.g., an objective lens assembly). In the present invention, one preferred approach to achieve a large numerical aperture in the flying head is by combining a solid immersion lens ("SIL") having a high index of refraction with an objective lens. Another preferred approach is to use a graded index lens ("GRIN lens") or a "Gradium lens".

Another issue in optical storage system is maintenance of the optimal focusing of an optical beam on the optical medium. In contrast to conventional active focusing servo systems, the preferred embodiments of the invention employ a near-field recording configuration of the flying head for automatic optimization in focusing. This is done, at least in part, for example, by "suspending" the flying head over the optical medium at a constant distance through an air-bearing surface, and in part by implementing a slider system to integrate the objective lens and SIL or GRIN lens in the flying head.

(1) Flying Head with Solid Immersion Lens

FIG. 3 shows one embodiment of the optical portion of the flying head in accordance with the invention. A head 300 is shown located generally adjacent to an optical recording medium 302, e.g., an optical disk in a disk drive. In this position, the head 300 may be reading data from or writing data to the optical medium 302. In general, the optical medium 302 can be in any format including disk or tape. The disk format will be assumed in the following description as an example.

The head 300 is shown as having constituent optics together with the slider 310. The slider 310 has a top surface 312, a channel surface 314, and air-bearing surfaces 316. These air-bearing surfaces 316 can be designed to ride at a predetermined height above the optical disk 302 while the disk 302 is rotating at a specific speed. By virtue of being carried by the air-bearing surfaces 316, the head 300 can also ride at a predetermined height with respect to the disk 302.

The distance between the head 300 and the disk 302 can be quite small. The head 300 can operate in the "near-field" regime wherein the spacing between the head 300 and the disk 302 is less than the wavelength of the illuminating radiation and the numerical aperture of the entire lens system is greater than unity.

The constituent optics may include a reflector 320, an objective lens 330, and a solid immersion lens (SIL) 340. Each of these may be mounted to the slider 310. The SIL 340 can be substantially or entirely contained within the slider 310. The objective lens 330 is mounted onto or near the top surface 312 of the slider 310 to focus the incident electromagnetic radiation, such as a laser beam, onto the SIL 340. An optical clear path 350 is provided between the SIL 340 and the objective lens 330 so that the electromagnetic radiation may be effectively transmitted from one to the other and back again. The optical clear path 350 can include any optically transparent material, and may be air, glass, optically clear plastic, and so on.

The electromagnetic radiation traveling through the optical clear path 350 can be incident on the partial spherical surface 342 of the SIL 340. The SIL 340 can be a single partial sphere or a lesser portion of a partial sphere plus a flat plate. The SIL 340 generally has a spherical surface 342 which constitutes the partial spherical portion and a flat portion 344, which may be a flat surface or a flat plate. These two surfaces, 342 and 344, may be entirely contained within the body of the slider 310. The flat portion 344 may be generally co-planar with the air-bearing surface 316. The flat portion 344 may also be in the vicinity of the air-bearing surface 316 and preferably parallel thereto. For a hemispherical SIL, the "vicinity" may be about the range of the dimensional tolerance of the hemispherical SIL, which may be about tens of microns for a typical hemispherical SIL used in the present invention. For a super-hemispherical SIL, the "vicinity" may be about less than approximately 1 micron. Such geometry can assist the flight of the head 300 over the disk 302, and forms part of the total slider-air bearing surface.

At least two versions of the SIL may be used in the present invention. An embodiment using a super-hemispherical SIL 340 is shown in FIG. 3, and an embodiment using a hemispherical SIL 440 is shown in FIG. 4.

The hemispherical SIL 440 is shaped as a hemisphere and has a flat portion 444 which can wholly contain at least one diameter of the partial spherical section. The super-hemispherical SIL 340, on the other hand, referring back to FIG. 3, is a truncated sphere. The flat surface 344 of the super-hemispherical SIL 340 contains no complete diameters of the spherical section although it may intersect at least one diameter at one point. This constitutes a hemisphere plus a "zone of a sphere", where the latter is defined as the portion of a sphere contained between two parallel planes, both intersecting the sphere. Hence, it is termed a "super-hemisphere".

The total thickness of the super-hemispherical SIL is fabricated to be between the radius of the partial spherical section, r, and $r(1+1/n)$, where n is the index of refraction of the constituent material of the super-hemisphere.

Any SIL dimensioned between and including r and $r(1+1/n)$ may be used. The choice of such a thickness results in a properly focused spot on the base of the SIL. If a partial sphere thickness of less than the desired SIL thickness is used, the amount by which the thickness of the SIL is less than that required can be made up by an equivalent optical thickness of a glass plate or mesa formed at the bottom of the SIL, the formation of which is described below.

For a hemispherical SIL lens, the radius of the spherical surface may be less than a desired radius r by a tolerance range d. Hence, a hemispherical SIL lens can function properly if the SIL dimension is (r−d). For example, the spherical tolerance range d may be about 50 µm for a SIL.

The thickness of either SIL type is also dependent on the index of refraction and thickness of any transparent medium top coatings between the bottom surface of the SIL and a recording or readout layer on the disk. Such coatings may typically be protective dielectric layers such as a silicon nitride layer. A lubricant layer may also be added.

The SIL can be manufactured to have a slightly larger thickness than noted above. In this way, upon installation of the SIL and substrate into the slider, the flat portion of the SIL may be lapped or grinded to make the bottom of the SIL, which may be a mesa, coplanar with the air bearing surface of the slider. Then the total thickness would be approximately the desired SIL thickness. The amount of SIL that is grinded may be, for example, two to ten microns in some devices based on the invention.

The SIL 340 or 440 focuses the laser beam in the near vicinity of flat portion 344 or 444 as previously described. For convenience, the discussion below is directed to the super hemisphere SIL 340 of FIG. 3, although the same statements may be made for the hemisphere SIL 440 of FIG. 4.

Referring to FIG. 3, converging rays from the objective lens 330 enter the partial spherical surface 342 of the SIL 340. Placement of the SIL 340 in the system then can focus the spot in proximity to the flat bottom portion 344 of the SIL 340. This is because the incoming converging rays from the objective lens 330 are refracted at the surface 342 of the partial spherical lens section, which can result in an increased effective incident angle. This can lead to an increase in the effective numerical aperture of the head 300. In a hemispherical SIL 440, the increased effective numerical aperture can rise with the refractive index, n, of the SIL. In a super-hemispherical SIL 340, the increased effective numerical aperture can rise as $n^2$.

The inventors discovered that a combination system having a hemisphere SIL lens embedded in an objective lens-slider system has a depth of field substantially equal to the depth of field of the objective lens alone. This is in contrast to many conventional optical systems in which an increase in the numerical aperture usually results in a reduced depth of field.

The focused beam thus converges near the flat portion 344 of the SIL 340. The disk 302 is located less than a wavelength away from the flat portion 344 of the SIL 340 in the near-field situation. In this way, the evanescent waves of the incident wave may couple the optical energy at the small focused spot near or on portion 344 of the slider surface to the disk 302. These evanescent waves generally extend a distance less than a wavelength from the flat portion of the SIL 340 before being significantly attenuated. In the case where the near-field situation is not used, i.e. where the total numerical aperture is less than unity, the disk 302 may be further from the flat surface of the SIL with a distance generally larger than a wavelength. In such a non-near-field configuration, a focusing servo system may be desirable to maintain focusing of the read or write beam.

Because the objective lens 330, the optical clear path 350, and the SIL 340 can all be mounted to the slider 310, they can be stationary with respect to one another. Therefore, a beam which is focused can be so maintained as long as the distance between the SIL 340 (or any other component of the head 300) and the disk 302 is maintained constant. This last condition may be met if the disk 302 rotates at a desired operating speed and the air-bearing surfaces 316 function properly. Therefore, there is no need for active focusing, as a proper focus can be maintained automatically because of the geometry of the system.

occasionally it may be desirable to tilt the properly focused beam to one side or the other in order to write to or read from a track adjacent to the one directly under the untilted beam. This tilting of the beam can be performed by a turning mirror such as a galvanometer. The tilted beam can pass unhindered to the disk through the objective lens 330 and the SIL 340. There is also occasionally the need to better guide the laser beam into the objective lens 330 on the slider 310. To accomplish this, a reflector 320 may be located above the objective lens 330, but still coupled to the slider 310, to guide the beam into the objective lens 330. This reflector 320 may be, e.g., a mirror or prism. The reflector 320 may alternatively be mounted on an arm tied to the coarse actuator. Those aspects will be described in more detail in other sections below.

FIG. 5 shows an embodiment of a SIL formed with a molding system. The structure of the optical assembly for the SIL and a processing method thereof are disclosed as follows. An optical assembly 500 includes a substrate 502 which is placed in an injection molding system having a top mold 520 and a bottom mold 522. The top mold 520 may have a dimple 521 with a partial spherical shape. The bottom mold 522 can have a tapered mold section 523 leading to an injection port 524.

The substrate 502 which may be used in the mold is often made of silicon, but may alternatively be made of glass and other materials that are hard. The substrate 502 can have an air-bearing surface etched, ion-beam milled or machined thereon. A tapered hole 504 is formed in the substrate 502. The shape of tapered hole 504 may be conical, pyramidal, frustal, as well as other shapes allowing a tapered beam to pass.

In the method, a transparent material is injected into the space formed by dimple 521 and tapered hole 504. This material may be any of the types commonly used in injection molding, and is usually glass or plastic. The material is usually injected through injection port 524, but may also be injected from ports at other locations. Upon hardening, this material assumes a shape of a SIL 510, having a curved portion 512, a flat portion 514, and a tapered portion 516. The shape of the tapered portion 516 in the SIL 510 may be conical, pyramidal, frustal, etc.

When a storage system according to the invention is operated in a phase-change media recording mode, or if only reading is required, no further modification is necessary. In more common modes of magneto-optical recording, a magnetic coil is used to produce a desired magnetic field for recording. For this embodiment and those following, a magnetic coil may be added to the assembly as described below. The magnetic coil may be protected with a coating that may be electrically insulating and which has a good thermal conductivity and a desired hardness to reduce wear. Examples of this coating material include, but are not limited to, SiN, alumina, photoresist, and polymers.

A magnetic coil 530 may be mounted to the substrate 502 in a manner as shown. The magnetic coil 530 is often mounted to the substrate 502 prior to the introduction of the substrate 502 in the mold. A magnetic coil 530 may also be placed in the substrate 502 after the molding of the SIL 510. Once the SIL 510 is formed and the magnetic coil 530 is mounted to the substrate 502, an optical assembly 500 may be installed in a slider for use, for example, in a disk drive, as described below.

Another processing method of making an optical assembly for a SIL similar to the assembly 500 in FIG. 5 is illustrated in FIG. 6. A SIL 602 is pre-formed before it is placed in a hole 604 in a substrate 606. In this embodiment, the SIL 602 is separately formed by, for example, grinding, machining, lapping, or by a separate molding operation.

In this embodiment, a magnetic coil 610 can be pre-mounted to the substrate 606 or mounted after the introduction of the substrate 606. The coil 610 can be planar and is approximately concentric with the hole 604 in the substrate 606. The SIL 602, installed in the hole 604, may protrude through the plane of the coil 610. Once assembled, the optical assembly 600 may be installed in a slider.

Referring to FIG. 7, yet another embodiment for a SIL assembly includes a partial SIL 702 initially mounted to a substrate 710 having a hole 712. In this embodiment, the partial SIL 702 is separately formed by, for example, grinding, machining, lapping, or by a separate molding operation. This partial SIL 702 generally covers one side of the hole 712 in the substrate 710 and may overhang the edge of the substrate 710. Liquid glass, plastic, or other such material having a high index of refraction is then injected into the space formed by the hole 712 and the partial SIL 702. The index of refraction of the injected material is preferably similar to that of the partial SIL 702. Specifically, the index mismatch at the operating wavelength should be typically less than about 2% for optimal performance at a minimized spherical aberration. A magnetic coil 720 may be mounted on the substrate 710 either before or after the material is injected. The combination of the partial SIL 702, the injected material, the substrate 710 and the coil 720 forms an optical assembly 700.

Referring to FIG. 8A, yet another embodiment includes a partial SIL 802 and a substrate plate 804 on which the partial SIL 802 is mounted. The substrate plate 804 may be made of a glass-type material or other transparent material. The substrate plate 804 is attached to a mesa-like structure 806 that is made of a transparent material. The mesa 806 may alternatively be formed from a portion of the substrate plate 804. The mesa 806 may be employed to act as the lower section of the SIL. A complete SIL is thus formed from the partial SIL 802, the substrate plate 804 and the mesa 806. The complete SIL so formed can be either a hemisphere or super-hemisphere. The use of the mesa 806 allows for the removal of part of the SIL because the refracted light does not extensively use the lower periphery of the SIL. More room can thus be gained for the placement of a magnetic coil 808.

For convenience in a particular setup, the coil may be fabricated and installed away from the surface of the mesa 806 to reduce the total air bearing surface of the slider. In another implementation, the coil may be installed such that the plane of the coil is perpendicular to the plane of the disk. In this case, a device such as a permanent magnet or an electromagnet of proper geometry may be used to rotate the field around a 90° angle so that the field can again couple to the disk.

The mesa 806 can be formed in several ways from the substrate plate 804 which has approximately the same index of refraction as the partial SIL 802. The index mismatch at the operating wavelength is typically less than about 2% for optimal performance. For example, the substrate plate 429 can be made of glass and have a section removed by grinding to form the mesa 806. In another method, a glass substrate plate 804 can be etched or ion-milled, with the non-etched portion or the less-etched portion leaving the mesa 806. In a third way, a glass plate 804 can be appropriately masked, and the mesa 806 can be deposited onto the glass plate 804 by various deposition methods including sputtering, evaporation, etc. In a fourth way of fabricating a mesa 806, a mold may be used which simultaneously forms the partial SIL 802, the mesa 421 and also optionally forms the glass plate 804. In any case prior to or after the formation of the mesa 806, the partial sphere 802 may be mounted to the glass plate 804 by appropriate bonding techniques.

FIG. 8B shows that the magnetic coil 808 encircles the mesa 806. This magnetic coil 808 may be formed by, for example, deposition or plating before or after the mesa 806 is formed. The magnetic coil 808 may be of various shapes, for example, rectangular, circular, octagonal, etc. The coil 808 may have various numbers of turns. Two or more layers of connected coils may also be implemented in the coil 808.

An alternative way to form a coil in the flying head includes a separate coil which is formed on a thin film. A thin film magneto-optic coil can be fabricated on a thin membrane substrate such as SiN. This micro-coil may be plated or sputtered onto a thin membrane which is temporarily supported by a thick substrate such as silicon. The thin film has a hole etched or cut through its thickness. The center of this hole is approximately in the same location as the coil center. The thin film may be removed from the thick substrate and mounted to the flat portion of the SIL lens using various bonding techniques such as various adhesives. If a mesa portion is used in this embodiment, the mesa may protrude through the hole in the thin film and the magnetic coil.

The inventors also contemplate that at least part of the SIL assembly can be formed as part of the slider. Several exemplar configurations are disclosed as follows.

FIG. 9A illustrates a first example 900 in which a slider 910 has an integral mesa 922 formed on a channel surface 914. The slider 910 is made from a clear material such as glass or plastic using processes such as machining, grinding, injection molding, etc. A void 916 is removed from a top surface 918 of the slider 910. A partial SIL 920 may be installed in the void 916. Therefore, a SIL assembly, either in hemispherical form or super-hemispherical form, is formed by the combination of the partial sphere 920, the slider body 910 and the mesa 922. An objective lens 930 may be mounted on or near the top surface 918 of the slider 910 with respect to the partial SIL 920.

FIG. 9B shows an alternative way of forming a mesa in the example of FIG. 9A. A transparent slab 940 (e.g., glass) is placed on a projection 942 which extends from channel surface 914 of a slider 910. The slab 940 has a mesa 944 formed thereon as described above. A magnetic coil 912, adjacent to the mesa 944, may also be part of the slab 940. The coil 912 may be deposited, plated, or bonded adjacent to the mesa 944.

A second example of an integrated slider and SIL is shown in FIG. 10A. A slider 1010 has an integral partial SIL 1012 formed in a void 1014 on a top surface 1016 of the slider 1010. The partial SIL 1012 and slider 1010 may be formed by, for example, injection molding, machining, or grinding. An integral mesa 1018 is formed on a channel surface 1019. The complete SIL is formed by the combination of the partial SIL 1012, the slider 1010 and the mesa 1018. An objective lens 1020 may be mounted on or near the top surface 1016. This complete SIL may be hemispherical or super-hemispherical. In addition, a coil 1030 may be formed around the mesa 1018.

FIG. 10B shows another way of forming the mesa structure in the second example. A transparent slab 1040 (e.g., glass) is placed on a projection 1044 which extends from the slider 1010. The slab 1040 has a mesa 1042 formed thereon as described above. A magnetic coil 1030, adjacent to the mesa 1042, may also be formed on the slab 1040. The coil 1030 may be deposited, plated, or bonded adjacent to the mesa 1042.

The above described embodiments for the flying head assembly employ integration of various components to achieve good stability. The SIL lens is sealed and thereby is free of contamination.

The inventors further devised two other flying head configurations that may be especially suitable for mass production while still offering good device integrity and performance.

FIGS. 11A–11C show different views of a first preferred flying head configuration. Referring first to FIG. 11A, an objective lens 1102 and a SIL cap lens 1120 are positioned relative to each other at a desired distance. A typical spacing between the objective lens and the SIL lens is about 0.1 mm for an SIL lens with a radius of about 1 mm and an objective lens with a clear aperture of about 1.6 mm. The SIL cap lens 1120 is laminated to a transparent base plate 1140 with an optical UV epoxy layer (not shown). A spacer 1130 having a void area that is larger than the SIL cap lens 1120 is adhered to the base plate 1140 with the optical UV epoxy layer (not shown) in a way so that the SIL cap lens 1120 is enclosed in the void area of the spacer 1130. The thickness of the spacer 1130 is preferably at least the height of the SIL cap lens 1120. A SIL lens having a radius of curvature of about 1.0 mm can provide about 0.1 mm air gap between the two lenses. The objective lens 1120 is then adhered to the spacer 1130 with an epoxy, for example, by using two adhesive points 1110. A mesa 1150 may be formed by etching or by ion-milling the base plate 1140 or by laminating a pre-formed mesa onto the base plate 1140. The depth of this mesa 1150 is typically about 5–20 μm depending on the number of layers in the coil and the distance from the bottom of the mesa 1150 to the first coil surfaces. The SIL lens is made up of the SIL cap lens 1120 and the slider/mesa body 1140 and 1150.

The SIL cap lens 1120 and the base 1140 are preferably made of materials that have similar indices of refraction (e.g., cubic Zirconia and Schott optical glass LaSF35). The optical UV epoxy used for laminating the SIL cap lens 1120, the base plate 1140 and the spacer 1130 can be, e.g., the Norland 61. The epoxy used at joint points 110 may be Norland NEA123, for example.

The desired distance between the objective lens 1102 and the SIL cap lens 1120 may be determined in an alignment process by maximizing an optical feedback signal. A head-lens-alignment station, for example, may be used for this alignment. The head-lens-alignment station has three translation stages to move an objective lens and a near-field lens (e.g., a SIL) with respect to each other so that both have the same optic axis and the spacing between them is adjusted to achieve a minimal beam spot on the center or in the vicinity of the exiting surface of the near-field lens. As described above, the "vicinity" may be different for a hemisphere SIL and a super-hemisphere SIL. The alignment station has a diode laser to produce a well-collimated beam for alignment. A reflected beam from the exiting surface of the near-field lens substantially traces the output beam from the laser if the objective lens and the near-field lens are aligned relative to each other. The reflected beam is coupled into the laser diode cavity thereby increasing the output laser power. Under a perfect aligned condition, the output power of the diode laser reaches a maximum value if the driving current for the laser diode is fixed at a constant. A back-facet detector or a front-facet detector with a beam splitter may be used to monitor the power of the diode laser. Relative positions of the objective lens and the near-field lens are adjusted to maximize the power of the diode laser.

FIGS. 12A–12C show a second preferred flying head configuration of the invention. The spacer 1210 is a ring instead of a plate with a void.

(2) Flying Head with Graded Index Lens

In addition to a SIL shaped lens to create the more finely focused spot that can evanescently jump the air gap to a closely spaced storage medium, it can be possible to use a Graded Index Rod (known as a GRIN Rod) to focus the beam of light within the rod. A GRIN Rod is made such that the glass rod has an index of refraction which changes radially in a predetermined manner from the center of the rod. A focusing GRIN rod should have an index of refraction that decreases with radius of the rod. One commercial GRIN optical material, Gradium® rod, has an index of refraction that changes along the optical axis. This type of lens can be used in practicing the present invention.

If the index decreases in a predetermined manner along the radial direction from the center of the lens, the GRIN lens can be used to focus a beam since the center portion of a wavefront going through the center of the lens has a greater phase delay than the peripheral portion that goes through the periphery of the lens.

A GRIN lens can also be made so that the index of refraction of the lens changes axially along the lens. The commercial Gradium® rod is an example of such material. The axial distribution of the index of refraction is generally combined with a convex spherical or aspherical entry surface such that a light beam inside the rod converges to a focus. If the lens is cleaved at the focus point and this cleaved surface is placed less than a fraction of a wavelength of light from an optical storage medium, the focused light at the flat, cleaved or polished surface of the GRIN lens can evanescently jump the air gap to the medium, as in a SIL lens. The numerical aperture of the focused light within the GRIN lens is dependent upon the input waveform of the light beam into the convex entry surface of the lens and the index of refraction of the lens itself.

FIG. 13A shows a flying head with a focusing GRIN lens with a radial distribution of the refractive index for the near-field optical recording and reading. A GRIN lens 1300 has one convex surface 1320 functioning as an objective lens and another flat end 1322 which acts as an air-bearing interface to an optical storage medium (not shown). The surface 1320 is designed so that an input beam is focused on or near the flat interface 1322. The objective surface 1320 is an integral part of the rod and can be a spherical or aspherical end surface.

A magnetic coil can be installed at the interface to the optical medium for a system which uses magneto-optical storage media. Two configurations are shown in FIGS. 13B and 13C as examples in which a mesa 1334 or 1362 is an integral part of the GRIN lens. FIG. 13B shows an objective lens 1310 combined with a GRIN lens 1330 with a radial distribution of the refractive index. FIG. 13C shows that a single GRIN lens 1360 with a radial distribution of the refractive index is used as the near-field lens. The GRIN lens 1360 has a flat entrance surface 1361 and the distance between the surface 1361 and the mesa 1362 is configured so that the beam is focused near or at the mesa 1362. A magnetic coil 1340 is installed adjacent to the mesa for producing a desired magnetic field on the optical medium. Alternatively, the mesa can be a separate piece attached to the interface of the GRIN lens similar to the structures shown in FIGS. 8A, 9B, and 10B.

A GRIN lens can also be used as the objective lens and combined with a SIL to form a single piece near-field optical head. One example is shown in FIG. 14. A GRIN lens 1410 preferably has a spherical top 1412 which functions as an objective lens. Alternatively, a flat or aspherical top can also be used. In addition, a GRIN lens can also be combined with a separate lens or fabricated as a single piece to form an objective lens as shown in FIG. 15. The bottom spherical cavity is then formed in the bottom portion of the GRIN lens 1410. A high index SIL lens 1420 with a spherical top (hemisphere or supersphere) that is preferably conformal with the spherical cavity is bonded or glued inside the spherical cavity of the GRIN lens 1410. Other methods of forming the SIL 1420 can be used such as grounding or molding depending on the materials used for the SIL 1420. The refractive index of the SIL 1420 should be higher than that of the GRIN lens in order to further increase the effective numerical aperture of the system for a small focused beam size.

A GRIN lens having an axial distribution of the refractive index, such as a Gradium® rod, can be used to replace the above GRIN lens with a radial index distribution. However, an objective lens or a curvature entrance (spherical or aspherical) is needed.

The lens assembly shown in FIG. 14 has several advantages, including mechanical stability and robustness, and immunity to dust and other contamination.

A mesa and magnetic coil can be formed on or near the flat bottom of the SIL 1420. Various configurations can be used as described thereabove.

2. Optical Materials for Near-Field Lens of Flying Head

A number of materials can be used for making the SIL or GRIN lens in accordance with the invention. Some of these have been described above. In general, a high index of refraction is desirable to achieve a small focused spot. Examples of such high index and optically transparent materials include, but are not limited to, cubic Zirconia, Schott glass LaSF35, Hoya glass TaFd43, Cleartran, Zinc Selenide, Gallium Phosphide.

In particular, the inventors discovered that cubic Zirconia can be made transmissive from the infrared to the far ultraviolet. Measurements performed by the inventors showed a transmission over 95% in cubic Zirconia at least from about 250 nm to over 2 $\mu$m. The good transmission of cubic Zirconia achieved from the blue to the far ultraviolet spectrum is of great interest for optical recording, optical mastering, and photolithography for high feature densities. This optical property and the high index of refraction of cubic Zirconia make it a preferred material for the near-field lens in accordance with the invention.

The following factors may be considered in choosing a suitable material for a near-field SIL or GRIN lens: index of refraction, moldability, machinability, and material hardness. The material hardness is important since the bottom of the lens is normally part of the air bearing slider surface and must withstand possible contact with the recording medium during shock and vibration. Further, the material should have the desired transparency at the optical wavelength of choice. Of course, the transparency changes depending on the wavelength.

The mesa ideally should be the same material as the SIL. If it is a different material, the optical performance may be compromised if the indices of the materials are also different.

In addition to cutting, grinding, polishing, and molding, the spherical shape SIL lenses can also be fabricated by a photolithographic, or an etching, or ion-milling process to form a high-quality SIL lens. This type of process has an advantage of making a large amount of high-index SIL lenses (e.g., many thousands) in parallel in an array process.

3. Magnetic Coil for Magneto-Optical Recording Media

For a system using a magneto-optic recording material, it is desirable to produce a magnetic field having a component perpendicular to the recording layer at the location where the light beam is focused. A coil can be used for generating this magnetic field. A large coil is undesirable for high frequency recording, at least in part, due to the large coil inductance that prohibits changes of current therein at a desired high data rate (e.g., higher than 100 MHz).

The optical beam at the exit of the flying head is tightly focused, and may be for example in the submicron range. Therefore, the bottom flat surface of a near-field lens can be etched, ion-milled or cut away to form a mesa-like structure or a tapered bottom can be used to allow a small coil to be formed about the focused beam. Formation of a mesa also reduces the weight of the flying head.

The mesa and the coil can be integrated with the near-field lens in the flying head in a number of ways. Several preferred embodiments have been disclosed hereinabove, for example, see FIGS. 8A, 9, 10, and 13B. Various shapes of a mesa can be used to fit the requirements of an application.

(1) Rectangular. This may be the optimal shape, since it allows a remote beam steering device, such as a galvanometer, to access multiple tracks without the necessity for moving the head. Generally, one wants the width of the rectangle to be narrow to make the MO⁻ coil more efficient, but the length of the rectangle must be long enough to include the field-of-view of the near field lens so that the maximum tracking range is available by steering the beam along the length of the rectangle. This rectangle length is positioned in the head so that it is perpendicular to the track direction.

(2) Mesa shapes such as a circle, oval, diamond, triangle, square, or other shapes may be used, but these are generally not the shapes that allow for the optical beam to be scanned across tracks for tracking and still have a narrow mesa as desired for an efficient coil design.

(3) Thin slit. A very thin slit smaller in width than the total width of the focused spot at the bottom of the near field lens may also be used. This can be a very narrow mesa, which is generally impractical for manufacturing, or it could be a more conventional rectangular mesa, with the bottom of the mesa metallized so as to create a very narrow slit for the focused optical beam to pass though. This mechanical limiting of the beam width is known as apodization. It is desirable in the preferred system that the light width is limited in a dimension along the track (i.e., parallel to the direction of a track) since the beam needs to be scanned across a track for tracking purposes. By apodizing the focused beam, a beam profile narrow along the track can be achieved, which allows for greater linear storage density both for writing to and reading from the storage medium. FIG. 16A shows a preferred metallized slit 1610 on the bottom of a mesa 1620 for light apodization. FIG. 16B illustrates how a focused beam with a Gaussian profile is spatially restricted or apodized upon exit of the metallized slit in a x-direction perpendicular to the slit 1610.

(4) Point. One advantage of a point-shaped mesa is a tightly formed coil would be possible, giving the best magnetic performance with the lowest coil current. A disadvantage to this point shaped mesa is that it would be very difficult to move the focused spot without moving the head, and the use of multiple lasers would also become technically difficult. Generally it is much easier to scan an optical beam at high bandwidth with a device such as a galvanometer than to move the entire read/write head in a mechanical type actuator.

The mesa section of a near-field lens needs to be thick enough to allow for a planar coil having one or more turns. It is also useful for the mesa to extend below the level of the coil. Otherwise, the coil will interfere with the air bearing surface of the air bearing slider. However, the mesa should not be too thick such that it will clip (e.g., cut off or obscure) the outer edges of a beam from the near-field lens with a high numerical aperture.

Multiple layers of coils may be used to increase the magnetic efficiency. The typical magnetic field to change the magnetic state of the magneto-optical medium is approximately in a range from 80 to 300 Oersteds.

Optical Train

1. Optical Train with a Beam Shifting Element for Tracking

Referring back to FIG. 2, an optical beam from a light source 210 is directed to the optical storage medium 270 for reading and recording through a beam relay system 220 and the flying head 230. The light source 210, the beam relay system 220 and the flying head 230 form the main portion of the optical train in accordance with the invention.

FIG. 17 illustrates an example of an optical train in accordance with the invention. It should be noted that FIG. 17 only shows the optical relation of various components and does not necessarily represent the actual optical layout. In an optical storage system 1700 (e.g., a disk drive), an objective lens 1710 is used to focus a beam of light (e.g., a laser beam) upon a reflective data surface 1712 of an optical medium 1714 (e.g., a disk). The surface 1712 may either be the top surface of an optical disk or a lower surface thereof. A beam relay system 220 is used to govern where the beam appears on the surface 1712 (i.e., to guide the beam to a selected track). The beam relay system 220 includes a pivotally mounted parallel transparent plate 1706 for controlling an angle of incidence θ at which the beam passes through (or in the vicinity of) a front focal point 1709 of the objective lens 1710. A first angle of incidence θ is measured between an optical axis 1701 (coaxial with the objective lens 1710) and the beam. The optical axis 1701 passes through the transparent plate 1706. A beam substantially along the optical axis 1701 will be guided to be nearly normally incident at the reflective data surface 1712. Regardless of the first angle θ, the beam is substantially directed near the front focal point 1709 of the objective lens 1710 due to the action of an imaging lens 1708 located between the transparent plate 1706 and the objective lens 1710.

The beam is generated by an optics module 1702 having a light source (e.g., a laser) and collimating optics. The optics module 1702 projects the beam along an optical path that substantially follows the optical axis 1701.

The angular position of the plate 1706 controls a second angle of incidence φ measured between the normal to a surface 1705 of the plate 1706 and the optical axis 1701. When the second angle of incidence φ is near zero, the beam passes directly through the transparent plate 1706 which sets the first angle of incidence θ approximately equal to zero. When the second angle of incidence φ is non-zero, the transparent plate 1706 shifts the beam such that the beam exits the transparent plate 1706 and follows an optical path substantially parallel to the optical axis 1701 but shifted by a spacing h therefrom.

The imaging lens 1708 converts the distance h into an equivalent first angle of incidence θ. The imaging lens 1708 is preferably aligned coaxially with the optical axis 1701 and takes the beam from the plate 1706 and directs the beam to form the first angle of incidence θ. When the distance h is approximately zero, the first angle of incidence θ and the second angle of incidence φ are both approximately equal to zero. This can be readily understood from a relation between the first angle of incidence θ and the second angle of incidence φ by the following equation which is valid for small values of φ:

$$\theta = \left(\frac{t}{f2}\right) \cdot (\phi) \cdot \left(\frac{1 - \frac{1}{n}}{1 - \frac{1}{2}\left(\frac{\phi}{n}\right)^2}\right),$$

which is derived from a precise relationship for an arbitrary second angle φ given by the following equation $$\theta = \tan^{-1}\left[\frac{t}{f2}\sin\phi\left[1 - \sqrt{\frac{1 - \sin^2\phi}{n^2 - \sin^2\phi}}\right]\right].$$

Once the beam reaches and is incident upon the surface 1712, the beam is reflected and follows generally along the original optical path back to the optics module 1702. The optics module 1702 of FIG. 17 includes light source 210, detection system 240 and data output 250 (FIG. 2). Specifically, the optics module 1702 has data and servo detectors to decode the information provided by the reflected beam.

FIG. 18 further shows the optical train of FIG. 17, especially the beam collimation and focus. It also shows the actual beam path which is usually bent by a reflector 1802. The optical train preferably has a relay lens 1704 coaxially aligned with the optical axis 1701 to insure that a collimated beam generated by the optics module 1702 remains substantially collimated before entering the objective lens 1710. As described below, the transparent plate 1706 modifies a rear focal length f1 of the lens 1704 to create an effective rear focal length f1' which places the rear focal point of the lens 1704 at a point 1804 along the optical axis 1701. The imaging lens 1708 has a front focal point in the vicinity of the point 1804.

The transparent plate 1706 is preferably positioned between the two lenses 1704 and 1708. As shown, the transparent plate 1706 is positioned along the optical axis 1701 between the lens 1704 and the point 1804; however, the transparent plate 1706 may alternatively be positioned along the optical axis 1701 between the point 1804 and the imaging lens 1708.

The effective focal length f1' of the relay lens 1704 takes into account a refractive index n of the transparent plate 1706. The actual focal length of the relay lens 1704 is increased from f1 to f1'=f1+t*(1−1/n) for a small tilting angle φ where t is the thickness of the plate 1706.

The imaging lens 1708 collimates the beam from the optics module 1702 and directs the beam toward a mirror 1802 located above the objective lens 1710. A partially reflective (and partially transmissive) surface 1801 of the mirror 1802 directs the beam toward the front focal point 1709 of the objective lens 1710. The objective lens 1710 focuses the beam on the surface 1712 and receives the beam after reflection from the surface 1712. The rear focal point of the objective lens 1710 (located a focal length f4 from the objective lens 1710) is in the vicinity of the surface 1712. The optical axis of the beam, incident to the optical medium 1714, is substantially normal to the surface 1712. For purposes of properly focusing the beam upon the surface 1712 and guiding the beam through the front focal point 1709 of the objective lens 1710, for all values of the angle θ, the objective lens 1710 is separated from the imaging lens 1708 by approximately the rear focal length f3 of the imaging lens 1708.

The focal lengths f1 and f2 may be varied to de-magnify (or magnify) the size of the beam appearing at the objective lens 1710 and thus, to reduce (or increase) the desired aperture size of the objective lens 1710. For purposes of correcting for assembly tolerances, the relay lens 1704 and the imaging lens 1708 may be spaced apart slightly more than the sum of the two focal lengths f1 and f2.

In a practical implementation of the invention, the following parameters may be used. A preferred range for the thickness t of the transparent plate 1706 is from 2–6 mm. A preferred range of the focal length f2 of the imaging lens 1708 is from 6–20 mm. The angle of incidence φ has a preferred range of 2–5 degrees.

The optical train will not only maintain an optimal focusing so that the beam size on the medium is small and constant, but also has a tracking mechanism to direct the beam to the selected location of the medium and maintain the beam in the selected track. As described thereabove, the focusing of the beam on the optical disk is preferably achieved by using a flying head in a near-field recording configuration and by using an air-bearing surface to maintain a constant spacing (less than a wavelength) between the flying head and the surface of the recording medium. The system in accordance with the invention is nevertheless operable if the flying head is not in the near-field configuration. A focusing servo system is needed, however, to maintain the optimal focusing. Such a focusing servo system is well known in the art which implements, for example, a quadrant detector to sense changes of the beam shape of the reflected beam due to variations in focusing.

The tracking of the optical train shown in FIGS. 17 and 18 can be accomplished by changing the tilting angle φ of the transparent plate 1706. This shifts the beam in a parallel fashion which passes through the plate 1706, thereby resulting in a shift of the focusing location on the surface 1704 without substantially changing the focusing thereon.

A tracking detection and servo system is desirable. Preferably, this can be done by using a tracking error detector in the optical train to generate an error signal indicative of the tracking deviation of the beam on the storage medium. Spatially distributed flags or continuous tracks/grooves of a mechanical, optical and magnetic nature can be implemented in the storage medium to produce tracking signals in the reflected beam received by the flying head. This tracking error signal is then used to change the optical path in the optical train so that a desired tracking is maintained. For example, a bi-cell detector 1804 can be mounted on the back of the reflecting mirror 1802 behind the reflecting surface 1801 (which is partially transmissive) to monitor the tracking position of the beam on the surface 1712 of the storage medium 1714. A galvanometer motor (not shown) may be used to pivot the transparent plate 1706 for controlling the tilting angle φ according to the tracking error signal from the bi-cell detector 1804.

Other beam-shifting elements may also be used in place of the parallel plate. FIG. 19 shows another embodiment using a dove prism 1910. A linear actuator 1920 replaces the galvanometer motor and positions the dove prism 1910 along a translation axis 1930 which is perpendicular to the optical axis 1701. The dove prism 1920 is oriented such that movement of the dove prism 1920 along the translation axis 1930 varies the distance h and thus, the angle of incidence θ.

2. Optical Train with a Reflector for Tracking

A motor controlled reflector can be used to rotate the beam from the light source with respect to the objective lens in the flying head. This can change the position of the focused beam on the optical medium. FIG. 20A shows one exemplary optical train 2000 linking the optical module 1702 to an optical medium 1714.

A light source (e.g., a laser) 210 emits a light beam that is corrected and collimated by a first optical element 2004 and a second optical element 2008. Reflectors 2020 and 2030 and an imaging lens 1708 direct the collimated beam to an objective lens 1710. The beam is then focused onto a surface 1712 of the optical medium 1714. The reflected beam from the optical medium 1714 is then received by the objective lens 1710 and sent back to the optical module 1702. A beamsplitter 2006 guides the reflected beam, at least in part, to a detection module 2010 having detectors for both data extraction and beam tracking.

A near-field recording/reading configuration with a flying head is preferably used to achieve automatic focusing. The beam tracking is done by a servo system using tracking error signals produced by the tracking flags or grooves in the optical medium 1714. A galvanometer motor 2022 can be used to control either reflectors 2020 or 2030 for beam tracking. FIG. 20A shows the galvanometer 2022 connected to the first reflector 2020 for beam tracking. Alternatively, the reflector 2030 can be adjusted for beam tracking.

Similar to tracking detection in FIG. 18, a bi-cell detector can be mounted on the reflector 2030 having a partially transmissive reflecting surface. The bi-cell detector detects the error signals which are used to control the tracking.

3. Thermal Compensation in Fixed Optics Module

The near-field recording configuration is a preferred operation mode for the system with a flying head in accordance with the invention. This eliminates the necessity of implementing a conventional focusing servo system. As described thereabove, the relative positioning of various optical components in the optical train is fixed since the optimal focusing is achieved by use of the air-bearing surface on which the flying head is supported. However, thermal expansion or contraction caused by variations in temperature may change the desired relative positioning, dimensions (e.g., the radius of curvature of a lens), and the refractive indices of the optical components and thus may adversely affect the performance of the optical system. Laser wavelength may also shift with temperature and can affect the performance as well.

It is therefore desirable to utilize the predetermined relative positioning and thermal-effected movements of the optical components and other parameters for compensating for the thermal effects. In general, two schemes of thermal compensation may be used in the preferred system of the present invention, active thermal compensation and passive thermal compensation. The former is well known to the art, wherein thermal sensors and active heating/cooling elements are used in combination with a servo system to actively maintain the temperature of a device at a predetermined temperature, thereby minimizing thermal effects. The inventors recognized that this active thermal compensation may be implemented in the preferred optical disk drive of the invention.

Alternatively, a passive thermal compensation scheme may also be used in accordance with the invention. In this scheme, the thermal and mechanical properties of the mounting devices supporting the optical train of the disk drive are carefully chosen with respect to one another to minimize the overall thermal variation of the optical train over a certain temperature range. In addition, various mounting techniques are used in this passive scheme so that thermal expansion of different parts of a device may cancel one another. Furthermore, in order to minimize the overall thermal effect, optical component materials are selected to have desired dimensions, refractive indices including their temperature dependence, and dispersion properties (i.e., index dependence on the wavelength).

FIG. 20B shows an example of a passive thermal compensation scheme for the fixed optical module in accordance with the invention. Lens cells holding two lenses in the optical train are fixed with adhesives at points A and B on a lens mount base plate. In this configuration, the position changes of the two lenses due to thermal effect are always in an opposite direction relative to each other. In particular, the change in the relative position of the two lenses due to temperature variation tends to negate the thermal expansion of the lens and the base plate. The refractive index, the thickness, and the radius of curvature of a lens may also change with the temperature. These factors should also be included in the passive thermal compensation.

For example, the lens and the base plate expand if the temperature rises. Since the first lens cell is fixed at point A, the thermal expansion of the first lens cell makes the first lens move toward the second lens. Similarly, the thermal expansion of the second lens cell makes the second lens move toward the first lens since point B is fixed. Therefore, the distance between points A and B increases due to the thermal expansion of the base plate but the distance between the two lenses is reduced by passively compensating for the thermal expansion of the base plate. The materials for the base plate, the lens mount base, and the lenses are selected to have desired thermal expansion coefficients. For example, the base plate may be made of magnesium and copper may be used to construct the lens cell. The locations of the lens cells on the lens mount (including the fixed positions A and B) and the positions of the lenses in the cells are also determined so that the relative positioning of the two lenses with respect to each other remains substantially unchanged or changes within a tolerance range of the optical system within a predetermined temperature range.

In the optical train using a galvo reflector 2020 shown in FIG. 21, a fixed optics module and a flying head are the two main components in the optical train. The fixed optics module includes a light source 210, a collimator lens 2112, an anamorphic prism 2114, a relay lens 1704, a galvo mirror 2020, an imaging lens 1708 and a folding mirror 2030. The flying head has an objective lens 1710 and a near-field lens (e.g., a SIL or a GRIN lens) fixed in a slider 2120. According to an embodiment of the invention, the passive thermal compensation may be implemented by not only compensating for the thermal effects in the fixed optics module and the flying head independently but also by compensating for thermal effects that affect the optical distance between the fixed optics module and the flying head.

In the fixed optics module, the following materials may be used for the passive thermal compensation: magnesium for the housing of the optics module 2110; LAF 81 glass for the collimator, relay and imaging lenses 2112, 1704 and 1708; and aluminum for the lens cells and mounts. The collimator lens 2112 has one end 2113 fixed by an adhesive as shown. Similarly, the relay lens 1704 is fixed at an end 2115 and the imaging lens 1708 is fixed at an end 2117. This configuration can be used to compensate for the thermal effects by the changes in the indices of the refraction of the lenses, changes in the relative positioning of optical elements, changes in the radius of curvature of the lenses and so on. For example, the arrows in FIG. 21 indicate the desired directions of thermal expansion of the three lenses as the temperature rises based on the passive thermal compensation. Similar techniques can be applied to the flying head for compensating for the thermal effects.

In case that the above passive thermal compensation could not be easily implemented in the flying head to compensate for the thermal shifts of the objective lens and the near-field lens, the fixed optics module can be over compensated in the positions, radius of curvature, and refractive indices of the collimator lens 2112, the relay lens 1704, and the imaging lens 1708 so that the thermal variations in the overall beam focusing and collimation remain within an acceptable range in the predetermined temperature range.

Preferably, a diode laser or a diode based compact laser is used as the light source in the fixed optics module. The laser wavelength of the diode laser can change with the temperature. This property of the laser, $d\lambda/dT$, can be measured. Since the refractive indices of the lenses vary with the laser wavelength, the change in the laser wavelength can change the beam focusing and collimation. According to the present invention, this can be passively compensated based on the known $d\lambda/dT$ of a laser within the predetermined temperature range of the passive compensation.

In addition, the inventors found that aging of the adhesives used in fixing the lenses 2112, 1704 and 1708 may alter the initial positions of the lenses. This can change the focusing distance between the fixed optics module and the flying head. Thus, the initial positions of the three lenses 2112, 1704, and 1708 are preferably chosen to be offset from the desired positions for optimal focusing so that the position shifts caused by the aging of the adhesives can reduce the offsets over time and the lenses eventually settle at the desired positions for optimal focusing at the flying head.

According to this embodiment, the passive thermal compensation is effective in keeping the variations in the focusing and the beam collimation within a tolerance range over a predetermined temperature range. In the above-described system shown in FIG. 21, the preferred temperature range is approximately from about 0° C. to about 75° C., which covers typical operating temperatures in many applications. If a diode laser is used as the light source 210 in the fixed optics module, the upper limit may be at about 65° C. since some commercial diode lasers may not function properly for continuous operation beyond 65° C. The tolerance range for the beam focusing or collimation may be under about 20% in variations of the focused beam spot size at the exit surface of the flying head. Preferably, this variation should be under about 10% to 15%.

Positioning Actuator for Flying Head

Several types of actuators can be used in accordance with the present invention to position the flying head over the optical medium at a selected location, two of which are described here: a rotary actuator and a linear actuator.

1. A Preferred Rotary Actuator with a Fixed Optics Module

FIG. 21 shows a rotary actuator system 2100 with a fixed optics module based on the optical train of FIG. 20A. A rotary actuator includes a hub 2109 and a rotary actuator arm 2104 substantially parallel to the surface 1712 and pivotally mounted to a drive base plate (not shown). The rotary actuator has a coil positioned to interact with a permanent magnet (not shown) fixed to the drive base plate (also not shown) for controlling movement of the arm 2104. The actuator arm 2104 laterally extends from the side of the hub 2109 to cantilever the optical head, including the slider 2120 and objective lens 1710, over the surface of the optical medium. The actuator arm 2104 provides a coarse positioning mechanism for moving the optical head to a desired point on the optical medium.

Based on the optical train shown in FIG. 21, the preferred system 2100 has an optical train with additional optical elements. An optics module 2110 is mounted on a portion of the actuator arm 2104. The optics module 2110 includes a light source 210, a collimator lens 2112, an anamorphic prism 2114, a front facet monitor 2116, a polarization rotator 2118, and a data and servo detector 2010. A light beam generated by the light source 210 is collimated by the collimator lens 2112 and the anamorphic prism 2114. The beam is guided by a galvo mirror 2020 in a galvo mirror assembly and a folding mirror 2030 to the objective lens 1710. The beam then passes through the relay lens 1704 and imaging lens 1708. The galvo mirror 2020 is controlled to provide a fine positioning mechanism for precisely positioning the read/write beam on a desired point on the optical medium.

All the optical elements in the optical train, including the optics module 2110, the relay lens 1704, the galvo mirror 2020, the imaging lens 1708, and the folding mirror 2030 are all secured to the rotary actuator arm 2104 and have a fixed spatial relation with one another. Thus, the above optical elements form a fixed optics module. The remainder of the optical train is the flying head which includes the objective lens 1710 which is part of a slider 2120 and is positioned to float over the surface 1712 via a resilient flexure 2130. As described previously, the slider 2120 has a SIL or a GRIN lens located between the objective lens 1710 and the optical medium.

Therefore, all the elements in the optical train have a predetermined spatial relationship with one another regardless of the position of the actuator arm 2104. As the arm 2104 rotates, all the optical elements of the optical train rotate accordingly. The coarse positioning of the flying head relative to the optical medium is done by rotating the actuator arm 2104; fine beam tracking is done by adjusting the beam with the galvo mirror 2020.

FIG. 22 shows another embodiment of a rotary actuator system for the optical train with a galvanometer reflector shown in FIG. 20A. The optics module 2001 is mounted on the rotary actuator away from the center of the hub 2109 and rotates with the arm 2104. A galvanometer 2240 is mounted on the rotary actuator. The reflective surface of the galvanometer mirror 2020 may be located near the pivoting axis of the galvanometer 2240 but may also be mounted elsewhere as shown FIG. 23. A predetermined spatial relationship is maintained between the optics module 2001 and the drive head 2120 regardless of the position of the arm 2104. For each position of the mirror 2020, a predetermined spatial relationship exists between the optics module 2001 and the mirror 2020 as the arm 2104 rotates. Therefore, by turning the mirror 2020, the galvanometer 2140 furnishes fine tracking of the beam communication between the optics module 2001 and the surface of the optical medium 2050. The coarse tracking of the beam communication between the optics module 2001 and the surface of the optical medium 2050, on the other hand, is furnished by the pivoting movement of the arm 2104.

FIG. 22 further shows that the rotary actuator arm 2104 is substantially parallel to the surface 1712 and is pivotally mounted to a drive base plate 2206. A coil 2208 is positioned to interact with a permanent magnet 2210 fixed to the drive base plate 2206 for controlling movement of the arm 2104. The hub 2109 is coaxial with the axis of the arm 2104, and the bottom of the hub 2109 is mounted to a cylindrical mounting tube which is secured to a drive base plate 2206. The actuator arm 2104 laterally extends from the side of the hub 2109 to cantilever the head 2120 over the surface of the optical medium.

FIG. 24A illustrates another rotary actuator system 2400 for the optical train shown in FIGS. 17, 18, and 19. This embodiment uses a beam-shifting element for tracking. The optics module 1702 is mounted on a portion of the hub that is opposite to the arm 2104. The relay lens 1704, imaging lens 1708, and mirror 1802 are all secured to the arm 2104. The objective lens 1710 is part of a slider 2120 of a flying head secured to the arm 2104 which is positioned to float over the surface 1712 via a resilient flexure 2130.

The orientation of the plate 1706 is controlled by the galvanometer 2240 which is secured to the arm 2104. The galvanometer 2240 has a galvanometer motor 2410 which pivotally positions the transparent plate 1706 about an axis that is substantially perpendicular to the surface 1712. As shown, the optical axis 1701 is aligned with a longitudinal axis of the rotary arm 2104; however, alignment with the longitudinal axis is not required. FIG. 24B is a side view of the system shown in FIG. 24A.

If a dove prism 1930 is used in place of the plate 1706, the galvanometer 2240 will be replaced with a linear actuator for shifting the dove prism 1930.

In another embodiment, as shown in FIG. 25, a micro-galvanometer mirror assembly 2510 (e.g., a Digital Micro-mirror Device (DMD) microchip mirror made by Texas Instruments) replaces the reflecting mirror 2030 of FIG. 20. In this embodiment, the galvanometer 2140 and its mirror 2020 are removed. Furthermore, the optics module 2001 is mounted on the hub 2109 in a manner diametrically opposed to the arm 2104. The optics module 2001 establishes beam communication with the drive head 2120 via the micro-galvanometer mirror assembly 2510. A partially reflective surface 2512 of the assembly 2510 directs the beam from the optics module 2001 to the flying head 2120. Because the surface 2512 is partially transmitting, a bi-cell detector 2530 mounted to the back of surface 2512 guides the beam to the partially reflective surface 2512 by providing feedback to a tracking servo loop (not shown). The tracking servo loop interacts with the assembly 2510 to turn the surface 2512 upon a pair of mutually perpendicular axes to precisely position the beam to a desired position on the optical medium.

2. A Preferred Linear Actuator

Another embodiment 2600 uses a linear actuator 2610 to replace the rotary actuator 2102. This is shown in FIGS. 26A to 26C. The optics module 1702 having the light source and detection module is not shown in FIG. 26A. In this embodiment, a distance $Y_{DIST}$ between the objective lens 1710 and the imaging lens 1708 is adjustable by the linear actuator 2610 rather than by being fixed in the system as with a rotary actuator.

In operation, the linear actuator 2610 moves the flying head 230 along the optical axis of the optical train to coarsely position the objective lens 1710 over a recording surface of the disk 1714. A change in the distance $Y_{DIST}$ can result in a displacement of the beam on the objective lens and thereby on the disk surface. This displacement further causes a beam walk-off on the servo detector on the optics module. The beam walk-off detected by the servo detector can be used to adjust the galvanometer or the linear actuator to restore the optimal focus of the beam.

An offset $X_{OFF}$ between an ideal lobe 2630 and an actual lobe 2620 observed by the servo detector in the optics module varies linearly with the position of the flying head 230 on the disk surface 1714 and linearly with the angle/position of the transparent plate 1706 if the offset is uncompensated. By knowing the disk radius where the flying head 230 is positioned and the position of the galvanometer 2140 (e.g., the angle θ as provided by a bi-cell detector), a tracking servo control loop may be used to compensate for the offset $X_{OFF}$ for all disk radii and beam angles (i.e., for all values of the angle θ).

FIG. 26B illustrates the beam offset $X_{OFF}$ that is seen on the servo detector. The reflected beam from the flying head produces a well-aligned beam spot 2630 on the servo detector if the optical train is optimally aligned. Otherwise, the reflected beam will produce a beam spot 2620 that is offset from the ideal position 2630. This offset can be compensated by, for example, either adjusting the distance $Y_{DIST}$ for a fixed position of the galvanometer as shown in FIG. 26C, or adjusting the tilted angle of the galvanometer for a fixed distance as $Y_{DIST}$ as shown in FIG. 26D.

3. Miniature Flexure Galvanometer

In the present invention, a galvanometer can be used to rotate a small mirror mounted thereon and thereby steer a laser beam for the purposes of writing and reading information on an optical medium. A galvanometer can also be used to rotate a parallel transparent plate to translate a beam for addressing different locations of the optical medium. Thus, precision in controlling the movement of a galvanometer can affect the precision of data addressing and recording.

Galvanometers are well-known devices that were originally used to measure electric current by use of meter movements. A typical galvanometer includes a coil of wire or a magnet in a magnetic field. The coil is usually suspended between two wires or thin resilient strips of metal (flexures) so that the coil can rotate about an axis defined by the wires or flexures. Galvanometers can also be made with bearings or pivots in additional to the flexure design.

Many prior-art flexure galvanometers are too large for use in various optical storage systems of the present invention. It is desirable to have flexures that are very compliant about one axis but very stiff about all others. Conventional flexures usually require a relatively long axial length to achieve the above desired mechanical property. However, space constraints in the preferred system of the invention make it difficult to use conventional flexures. Attempts to reduce the axial length often resulted in a galvanometer with a number of low resonance frequencies and multiple degrees of freedom. This can degrade the precision of the positioning of the galvanometer and thereby adversely affect the controlling of a laser beam.

Prior-art galvanometers with ball bearings are also too large to implement in systems of the present invention. Galvanometers having pivots add undesirable friction which affects the steering of a beam. Pivot-type structures also suffer significant wearing of parts.

The modern "Winchester" magnetic suspension is a simple, functional and reliable design. Winchester suspensions can be manufactured in a large quantity at low cost. The Winchester head is attached to a thin flexure (gimbal). The flexure is laser welded to a stiff load beam. The load beam (or the flexure) has a single load point with a spherical tip. The load point is near the center of the slider which is a small ceramic rectangle approximately the size of the present invention's galvo mirror. For proper operation, the Winchester head should be able to rotate freely about two axes (pitch and roll) and should be very stiff about the x, y axes and the yaw axis. The air-bearing surface from the disk can provide stiffness in z direction. These directions are illustrated in FIGS. 27A–27C. The conventional Winchester flexure has two degrees-of-freedom and obviously would not work as a suspension for a galvo mirror. It is hence desirable to have a compact flexure with a single degree of freedom for the galvanometer.

In recognition of the above, the inventors devised an improved Winchester flexure by implementing two load points on a rigid stiffener to define a single axis of rotation. This is accomplished by adding a second spherical tipped load point spaced apart from but in line with the first load point. The two load points allow the mirror to rotate only about the roll axis.

FIGS. 27A–27C illustrate a first embodiment of the flexure galvanometer. A flexure 2710 is fixed to a mirror plate 2702 at points 2716 by, for example, laser welding or bonding. Two ends 2715 of flexure 2710 are pulled in a tension with an assembly fixture and are fixed to a base or stiffener 2720 by laser welding or bonding at points 2714. A mirror 2704 is attached to the mirror plate 2702. The stiffener 2720 has two load points 2712 each with a spherical-type tip. One such load point is shown in FIG. 27B. These two load points 2712 define the rotation axis of the galvanometer. The prelocated tension in the flexure 2710 may be adjusted so that the force between the mirror plate 2702 and the load points 2712, for example, is approximately 1 gm at each load point. The stiffener 2720 is attached to a back ion 2730 by laser welding or bonding.

Referring to FIG. 27C, a coil 2740 is attached to the mirror assembly. A current change in the coil 2740 causes a change in the torque applied on the coil 2740 by a magnetic field generated by magnets 2750. This rotates the coil 2740 and thereby the mirror 2704.

However, in this embodiment, the rotation axis is not in the plane defined by the reflecting surface of the mirror. This may cause inconvenience in beam steering. FIGS. 27D and 27E show a second embodiment of the galvanometer which addresses this difficulty and allows the rotation axis to be close to or at the reflecting surface of the mirror. A flexure 2760 includes two thin strip flexures 2762 and a center flexure structure 2764 with an opening for positioning a mirror 2770. The center flexure 2764 is fixed, e.g., by laser welding or bonding, to a mirror plate 2702 at points 2765 that are symmetrically located on both sides of a rotation axis defined by the load points 2712 substantially along the thin strip flexures 2762. The ends 2715 of the flexure 2760 are pulled in tension by an assembly fixture and are fixed to a flexure plate 2711 at points 2714 by either laser welding or bonding. The flexure plate 2711 is then attached to a rigid frame 2766 (e.g., a steel tube frame). The tension in the flexure 2760 is adjusted so the force between the load points 2712 and the mirror plate 2702 is approximately 1 gm per load point. A beam director such as a mirror 2770 can be attached to the mirror plate 2702 and positioned in the opening of the center flexure 2764 of the flexure 2760. This allows the reflecting surface of the mirror 2770 to be substantially coplanar with the plane defined by the load points 2712 which defines the rotation axis of the center flexure 2764 of the flexure 2760. Although a diamond-shaped frame 2764 is illustrated in FIG. 27D, other frame shapes may be used as well, including but not limited to circular and rectangular shapes.

In the above two embodiments of the galvanometer, a coil 2740 is attached to the rotating mirror assembly while the magnets 2750 are stationary. Alternatively, magnets can be attached to the rotating mirror assembly and a fixed magnetic coil can be used. In general, materials for the flexures can be thin metals with a high tensile strength such as stainless steel (e.g., 300 series) and beryllium copper sheets. Etching may be used to obtain desired shapes from stainless steel. Different parts of a flexure made from beryllium copper can also be soldered together.

In accordance with the present invention, one or more capacitive position sensors can be implemented in the galvanometer for position monitoring and controlling. FIG. 27F shows a capacitive position sensor located on the back surface of a mirror. As the mirror rotates, the spacing between a capacitor plate fixed to the mirror and another capacitor plate, fixed to a printed circuit board ("PCB") of the sensor 2780, changes. An electrical signal indicative of this spacing change is generated by the PCB of the sensor 2780. More than one pair of capacitor plates located at different positions on the mirror may be used to monitor the rotation of the mirror.

A galvanometer ("galvo") in accordance with the invention can be made very compact. For example, the galvo can be less than 8 mm high and less than 3 times the mirror height. Because the load points provide a well-defined axis of rotation and prevent undesired motion, the flexures can be small and have a low spring rate about the roll axis. The stiffener can be made rigid and therefore high resonance frequencies can be achieved. The flexure can be designed to have adequate stiffness in the x and y directions and low stiffness about the functional roll axis. In addition, many of the processes and techniques developed for Winchester suspensions may be directly applied to the manufacture of the preferred embodiments of the galvanometer. This can reduce manufacturing cost.

The inventors further contemplate a galvanometer with a pivot support. FIGS. 27G, 27H, and 27I show one example of such a galvanometer in accordance with the invention. Two rigid pivot pins 2790 with a desirable hardness and durability are fixed to a stiffener to define a rotation axis. The pivot pins 2790 may be made of steel. One of the pivot pins may be spring preloaded while the other one may be fixed. A mirror assembly 2794 having two sockets for supporting the pivot pins is then suspended from the stiffener. The sockets 2792 are made of a material with desirable hardness and durability such as the type of jewels used in wrist watches. FIG. 27H shows a pivot-type galvanometer with a moving magnet and fixed coil. Alternatively, a configuration with a moving coil and fixed magnet can also be used.

Embodiments of a miniature galvanometer have been described here with respect to controlling a mirror. It should be understood that a refractive optical element such as a parallel transparent plate and a prism may also be installed in the galvanometer.

Optical Storage Media
1. Materials for Optical Storage

A variety of materials can be used in the practice of the present invention. One way to categorize the materials is based on the writability of a medium. Therefore, materials for optical storage can be classified as writable/erasable materials (i.e., write-many-read-many), write-once and read-many materials, and read-only materials.

(1) Non-Erasable Media

Read-only media can be used with the preferred flying optical head to form read-only memory systems with high storage capacity. In contrast to conventional read-only systems (e.g., conventional CDROMs and DVDROMs), the read-only system in accordance with the invention can use a disk with higher storage density due to the high focusing power of the preferred optical flying head. The materials for the read-only disk can be similar to the materials used in conventional read-only disks. Also, a flying head with a high numerical aperture can be combined with a short-wavelength laser (e.g., blue), and at least two readout layers per surface to allow a single read-only disk to hold hundreds of Gigabytes or even a TeraByte of information therein.

Write-once media that can be used with a flying optical head include, but are not limited to, ablative metals, dye-impregnated polymer materials, write-once types of phase change media, etc. In all of these cases, the write laser makes a permanent change in the recording layer that cannot later be erased or written over. One example of commercially available write-once and read-many material is light-absorptive tellurium alloys. A laser at a desired wavelength writes data on the Te layer by burning holes therein. The preferred flying head of the invention allows a higher storage density on a write-once medium than the conventional write-once system.

(2) Writable/Erasable Media
a. Magneto-Optical Media and First Surface Recording This is a class of materials in use by most erasable optical drives today. There are many possible formulations of magneto-optical ("MO") recording materials, but one of the most common is an antireflective stack of materials that reduces the basic reflectivity of the metallic MO layer (in order to absorb more light for writing the magnetic domains) and this stack also allows the read out signal to bounce back and forth in the stack before exiting to increase the Kerr rotation of the polarized light beam. A typical stack would involve a reflector having a metallic layer such as aluminum, a transparent dielectric layer, a magneto-optic layer which is typically made of a rare earth-transition metal compound such as TbFeCo, and a final dielectric layer.

Traditional optical recording uses a transparent substrate, such as glass or polycarbonate plastic, to bring any dust or other contaminant particles on the light entrance surface severely out of focus. A typical substrate thickness is 1.2 mm (such as in MO media, CDROM's, etc.) or 0.6 mm (such as in DVDROM and DVDRAM). The recording layer is then deposited on the light exit surface of the substrate in the following manner: dielectric, MO layer, dielectric, and a reflective layer (e.g., aluminum). This is shown in FIG. 28A. The dielectric layers surrounding the MO layer act as an antireflection structure thereby improving the thermal response and read back signal from the MO layer. Also, the aluminum layer functions as a light reflector and a heat sink. In its bare metal form, the MO layer may be able to reflect more than 50% of the incident light. The multilayer structure reduces the reflectivity to around 20% to 30% which increases the power absorption in the MO layer due to multiple reflections within the multi-layer stack. This effectively increase the recording sensitivity and maximizes the read signal. Therefore, by efficiently utilizing the available laser power, the common two dielectric approach has been proven to enhance both the read and write performance of erasable MO media.

Thus, the laser light passes through the thick substrate allowing any contaminants, such as dust or fingerprints, to be very much out of focus. The light then enters the MO layer stack and if the laser power is high enough, the MO layer absorbs enough power to heat the material to a point that the magnetic coercivity is lowered enough to allow a magnetic domain to form in the direction of a low magnetic bias field (typically in the range of 80 to 300 Oersteds). During readout, the laser light power is reduced, and the magnetic domain in the magneto-optic layer, which has a component substantially perpendicular to the medium, rotates the polarization of the light beam in a direction dependent on the bipolar direction of the magnetic domain. This is commonly known as the magneto-optic Kerr effect. With the traditional magneto-optic materials, the external magnetic coil creating the magnetic bias field is large in size, such that the inductance of the coil is also large. Hence, the coil cannot be easily switched at a high speed. As a result, a two-pass write is usually implemented, in which the first revolution of the disk writes all zeros, and any ones are written in the next revolution of the disk. The preferred flying head of the invention can be used with a MO disk with the conventional structure to achieve higher storage density, at least in part due to the high focusing power of the flying head, and the single-pass write, which improves the data throughput.

A novel structure of MO disks can be used with the preferred flying head system with advantages especially for near-field recording. FIG. 28B shows a preferred structure of a MO disk of the invention. A reverse MO layer structure is preferred for the flying optical head approach in accordance with the invention.

A flying optical head approach usually has a high numerical aperture ("NA"). The working distance of the focusing optics is the distance from the final lens surface to the first physical surface of the media. For lenses with a high numerical aperture, this working distance becomes very small, as noted above, less than a wavelength in near-field recording. Thus, a flying optical head with a high NA lens cannot focus through any of the common optical substrate materials. The solution to this is to put the recording layer on the top, or light entrance surface of the substrate. Since the light no longer passes through the substrate, the substrate does not need to be transparent. For example, an aluminum substrate may be used. This recording method is called "first-surface recording" since the laser light enters the media at the first surface of the substrate. A typical first surface MO layer stack can be formed with the same materials as in traditional MO recording disks, except in a reverse sequence: the reflector (such as aluminum) is put down first, then a dielectric, then the MO layer, then the top dielectric layer. Recording and readout occur in a similar manner as in traditional MO layers.

The top dielectric layer preferably is mechanically hard and durable and very smooth to accommodate a flying head. One suitable dielectric material, for example, is SiN for the top layer. Since the flying head is very close to the MO layer in the first surface recording, a very small integrated MO bias coil can be part of the flying head or slider. Since this coil can be very small (typically in micron dimensions), the inductance of the coil is small and hence the coil can be operated at a high frequency. Thus, when the laser power raises the MO layer temperature to above the Curie temperature, the coil can be switched at the data rate to write the vertical magnetic domains. This is a well known process called Magnetic Field Modulation recording.

The bias coil field can also be switched from one magnetic direction to an opposite direction for recording before the disk moves more than one focused spot diameter. This allows recording of crescent shaped magnetic domains. It has been shown that up to five crescents may be recorded within one optical spot diameter, where this diameter is the typical single spot recording on the media. Thus, with this crescent recording method, the linear storage density can be significantly increased over the traditional MO recording that uses a larger external coil. Also, the present invention makes a single-pass, direct-overwrite operation possible.

b. Other Magneto-Optical Materials

The inventors contemplate that a class of MO materials known as Light Intensity Modulation, Direct OverWrite ("LIMDOW") can be used in practicing the present invention. This type of media typically has more than one MO layer in the stack, and an external field is no longer required; by changing the intensity of the high power write beam, the media can be either written or erased. A magnetic bias field is created within one of the MO layers. This LIMDOW material has an advantage over traditional MO materials in that an external magnetic bias coil is no longer needed and a direct-overwrite function is provided (one revolution of the disk to write). However, LIMDOW media is more complex to make than traditional MO media (many more layers), and is not needed for magnetic field modulation MO media which could alternatively be used with a flying optical head. The flying optical head has the direct overwrite feature without the added complexity of the LIMDOW type media.

Magnetic Super-Resolution ("MSR") media form another class of MO media that can be used in accordance with the present invention. Similarly to conventional magneto-optic media, MSR media has a storage layer for recording and storing data. Additionally, MSR media include at least one extra magneto-optic layer as a readout layer. The readout layer is used to remove the adjacent domains at the time of reading so that a read beam is able to detect one domain at a time. This achieves an increase in resolution thereby allowing for an increase in linear or aerial bit density. Selective copying is activated by raising the medium temperature induced by the read beam itself. It is possible to use this MSR magneto-optic media in a flying head optical drive.

FIGS. 28C–28E show an MSR medium under three different operation configurations: the rear aperture detection ("RAD"), center aperture detection ("CAD"), and front aperture detection ("FAD"). The RAD method is shown in FIG. 28C. The MSR medium includes a bottom storage layer and a top read layer. Initially, the data is recorded on both layers but the read layer is initialized by the applied field $H_{ini}$ prior to readout. During readout, the trailing side of the focused spot preheats the readout layer. As a result, the underlying domains in the storage layer replicate themselves onto the heated area through exchange coupling or the assistance of an applied field $H_r$. A higher resolution is achieved because only the domains in the rear aperture are being read.

The CAD method shown in FIG. 28D is the simplest MSR structure compared to FAD and RAD because it does not require any biasing or initialization magnets. An MSR medium for CAD also has a bottom storage layer and a top readout layer. The readout layer has an in-plane magnetization which aligns with the magnetization of the storage layer as it is heated by the center of the focused spot through exchange coupling. A higher resolution is achieved because only the domains in the central aperture are being read.

The FAD method, shown in FIG. 28E, has three magnetic layers with a bottom storage layer, an intermediate coupling layer, and a top read layer. The bottom and top layers initially has identical copies of the recorded domains. The intermediate layer is used to enhance the coupling efficiency between the top read layer and the bottom storage layer. A constant magnetic field Hr is applied near the readout area. At the time of readout, the trailing side of the focused spot preheats the readout and coupling layers. At this point, the magnetization in the rear aperture aligns itself with Hr allowing front aperture detection or FAD.

A new class of MO materials for Magnetic Amplifying Magneto-Optical System ("MAMMOS") has been recently demonstrated by Hitachi-Maxell. In this media, an extra magnetic layer above the recording layer is used to amplify a signal of a domain in the recording layer during playback. For example, an amplifying layer of GdFeCo can be formed on an conventional TbFeCo recording layer of a magneto-optic disk. This amplifying layer can be used to ensure enhanced playback of high-density recording spots, e.g., with a spot size around 0.1~0.3 $\mu$m in diameter. This is illustrated in FIG. 28F.

In a readout operation, the small magnetic domain of the recording layer is heated by a focused laser beam. Magnetic transformation causes a new domain with the same magnetic orientation to form on the amplifying layer on top of the recording layer. The newly formed magnetic domain in the amplifying layer grows if an external magnetic field is applied in the same direction as the local magnetic orientation. This amplification improves the signal detection in readout or enhances the apparent signal-to-noise ratio of the recorded bit in the recording layer.

For example, the actual magnitude of the readout signal produced by an MAMMOS can be more than three times as large as the signal generated from the same recording layer with a conventional recording method. In addition, a reversed external magnetic field is applied to an amplified domain to eliminate the domain in the amplifying layer after the domain is read out and before the next domain is amplified for readout. Hence, the external magnetic bias field is modulated at the data rate of the storage system. This allows recording of smaller domains than could normally be read with a given focused laser spot.

This new type of MO media may be used to increase the areal density of a flying head MO system of the present invention, since the small bias coil is built into the head and can be modulated at very high speeds.

c. Phase Change Media for Optical Storage

Phase change is a different class of rewritable optical media from MO media. In phase change media, a laser beam is used to heat the material and then the material is cooled at a rate to either render the material amorphous or crystalline. The data is read out by the difference in reflectivity between the two states. No magnetic bias field is used for phase change recording or readout, so all of the flying head descriptions herein can also be used for phase change media, but in the instant case the magnetic coil would not be installed near the bottom surface of the head. Thus, no mesa may be needed in the near-field lens. Phase change materials have been proposed for rewritable CDROM's and DVDROM's (known as CD-RW and DVD-RAM). In phase change materials, heating and cooling cause the molecules in the medium to be rearranged, thus typical write/erase times are slower than that for MO materials. Also, this molecular rearrangement process eventually starts to fatigue, causing a failure to erase or rewrite after 10's to 100's of thousands of erase cycles. Magneto-optic materials, on the other hand, have no known erase cycle limitations.

2. MO Multilayer Structure for First Surface Recording

Typically, the material layer composition and thickness in an MO layer stack are designed to optimize several parameters for the best performance, including the medium sensitivity for recording, the magnetic field response, the signal-to-noise ratio ("SNR") of the read out, and the thermal properties of the media. To increase recording sensitivity, the multilayer optical stack of materials is tuned to lower the reflectivity so as to allow more of the recording light to be absorbed. If the reflectivity is reduced too much, however, very little light will be reflected from the material upon readout, resulting in a reduced SNR. For many common MO materials, a reflectivity in the range of 20 to 30% generally provides a good trade-off between write sensitivity and readout SNR. The MO layer should be thin enough and have a proper composition to react to a reasonably low magnetic bias field, typically in the range of 80 to 300 Oersteds, when heated by a laser beam. This allows a reasonable-sized bias coil with acceptable currents to create the magnetic field needed at the focused laser spot location in the media. The thermal properties of the media are very important for allowing high definition and small MO domains to be recorded. If too much lateral thermal diffusion in the plane of the MO media layer exists, the written domains will thermally expand or spread before the medium cools to below the Curie temperature to freeze the domain in place. If too much vertical thermal diffusion into the metal reflector layer exists, then the write sensitivity is affected and more laser power is needed to perform the write operation.

For near-field optical recording in the MO media, the recording layer composition and thicknesses have other significant requirements that can affect the storage system performance. In particular, a flying optical head will have a varying flight height between the near field lens and the media. For example, the variation in the flight height is dependent on the disk linear velocity (the changing radius of the head on the disk) and air pressure and altitude. This variation in the flight height or air gap may produce a significant fluctuation in read and write performance since the near-field optics such as a SIL relies on coupling exponentially decaying evanescent light waves to the media. In particular, the air gap variations can affect the performance of multilayered MO media since the air gap can be viewed as a varying thickness thin film on top of an MO layer structure that is already phase (or interference) matched. Therefore, it is important to design the media layers such that the media is least sensitive to flight height variations.

In general, the medium design depends on a number of parameters, including but not limited to, (1) the index of refraction of the near-field lens material (e.g., SIL lens material), (2) the NA of the objective lens, (3) the air gap distance, (4) the air gap variation, and (5) the exact composition and thicknesses of the multilayer MO media.

The inventors discovered that the dielectric index of refraction and thickness can play an important role in "flattening" the response of the MO media with respect to air gap changes. In practice, the refractive index is usually not a parameter which can be easily varied. However, it is possible to obtain a desired solution by combining different dielectric materials and adjusting their thicknesses.

As an example, one of the dielectric layers in the normal MO stack may be made to include two dielectric coatings of high and low refractive indices, such as H/L or L/H, or H/L/H/L, etc. An example of an MO stack that greatly reduces any air gap sensitivity for either the reflectivity or the MO signal is:

(SiN/SiO$_2$)/MO/SiN/Al/substrate.

The top high-index layer can be formed with SiN (e.g., n~2.0) and the next layer of lower index can be formed with SiO$_2$ (e.g., n~1.5). This structure also maintains the harder, tougher SiN layer at the top surface for a better mechanical interface for the flying head.

The following is a detailed description of a preferred approach for designing an optimal MO structure for the near-field recording with a flying head.

For a preferred near-field recording system with a flying head using a SIL and/or a GRIN lens, the MO media is constructed such that the light reaches the MO layer from the air (i.e. the air-incident mode). This can be accomplished by a "reversed" MO structure as shown in FIG. 28B. In this case, an optically-thick reflector layer (e.g., Al layer) is formed on a substrate. A dielectric layer and an MO layer are sequentially formed on top of the reflector layer. The layer thicknesses and the type of dielectric may need to be varied in order to accommodate the air layer and different refractive index of incidence.

The design of air-incident MO media is relatively straightforward provided the air gap between the SIL and media is invariant. However, the air gap is known to vary due to several head-medium mechanical tolerances, e.g., air-bearing surfaces non-uniformity, media flatness, head suspension, media and head skew, and so on. In some cases, these tolerances can amount to an air gap variation ranging approximately from 75 to 125 nm with a nominal air gap or flight height of about 100 nm. Therefore, it is important to design the media such that it is less sensitive to flight height variation for robust operability.

The inventors investigated the preferred near-field flying head recording system by modeling the same with a diffraction model in combination with thin-film simulation package developed by M. Mansuripur at the University of Arizona. See Mansuripur, M., "Certain Computational Aspects of Vector Diffraction Problems", J. Opt. Soc. of Am., Vol. 6, No. 5 (June 1989). The diffraction model (termed "DIFFRACT") includes a Fourier decomposition of a given amplitude distribution in space into plane waves and a subsequent superposition of these plane waves, after propagation through various selected optical components. DIFFRACT is run in a quasi-vector mode and bending and mixing of the components of polarization is performed to a certain extent. DIFFRACT handles the propagation of a linearly polarized collimated Gaussian beam of wavelength $\lambda$ and a specified l/e point. The beam is incident on an objective lens with an numerical aperture NA and a focal length FL. The beam is focused in a medium of incidence that has a refractive index $n_{sn}$. The focal point of the objective lens is assumed to coincide with the interface between the flying head and air. The propagation of the beam outside the flying head near-field lens is handled by a thin film program known as "MULTILAYER". See Mansuripur, M., "Analysis of Multilayer Thin-Film Structures Containing Magneto-Optic and Anisotropic Media at Oblique Incidence Using 2×2 Matrices," J. Appl. Phys., Vol. 67, No. 10 (May 1990). MULTILAYER calculates the reflection from the multilayer stack including the air gap and media structure.

FIG. 28G illustrates the modeled recording system. Although a SIL is shown, a near-field head employing a GRIN lens is also applicable. The reflected beam is collected by the objective lens and directed to a Polarizing Beam Splitter (PBS) followed by two detectors, namely, A and B. The sum of detectors A and B is proportional to the reflectivity of the stack while the difference of A and B is proportional to the MO signal used to detect recorded data. The reflected beam is also directed to a quarter wave plate (QWP) with its fast axis along the axis of incidence polarization. The QWP along with a PBS and another set of differential detectors C and D are used to measure the ellipticity in the MO signal.

The parameters of a typical optical system shown in FIG. 28G are listed below:

Incident Beam:
  Linearly polarized
  Gaussian 1/e 0.813 mm
  Wavelength $\lambda$=85 nm
Objective Lens:
  Radius=0.8 mm
  NA=0.65
  FL=1.23 mm
SIL Material: n=2.00 k=0
Optical Properties of the Layers at $\lambda$=685 nm:
  SiN: n=2.07, k=0.05
  $SiO_2$: n=1.45, k=0
  MO: n+=3.5368, k+=3.4874, n−=3.4346 k−=3.4148
  AL: n=1.5618, k=9.0725
  Air: n=1
  where n is the index of refraction and k is the index of absorption.

The inventors discovered that the preferred but not necessarily required conditions for maximum coupling efficiency and optimum read/write performance can be summarized by the following:

(A) Reflectivity (A+B) less than 30% (this is useful for good media sensitivity and low feedback into the laser, hence lower noise).

(B) MO signal, i.e., (A−B), better than MO media with 20% reflectivity and 0.8 degrees of Kerr rotation [(A−B)=Reflectivity (%)×Kerr Rotation$_{in\ radians}$×2×Gain]. For example, when Gain=100, A−B=55.82.

(C) Relative change of reflectivity less than 5% over an air gap range of 75 to 125 nm, i.e. $(R_{@125}-R_{@75})/R_{@100}<5\%$.

(E) Relative change of MO signal less than 5% over an air gap range of 75 to 125 nm i.e. $(MO_{@125}-MO_{@75})/MO_{@100}<5\%$.

(F) Good frequency response over an air gap range of 75 to 125 nm.

(G) Acceptable tolerance of thin film thickness variation.

In addition, the following guidelines and conditions have been used in all designs in modeling:

(A) Aluminum reflecting layer of thickness greater than 40 nm (i.e., optically thick);

(B) Air gap varies from 75 to 125 nm;

(C) MO thin layer employed to increase the magnetic field sensitivity (i.e., less than 20 nm);

(D) SiN used as a final 'capping' layer for smooth and durable flying conditions; and (E) other low index dielectrics (e.g., $SiO_2$) can be used.

One simple MO medium structure may have an MO layer surrounded by two antireflection dielectric layers all deposited on a reflector layer, which is usually aluminum (Al). This is shown in FIGS. 28A and 28B. In a well defined system (i.e., single wavelength and little variation in layer thickness), the antireflection layers can have a wide range of optical characteristics such as thickness and index of refraction while still offering acceptable read/write performance.

However, in a near-field flying head system, a thin layer of air of varying thickness is added to the medium structure which produces a substantial amount of reflections from the SIL-air and air-media interfaces. Moreover, due to the change in air gap, these reflections will interfere differently as a function of air thickness i.e., add constructively or destructively. For example, a variation in air gap of ±25 nm is equivalent to an optical path difference of 0.145 $\lambda$ in double path which is significant when added to an interference structure such as a typical quadrilayer MO medium. Therefore, in a near-field flying head system, the dielectric index of refraction and thickness play an important role in "flattening" the response of the media to air gap changes. In practice, the refractive index is usually not a parameter which can be easily varied and materials suitable for use as thin films dielectric are limited in number. However, it is possible to obtain a desired solution by combining different dielectric materials and adjusting their thicknesses. Moreover, a multilayer dielectric stack offers the advantage of a broader range of operation with respect to variations in the flight height of the flying head. The dielectric stack is usually composed of two dielectrics of high and low refractive indices (H/L or L/H or H/L/H/L, etc . . . ). In this example, the dielectric selection was two dielectric materials, namely, silicon nitride (SiN) and silicon oxide (SiOx). SiN is a high index material (n≈2.1) while SiOx is a low index material (n≈1.45). SiN was used as the last layer in order to protect the SiOx layer which tends to be less robust for durability and flyability.

In the simplest case involving only one two-dielectric stack (H/L or L/H), there are two possible antireflection approaches, namely:

(SiN/SiOx)/MO/(SiN)/Al/Substrate        (Structure I)

or

SiN/MO/(SiOx/SiN)/Al/Substrate          (Structure II)

Note that SiN on either side of the MO layer can also be substituted by (SiN/SiOx) or (SiOx/SiN). Of course, it is desirable to keep the design as simple as possible since additional layers add to the total thickness and cost of the media.

In order to provide added protection to the MO layer, structure I was chosen. In structure I, the SiOx layer can be about a quarter wave thick. The remaining SiN layers can be either thin or thick, or both. This results in four possible structures as follows:

I1. thin(SiN)/SiOx/MO/thin (SiN)/AL/Sub;

I2. thin (SiN)/SiOx/MO/thick (SiN)/AL/Sub;

I3. thick (SiN)/SiOx/MO/thin(SiN)/AL/Sub;

I4. thick(SiN)/SiOx/MO/thick(SiN)/AL/Sub.

The thin(SiN) and thick(SiN) in the above are defined as:

$\lambda/32/nH < thin(SiN) < \lambda/4/nH$ for thin conditions;

$2\lambda/4/nH < thick(SiN) < 3\lambda/4/nH$ for thick conditions;

and $\lambda/8/nL < SiOx < 3\lambda/8/nL$ for all conditions where nH and nL are the refractive indices for the corresponding dielectric materials.

The thick SiN layer is at least a half-wave in optical thickness while the thin layer is considered to be less than a quarter-wave in optical thickness. The SiOx layer is nominally a quarter-wave.

Structure I1 is the thinnest structure which in some cases is more attractive for manufacturability and throughput. Structures I2, I3, and I4 all have an additional one or two half-wave layers of SiN. The half-wave layer allows for additional flexibility in the design of the media with, in some cases, even broader functionality. The function of the half-waver layer is described in detail by Macleod, H. A. in "Thin-Film Optical Filters", Sec. Ed., McGraw Hill, 1989, which is incorporated herein by reference. The half-wave layer is referred to as an absentee or flattening layer, i.e., it does not alter the reflection at normal incidence. Unfortunately, the addition of a half-wave layer makes the media very thick, especially when deposited on a grooved or featured substrate such as ones used in most SIL systems. The features on the substrate are less than a quarter wave deep which may be "flooded" by thick films. Moreover, from a manufacturability point of view, thick media tend to have more flakes or sputtering defects which can cause head crashes. Based on the above, Structure I1 may best meet the criterion for designing a near-field medium.

Finding nominal thicknesses for Structure I1 is obtained by running the aforementioned model as a function of various thickness values. The following thicknesses were varied:

| | |
|---|---|
| SiN (Top Layer) | 15 to 40 nm by 5 nm |
| $SiO_2$ | 100 to 140 by 5 nm |
| MO layer | 15 to 20 nm by 1 nm |
| SiN layer | 10 to 40 nm by 5 nm |
| Al layer | fixed at 80 nm |

TABLE I

| Sample | Flight Height (nm) | R (%) | Rotation (deg.) | Ellipticity (deg.) | MO Signal |
|---|---|---|---|---|---|
| $SiN_{15}SiO2_{125}MO_{20}SiN_{30}$ | 76 | 24.2 | .79 | −.39 | 67.1 |
| $SiN_{15}SiO2_{125}MO_{20}SiN_{30}$ | 100 | 22.9 | .80 | −.25 | 64.4 |
| $SiN_{15}SiO2_{125}MO_{20}SiN_{30}$ | 125 | 25.5 | .72 | .08 | 64.3 |
| $SiN_{92}MO_{25}SiN_{30}$ | 75 | 10.1 | .89 | .64 | 31.6 |
| $SiN_{92}MO_{25}SiN_{30}$ | 100 | 12.3 | .56 | .08 | 24.2 |
| $SiN_{92}MO_{25}SiN_{30}$ | 125 | 17.4 | .40 | .20 | 24.5 |

The above modeling generates an optical film structure given by $SiN_{15}SiO2_{125}MO_{20}SiN_{30}$. The optical characteristics of this MO structure are listed in Table I. The MO signals in the TABle I are expressed in a normalized unit to show the relative change in the magnitude of the MO signals. The structure is compared to an SiN only structure ($SiN92MO25SiN_{30}$) as an example showing the variability and poor performance that might occur with non-optimized media. FIGS. 28H and 28I compare the two film structures as a function of flight height in terms of the MO signal (FIG. 28H) and the reflectivity signal (FIG. 28I).

FIGS. 28H and 28I show the flatness in signal levels achieved with $SiN_{15}(SiO_2)_{125} MO_{20}SiN_{30}$ when compared to $SiN_{92}MO_{25}SiN_{30}$ in the range of 75 to 125 nm. Beyond 125 nm, the reflectivity increases and Kerr rotation decreases which maintains a constant MO signal. This, however, comes at the expense of a reduction in the frequency response of the system.

The above-described medium structures having a quarter-wave thickness for the first surface recording layers are usually well suited for a low variation of the reflection and MO signals as the flying height changes. Their advantages include low reflectivity (e.g., <30%) and high MO signal (e.g., >55). However, manufacturing such structures with quarter-wave thickness may, in some cases, cause technical problems due to the limitations of current state-of-art manufacturing technology. For example, such a thick structure may cause planarization of the grooves which can lead to a degraded tracking error signal. In addition, longer deposition times during manufacturing may lead to an increased number of undesirable asperities on the structure surfaces.

In view of the above, thinner structures are desirable in order to utilize the current manufacturing technology. A thin structure generally leads to a higher reflection (e.g., >30%) and increased signal variation (e.g., >10%). The inventors contemplate that the following film structure can be used for a medium for first surface recording:

H/L/MO/H/Metal/Substrate, in which each dielectric layer is less than a quarter wave thick.

For example, the above structure may be used to form the following medium:

SiN(40)/SiOx(15)/MO(9)/SiN(25)/Al/Substrate, where the numbers in parentheses indicate the film thickness in nm. The inventors found that this structure leads to a reflectivity of about 35% and an average MO signal of about 65 in magnitude for various flying heights approximately ranging from 75 to 125 nm. The MO signal variation with the flight height is greater than 20%. In addition, the thickness of the MO layer is chosen to be less than a typical value which is approximately from about 20 nm to about 25 nm. The inventors have found that this can increase the field sensitivity while maintaining signal levels via the Faraday effect.

3. Format of an Optical Medium (1) Disk Format

The preferred medium format of the invention is a disk. The disk format allows easy implementation of an air-bearing surface for the flying head by spinning the disk.

A preferred disk format includes tracking information on a disk surface for generating tracking signals in the reflected beam from the disk. Tracking information can come from a flag, a mechanical reflection groove or a magnetic mark. For near-fielding recording, a shallow groove with a depth less than a wavelength is desirable.

Many conventional magneto-optic disks use "headered" formats for a disk servo and data system. The optical storage system in accordance with the invention can operate with conventional disks.

However, the inventors recognized that a novel headerless magneto-optic disk format may be used which has certain advantages. According to the present invention, a wedge format can be used so that track numbers and wedge numbers are written along the radial lines at a fixed frequency on a magneto-optic disk and are independent of the radial location. This allows the disk drive to read track numbers (e.g., in Gray code) during a seek which enables a better control loop during a fast seek than a format that does not support reading track numbers during a seek.

FIG. 29A is a schematic illustration showing a magneto-optic disk 2900 in a wedge format. The disk with an outer diameter 2901 and an inner diameter 2902 has a predetermined number of revolutions of either concentric or spiral tracks between a disk outside diameter 2903 and a disk inside diameter 2904. Each complete track is preferably divided into an integral number of "bit cells" with equal size in units of servo channel bits ("SCB"). In addition, the disk is divided into a plurality of wedges intersecting all of the tracks; these wedges are labeled as wedge 0, wedge 1, etc. by "spoke" type wedge ID fields 2912. The wedge-shaped areas 2905 between the wedge ID fields 2912 are user data areas having headerless user data sectors. The number of user data sectors per track varies with radius. Although the total number of user data sectors in SCB per track is an integer, each wedge need not contain an integral number of data sectors. The disk 2900 in FIG. 29A can be used to generate a variable user data rate depending on track radius and has a constant wedge data rate for all track radii if the disk spins at a constant angular speed.

One preferred wedge format is further illustrated in FIG. 29B. The size of a wedge is predetermined, e.g., 5000 SCB for a track of 1×10$^6$ SCB in a disk with 200 wedge ID fields. Each wedge comprises a small ID field (e.g., section 2912 of FIG. 29B having 250 SCB) and a data field (e.g., section 2914 of FIG. 29B having 4750 SCB) for storing the user data. The wedge ID field 2912 can be further partitioned into multiple sub fields for various wedge marks and other digital tracking data. For the example shown in FIG. 29B, the wedge ID field 2912 includes three gap fields of different sizes, one sub field for an automatic-gain-control ("AGC") field, one sub field for the sector/index address mark, one sub field for the track number, one sub field for the wedge number, and one sub field for the cyclical redundancy code ("CRC") to verify error-free readout of the track number and the wedge number.

Specifically, the first gap field 2921 is used to account for system tolerances for switching from reading or writing user data to reading wedge data and to account for spindle speed variations; the AGC field 2922 includes a special pattern that the read channel uses to adjust a gain to account for tolerances in head, disk, and electronic system; the sector/index mark 2923 includes a special defect tolerant pattern to allow the system to obtain a bit level timing reference to the wedge data; the second gap field 2924 is used to allow system electronics to switch from sector/index mark detection mode to reading wedge data mode; the track number 2925 includes a gray code representation of the track number which provides the information on the absolute redial position; the wedge number 2962 includes a 2-bit binary encoded representation of the wedge number which can be used to provide the information on the absolute circumferential position; the third gap field 2928 allows the system electronics to verify that the head is at the desired location on the disk surface and to switch modes from reading wedge data to reading or writing user data.

In accordance with the invention, each sector/index mark in the wedges is preferably implemented with a defect tolerant pattern to allow synchronization with the data in a subsequent wedge even in the presence of medium defects. The defect tolerant pattern can be further used to obtain bit level synchronization to the wedge data. In contrast, many prior-art headerless formats in the HDD industry do not provide any tolerance for medium defects in the sector address marks. In many widely-used headered magneto-optic formats, the defect tolerant marks are used only for rough timing of a sector header location; the bit-level data synchronization is implemented with an additional address mark in the header.

Another aspect of the preferred wedge format of the invention is that the sector mark and index mark patterns are preferably a type that allows detection by a correlation detector. It is desirable that the sector/index marks have low auto-correlation factors in the time domain so that they can serve as defect tolerant patterns. It is also desirable that the sector/index marks have low cross-correlation factors with respect to one another so that a sector mark pattern and an index mark pattern are distinguishable from each other. One example for the sector and index mark patterns in accordance with the invention is as follows:

Sector Mark Pattern:
|8 SCB mark|3 SCB space|7 SCB mark|3 SCB space|5 SCB mark|3 SCB space|3 SCB mark|3 SCB space|,
which can be expressed in SCB as:

11111111000111111100011111000111000.

Index Mark Pattern:
|4 SCB mark|5 SCB space|3 SCB mark|5 SCB space|6 SCB mark|7 SCB space|5 SCB mark|,
which can be expressed in SCB as:

1111000001110000011111100000011111.

The 4 bit CRC field 2927 at the end of the preferred wedge ID field 2912 shown in FIG. 29B can provide added tolerance to medium defects by allowing the controller to check if the track number or wedge number it reads might be in error due to a medium defect.

Another feature of the preferred wedge format of the invention is that re-sync marks are incorporated in the data fields. The re-sync marks allow the Encoder/Decoder to regain byte synchronization after a lengthy defect that causes the phase-locked loop ("PLL") in the servo system to slip one or more bits. One re-sync byte is a special pattern that is not a part of normal data. For example, this re-sync byte can be inserted after every 15 bytes of data for a disk drive system. The insertion spatial frequency of the re-sync marks may vary with the specifics of the system and the expected medium defect rate and size. The inventors found that a number of technical obstacles need to be overcome for adding the re-sync marks to a partial response maximum likelihood ("PRML") channel.

In accordance with the invention, the re-sync marks can be used for other functions as well. For example, the re-sync marks can be used to allow initial byte synchronization for a sector if the sector data sync byte pattern is defective; this also provides defect locations that can be used on "retries" to put the PLL into a hold mode in order to further enhance the defect tolerances; and the re-sync marks further provide erasure pointer information to an error correction code ("ECC") system.

In the embodiment shown in FIG. 29A, the wedge fields with the same wedge number for tracks of different radii follow a straight radial line. This may be used with a read/write head on a linear or rotary actuator. FIG. 29C shows another embodiment in which the wedge fields with the same wedge number for tracks of different radii follow a curved radial line that is traced by a read/write head on a rotary actuator.

(2) Tape Format

This format requires an electromechanical system to create a flat surface of the moving tape at the location of the flying head. The motion of the tape can be used for implementing an air-bearing surface for constant focusing.

(3) "Credit Card" Format

An optical card can also be used in practicing the invention. In this format, the read/write head may be vibrated to create an air-bearing surface to "float" the head and the card as the card moves through a read or write/read system.

4. Manufacture of High-Density Optical Media

The high data density capacity of the preferred system requires high density tracks in an optical disk. The state-of-art prior-art mastering systems may not be able to meet the requirements. For example, the minimum track pitch of many prior-art systems is limited to about 0.375 $\mu$m by using a lens with an NA of about 0.9 and an UV laser. Approximately, the recording track is about 0.20 $\mu$m in width and the tracking groove width is about 0.175 $\mu$m. One way to further reduce the track pitch is to use smaller beams for mastering.

The inventors recognized that the near-field recording lens (SIL and/or GRIN lens) of the invention has a NA higher than conventional lenses. The SIL/GRIN lens hence can be implemented in a mastering station to reduce the track pitch. A flying head in accordance with the invention is floated over a photoresist layer coated on a thick glass mastering blank disk during the photoresist exposure. The flying head can use any type of the near-field lenses disclosed above, including but not limited to a hemispherical SIL, a super-hemispherical SIL, a SIL between the hemisphere and super-hemisphere configurations, or a GRIN lens. The optical distance between the bottom of the flying head and the photoresist layer is typically a fraction of a wavelength and more preferably less than a quarter of a wavelength.

The other components of the mastering station according to an embodiment of the invention are similar to a conventional mastering station. For example, the master laser is typically a gas laser emitting light at a UV wavelength, for example, an excimer laser. In addition, a solid-state UV laser including diode-pumped systems may also be used with the invention. Also, the master laser is usually modulated with a light modulator such as an electro-optic modulator or an acousto-optic modulator. Modulation of the driving current may also be used if a diode-pumped UV system is used.

The rotation speed of a master disk is usually slower than that of a magneto-opto disk in a disk drive. Accordingly, a slider for a flying head of a mastering station may have a larger bottom surface than that in a near-field flying head disk drive system in order to suspend the head over the disk in the near-field regime with sufficient air-bearing support.

Since the optimal focus is maintained by the air-bearing surface, a mastering station in accordance with the invention does not require an extra probe laser (e.g., a collimated red laser) and a servo system for maintaining focusing of the mastering UV laser.

A combination of the large numerical aperture of the flying head and the near-field recording configuration allows the mastering station in accordance with the invention to produce much smaller feature size than what is possible with a conventional mastering station operating at the same UV wavelength. For example, a hemispherical SIL lens can be used to create a beam size of about 0.12 $\mu$m, which allows the exposure and etching of tracks in a range of about 0.20 to about 0.25 $\mu$m track pitch. Such small track pitch is very difficult to achieve with a conventional mastering system. A hemispherical or a superspherical SIL head for mastering can be used to achieve an even smaller beam size for narrower grooves below about 0.1 $\mu$m in width.

Another method for achieving smaller track pitches is the bootstrapping servo-writing technology by Hardisk Technology. First, tracks of a wider pitch (e.g., about 0.5 to 1.0 $\mu$m) are mastered onto a master disk and then a molded replica is made into a first-surface rewritable disk. Next, tracks of a finer pitch are written between the wider tracks by a servo-writer or an optical drive. The inventors contemplate that this technique can be applied to servo-writing optical disks at a very fine track pitch by using a near-field recording flying head to bootstrap the coarsely mastered tracks, thus generating final tracks with very fine pitches.

Operations of Flying Head with Multilayer Media

The inventors recognized that multiple storage layers can be formed in a single disk to further increase the storage capacity of the preferred near-field flying head system. In addition, both sides of an optical disk can be used with a first set of multilayers accessible from a first side and a second set of multilayers accessible from a second side. FIG. 30A shows a disk drive system having two flying heads on two separated actuator arms, one accessing the disk from the top surface and the other addressing the disk from the bottom surface.

One conventional method of addressing multiple layers is to focus a read/write beam to one selected layer so that other layers are out of focus. Changing the focus of the beam allows addressing different layers. This conventional method can be implemented in the preferred near-field flying head system. For example, a lens in the optical train of the flying head can be adjusted along the optic axis for refocusing the beam from one layer to another.

The inventors discovered that a number of different approaches can be implemented based on the unique features of the near-field lens.

1. Operating Flying Head with Two-Layer Media

According to the present invention, a SIL, a GRIN lens, or a combination thereof can be used in the following system for addressing two recording layers in a media in a near-field recording configuration.

FIG. 30B is a schematic diagram of one embodiment of the invention. A head 3010 is shown located generally adjacent an optical medium 3000, e.g., a disk in a disk drive. The disk 3000 has two recording layers a first recording layer 3002 on the top surface and a second layer 3006 below the first recording layer 3002. The disk 3000 also has two transparent dielectric layers 3004 and 3008. A transparent protection layer (not shown) may be formed on the top of the first recording layer 3002. In this position, the head 3010 may be reading data from or writing data to the disk 3000.

The assembly of the flying head 3010 with a SIL is described in detail in foregoing sections herein. Preferably, the head 3010 has a SIL 3012, a slider 3014, and an objective lens 3016. The SIL 3012 is at least partially embedded within the slider 3014. The slider 3014 has a top surface 3015 and a channel surface 3013. The slider 3014 also has air-bearing surfaces 3013 which can be designed to ride at a predetermined height above the disk 3000 while the disk 3000 is rotating at a specific speed. The slider 3014 thus also rides at that predetermined height.

As described in foregoing sections herein, an optical train for the flying head may include a reflector 3018, an imaging lens 3020, a galvanometer 3022 and a relay lens 3024. Collimated electromagnetic radiation, such as a laser beam, is incident on and converged by the relay lens 3024. The converging beam strikes the galvanometer 3022 and is thereby translated a predetermined distance on the disk surface 3000 so as to read or write to a different portion of the optical recording medium. One way of performing this translation is by use of the galvanometer 3022 having refractive or reflective properties, which may include a mirror, a parallel transparent plate, or a dove prism.

The translated beam is incident on the imaging lens 3020 which re-collimates the otherwise diverging beam. The collimated beam is then directed to the objective lens 3016. A reflector 3018 is shown schematically to illustrate that the beam may undergo reflection before entering the objective lens 3016. One reason reflection is desirable is for efficient use of space inside a disk drive. The reflector 3018 may be, for example, a mirror or prism mounted on an arm tied to a coarse actuator (not shown). The coarse actuator is used for accessing any track on the optical recording medium.

The objective lens 3016 is mounted onto or near a top surface 3015 of the slider 3014 to focus the beam onto the SIL 3012. The objective lens 3018 may also be separated from the slider 3014 by a gap. An optical clear path 3011 is provided between the SIL 3012 and the objective lens 3016 so that the beam may be effectively transmitted from one to the other and back again. The optical clear path 3011 may be made of any optically transparent material such as air, glass or optically clear plastic, which has an index of refraction lower than that of the SIL 3012.

The beam from the optical clear path 3011 is incident on the SIL 3012 which generally has a partial spherical portion 3012a and a flat surface 3012b. As described previously, a number of geometries for the SIL can be implemented to facilitate the flight of the head over the disk 3000 since the flat surface 3012b forms part of the slider air bearing surface.

The objective lens 3016 focuses the beam in the near vicinity of the flat surface 3012b of the SIL 3012 after entering through the partial spherical surface 3012a. More particularly, the beam comes to a focus approximately at the first recording layer 3002 of the disk 3000, shown in FIG. 30B as point 3002a. Even more particularly, the beam is coupled via evanescent waves from the flat surface 3012b of the SIL 3012 to point 3002a of the disk 3000.

Incoming converging rays from the objective lens 3016 are refracted at the partial spherical surface 3012a in the case of the supersphere, which results in an increased effective incident angle θ at which light from the objective lens 3016 may be collected. The increase in the collection angle θ then can result in an increase in the effective numerical aperture. In a hemispherical SIL, the increased effective numerical aperture can rise with n, the refractive index of the material. Such an increase is termed herein as being in a first operating regime, a "hemispherical regime", of the flying head 3010. Despite this increase, no refraction occurs in the hemispherical SIL, as light rays from the objective lens 3016 are all incident radially.

The system described above can be used to read data from an optical disk and to write data to a phase-change type or similar writable optical disk. In FIG. 30B, the system is shown reading or writing from a point 3002a on a first recording layer 3002 in the first operating regime. The position of the relay lens 3024 is adjusted to a first position along the optic axis of the optical train so that the flying head operates in the hemispherical regime to have a focus point in the first recording layer 3002a.

Another operating regime, a second regime, with the same SIL 3012 is possible according to the invention. As described previously, a SIL may be constructed in a "superhemisphere" configuration, in which an extension with an index of refraction substantially equal to that of the hemispherical portion is attached to the hemisphere. In a preferred embodiment, the index mismatch at the operating wavelength should be typically less than about 2% for optimal performance. The thickness of the extension is up to r/n, where r is the radius of the partial spherical surface 3012a and n is the refractive index (FIG. 30D). Then the increased effective numerical aperture can rise as $n^2$. However, the total effective numerical aperture is limited to n.

This second operating regime is termed here a "superhemispherical regime". This is accomplished not by actually forming an extended portion as shown in FIG. 30D but rather by utilizing at least in part the first dielectric layer 3004 of the optical disk 3000. This is illustrated in FIG. 30C. In this second operating regime, a second set of media and substrate layers are used.

To read/write data on the second recording layer 3006, the relay lens 3024 is translated along the optical axis 3025 to a second position. The beam focus is thereby translated to the second media layer 3006, for example, at point 3006a.

The distance the beam focus is moved depends on the thickness of the first substrate layer 3004 and the first recording layer 3002. In general, a recording layer is much thinner than the substrate so its thickness may be disregarded. In cases where this simplifying assumption cannot be made, an effective thickness may be calculated and figured into the overall thickness of the first substrate layer.

The same hemispherical SIL 3012 combines with the air gap, the first recording layer 3002, and the first substrate layer 3004 to effectively form a new SIL in a preferred super-hemispherical configuration. It is desirable that the effective index of refraction of the air gap, the first recording layer 3002, and the first substrate layer 3004 be nearly equal to the refractive index of the hemispherical SIL 3012. The index of the refraction of the first substrate layer 3004 is the dominant factor in matching the index of refraction. This can be done by choosing a proper dielectric material for the first substrate layer 3004 and by adjusting the thickness thereof. In addition, the effective thickness from the flat surface 3012b to the second recording layer 3006 is preferably equal to r/n, where r is the radius of the partial spherical surface 3012a and n is the refractive index of the SIL 3012. Under these preferred conditions, the system can be operated in the super-hemispherical regime by adjusting the position of the relay lens 3024.

Therefore, the flying head 3010 can be used to address either recording layers 3002 and 3006 by switching the system from one operating regime to another based on the positioning of the relay lens 3024.

When data from the first media layer 3002 is to be read or written, the upstream optics of the flying head 3010 are configured to focus the beam on the base of the hemisphere, i.e., the flat portion 3012b. The flying head operates in the hemispherical regime to couple evanescent waves to a disk up to a distance of a fraction of a wavelength away from the flat portion 3012b. On the other hand, the hemispherical SIL 3012 may also be coupled with the air gap, the first recording layer 3002, and the first substrate layer 3004 by use of the upstream optics that focus the beam a distance below the base 3012b of the hemisphere to be at the second recording layer 3006. Then, the flying head operates in the super-hemispherical regime to read/write on the second recording layer 3006.

In either case, evanescent waves couple the beam from its focus on the flat portion to the disk up to a distance of a fraction of a wavelength away from the point at which it is focused. Moving the relay lens 3024 changes the operating regime of the system. This in turn causes the location of the beam focus to change between the two recording layers. Of course, coupling of evanescent waves between the SIL 3012 and the first media surface may still occur when the system is in the second operating regime. However, most of the beam travels through to the second layer where it is focused.

2. Operating Flying Head with Media of More than Two Layers

The use of the above-described two operating range extremes makes design simple. However, another embodiment may also be used in optical storage systems according to the invention. The thickness of the first substrate layer 3004 of the optical medium can be very small or can range up to r/n. If a thickness of less than r/n is used for the first dielectric layer 3004, the amount by which the thickness is less than r/n may be made up by an equivalent optical distance of, for example, an optical flat plate in slider 3014 or a top dielectric coating 3001 on the optical recording medium (FIG. 31), or a combination of both. If a thickness of greater than r/n is used, the amount by which the thickness is greater may be made up by decreasing the thickness of the SIL 3012. In this case, the SIL 3012 may only be a portion of a hemisphere.

Since such a system can focus on any layer in the optical disk up to a depth of r/n, a number of different layers may be used within the disk between the first media layer 3002 and the second media layer 3006. Referring to FIG. 31, a plurality of media layers 3002, 3006, 3009 and 3005 are shown interlaced with respective substrate layers 3004, 3008, 3007 and 3003. By an appropriate location of the relay lens 3024, the flying head may read or write from or to any of the media layers.

The effective numerical aperture of the above embodiments may change depending upon the operating regime. In the first operating regime (FIG. 30B), the effective numerical aperture varies as n (with an upper limit of n). In the second operating regime (FIG. 30C), the effective numerical aperture varies as $n^2$ (with an upper limit of n). In other words, a smaller spot can be achieved in the second regime which is focusing on a location deeper into the disk. In the embodiment of FIG. 31, the effective numerical aperture varies by a power law between n and $n^2$, or as a linear combination of the two.

This effect may be used to vary the areal data density from one layer to the next. Alternatively, this property may be used to compensate for the signal attenuation caused by the travel of the beam through the optical media to deeper layers. In other words, the data density may be maintained constant between layers, but a smaller spot size is used to increase the signal-to-noise ratio with data stored at lower layers.

The first and second sets of media and substrate layers may be bonded together with a variety of adhesives including, for example, an optical adhesive. The adhesive should preferably be transparent. The bottom substrate layer 3003 can be plastic, glass, or aluminum, for example.

If optical reading-only is desired, a selectively reflective material may be provided as the second media layer 3006. For example, the selectively reflective layer can be composed of a number of pits or other non-reflective spots that are encoded with information. The reflected light beam is thus modulated by the pits or spots and thereby is imprinted with the information.

The constituent optics can vary, although the objective lens 3016 can have a micro-focusing feature and an individual numerical aperture of 0.45 to 1.0. The objective lens may be made of, among other materials, glass or plastic, and may have a mass typically less than 35 milligrams.

The partial spherical surface of the SIL can have a radius of less than or about 2 millimeters. The material constituting the SIL may have an index of refraction in the range of 1.4 to 3.5.

The inventors discovered that only one of the previously-described operating regimes may be needed to address multiple recording layers. This embodiment relies, at least in part, on the optical tolerance of a SIL having a partial spherical top surface.

In particular, it is noted that a hemispherical SIL does not need to have a thickness of exactly r in order to function properly. The tolerance of a hemispherical SIL may be, for example, that the thickness be about r±d, wherein d is the tolerance distance of the SIL lens. The tolerance distance d may be about 50 microns. Of course, this value may change depending on the system or user's requirements.

Referring to FIG. 31, the translation of the relay lens 3024 is used to translate the beam focus to many different layers within the optical disk. In this embodiment, however, the super-hemispherical second operating regime need not be used. The system may operate solely in the first (hemispherical) regime so long as the overall distance that the beam focus must move (to access different layers) is less than or equal to the tolerance distance d of the SIL 3012. For the SIL noted above, for example, this distance is about 2d=2×50 microns or 100 microns. For a disk having m recording layers within the tolerance range 2d, the data capacity of the optical disk may be increased at least m times.

The recording medium of the present invention has a plurality of data layers. A protective coating layer 3001 is shown at the top of the multilayer medium, and may be made of, for example, silicon nitride. A plurality of recording layers 3002, 3006, 3009, and 3005 are shown separated by a plurality of gap plates 3004, 3008, 3007, and 3003. Each gap plate can be made of a material having an index of refraction substantially the same as that of the SIL 3012 for index matching. In a preferred embodiment, the index mismatch at the operating wavelength should be typically less than about 2% for optimal performance. In FIG. 31, the beam is shown focused at or near a point 3009a on the third recording layer 3009.

The beam may focus on, for example, the first recording layer 3002 to read or write data. When another recording layer, for example, the second recording layer 3006, needs to be accessed, the relay lens 3024 is translated along the x-axis in such a way as to move the point of focus of the beam from the first recording layer 3002 to the second recording layer 3006. Despite the movement of the beam focus, the advantages of the near-field recording configuration in accordance with the present invention are maintained in part because the distance moved, for the point at which the beam is focused, is still within the tolerance range 2d of the SIL 3012.

In the above example, when the first recording layer 3002 is at the point at which the beam is focussed, the effective SIL thickness is, at worst, r−d (e.g., d=50 microns), which is within the tolerance of the SIL (r±d). When the second recording layer 3006 is accessed, the effective SIL thickness is r−d+d/4(1 gap plate), or r−d/4. This is also within the tolerance of the SIL (r±d). Thus, the SIL is producing a numerical aperture greater than 1.0, and a small spot size (high data density) is achieved in the second recording layer 3006, just as in the first recording layer 3002.

As noted above, the overall tolerance of the SIL may be about 2d=100 microns. This number, of course, depends on various optical elements within the system and will vary depending on design. If each gap thickness was chosen to be d/4 (e.g. 25 microns), as an example, three gap plates could be used with four recording layers (the bottom gap plate 3003 may be incorporated within the overall disk substrate). This is the configuration shown in FIG. 31. The reflectivity and transmissivity of each layer may limit the number of recording layers which may be used. Eventually, less signal strength may be retrieved from layers deeper into the disk due to attenuation from the overlying layers. In all cases above, the evanescent field is coupled between the SIL 3012 and the recording layer.

Loading/Unloading System for Optical Disks
1. Self-Cleaning Removable Cartridge

A surface of an optical disk used for storing recorded information usually needs to be adequately cleaned to faithfully reproduce the recorded information. Cleaning also helps to prevent damage to the components used to access the information, such as read/write heads.

As described above, some modern disks use air-bearing read/write heads which "fly" above the recording surface at a minimum clearance. It is not unusual for the clearance between the read/write head and the disk surface to be less than the diameter of air-born dust particles.

Therefore, dust or other particles caught between the head and the surface of the disk can interfere with the flying of the head, causing catastrophic head crashes, and making the disk unfit for its intended purpose. Also the accumulation of dust particles on the surface of the disk or the transducer of the read/write head can attenuate the signals used to read the information. This may produce erroneous information.

It is also known that most, if not all, dust particles contain a static electric charge. This charge may be either positive or negative. These charged dust particles tend to be attracted to and stick to a disk surface, especially a plastic disk. It is further known that common cleaning methods using cloth, fibers or brushes are not very effective in cleaning this charged dust material off the disk surface, as dust clings to the surface due to its electrostatic charge.

Known techniques for minimizing dust generally include mechanical techniques such as brushing dust away with fibers or enclosing disks in cartridges. In a cartridge system, the removable cartridge usually includes a spring-loaded access door, which should only be opened by the system when accessing the information recorded on the disk. However, a cartridge that is of reasonable cost is not generally dust-proof. Dust may enter the cartridge in numerous ways, for example, during transportation, as removable media are readily transportable. Disks may be stuffed into people's lint-filled pockets, and the access door may be opened accidentally to admit hazardous dust.

Cleaning mechanisms made of a flexible material have been designed for removable disks generally in constant contact with the disk surface. However, these mechanisms are not readily applicable to rigid disks rotating at a high speed, where they would cause wear and tear on both the disk and the cleaning mechanism itself.

In recognition of the above, the inventors devised a disk cleaning device and method that uses electrostatic forces to attract dust particles from the disk surface. This aspect of the invention can be practiced with many forms of storage media, including but not limited to conventional magnetic disks and optical disks.

FIG. 32A shows a disk cartridge assembly 3200 including a rotatable disk 3210. The access to the disk is shown via a sliding door 3207 for a linear actuator. Similarly, a rotary actuator can also be used. In the latter case, the door opens not linearly, but rather along a radial sector of the disk 3210. The disk 3210 is generally rotated by a conventional motor driven spindle (not shown) engaging with a hub 3202 attached at the center of the disk 3210.

The disk 3210 is contained within an enclosure 3204 having a top cover 3205 and an opposing bottom cover 3206. The disk 3210 includes at least one surface 3212 for storing recorded information. The information on the disk 3210 can be read or written by conventional optical or magnetic signals.

The assembly 3200 includes the sliding door 3207 to permit access to the disk 3210 via an access hole 3208 in the enclosure 3204. The disk cartridge assembly 3200 is externally configured to conform with, for example, industry standard "3½ inch" disk drive dimensions. It should be apparent that the invention can be used with disk cartridges conforming to other dimensions. The assembly 3200 preferably has a very thin profile, generally less than 1.0 cm in total thickness.

At higher recording densities, it is important that the recording surface 3212 be kept clean to permit the recording and retrieval of information. Also, unless the disk 3210 is cleaned adequately, dust particles are likely to damage the read/write head (not shown) used to access the information on the disk 3210.

Therefore, as shown in FIG. 32B, the assembly 3200 is provided with a cleaning element 3220 which electrostatically attracts dust off the recording surface 3212 of the disk 3210.

According to an embodiment of the invention, the cleaning element 3220 is mounted on an interior surface 3209 of the enclosure 3204 facing the recording surface 3212. The cleaning element 3220 includes a base 3221 with one end of a lightweight flexible tape 3222 fixed thereon. The tape 3222 is made, for example, of a long-wearing, flexible electret polymer material, in a predetermined size (e.g., approximately 1 mil thick), capable of holding a high electric charge for a long period of time.

The tape 3222 is arranged as one or more flexible planar curtains of tape that extend between a base 3221 and the disk surface 3212. FIG. 32B shows a side view wherein only one curtain of tape is visible. It may be useful, although not necessary, to have the curtains of tape extend along radii of the disk 3210. The material of the tape 3222 contains a static charge that may be generally larger than that of the magnetic media. In this way, dust is forced off the disk surface onto the highly charged cleaning material. This dust sticks to the cleaning material surface and cannot generally return to the disk by air currents or gravity.

Good examples of the cleaning material of tape 3222 are electret materials. These are dielectric bodies with separate electric poles of opposite polarity. Such materials are stable and are typically provided as a highly charged thin plastic film such as Mylar® or Teflon®. When such a plastic film is properly charged (such as with over 100 or even 1,000 volts) the film can retain an adequate charge for tens of years. The voltage and charge level chosen generally depend upon the type of media, the expected lifetime of the media, its electrical environment and the type of dust generally encountered. In normal situations, a high voltage is preferable to a low voltage. However, a high voltage may lead to tape sticking. The charge level chosen should be high enough to strongly attract charged dust particles from the disk but not so high that sticking effects are caused.

Preferably the plastic film is a hydrophobic polymer, for example, Teflon® or polystyrene. These films maintain their charge even in a humid environment.

The tape 3222 may also be self-charging. One way of doing this is to construct the tape of two materials that, when rubbed together, generate equal and opposite charges between them. To increase the surface area available for such rubbing, the tape may be made of strands or fibers. One type of such tape that may be used is manufactured by 3M of Minneapolis, Minn., under the trademark "Duster Doodle".

The charged sections may be located on a single side of the tape. The charged side faces generally towards the disk surface 3212 so that a portion of the surface 3212 moves towards the charged side as the disk rotates underneath. The tape 3222 is sufficiently long such that a portion drags along the disk surface 3212. This provides for a greater contact surface area between the tape and the disk surface 3212, resulting in enhanced cleaning efficiency because the cumulative electrostatic forces are much larger.

The base 3221 on which the tape 3222 is mounted is a generally rectangular backing strip mounted on any of the interior surfaces 3209 of enclosure 3204 facing recording surface 3212 to be cleaned. The length of the base 3221 may be made to conform to the radial dimension of the recording surface 3212 of the disk 3210. Alternatively, the base 3221 can be molded as an integral part of the enclosure 3204.

One way of implementing the invention is shown in FIG. 32C. In this embodiment, the disk surface 3212 engages a plurality of cleaning elements, e.g., four separate cleaning elements, two of which are shown in plan view close-ups as a first cleaning element 3220 having a first tape 3222 and a second cleaning element 3220' having a second tape 3222'. Each tape has alternating sections of positively and negatively oriented electret material so that, as the disk 3210 rotates underneath, the sections attract negatively and positively charged dust particles, respectively.

The first tape 3222 and the second tape 3222' may be charged such that, along any one radial sector of the disk surface 3212, the first tape 3222 has a charge opposite that of the second tape 3222'. Thus, no matter the polarity or net charge of the dust particle on the disk surface 3212, or where on the disk surface 3212 the particle is located, either the first tape 3222 or the second tape 3222' will provide an attractive force to remove it.

In a separate embodiment, the entirety of the first tape 3222 may have a single charge and the entirety of the second tape 3222' may have the opposite charge. In the below discussion, for clarity, a single tape 3222 will be described. However, these examples are fully applicable and are intended to encompass a system with two or more tapes.

FIG. 32D shows, in another embodiment, the relative positions of the enclosure 3204, the disk 3210, and the cleaning element 3220. In this embodiment, the tape 3222 is composed of several parallel strips of a selected electret material which engage with the recording surface 3212 of the disk 3210.

In this embodiment, the tapes contact the disk when it is at rest. Upon disk start-up (at low rpm), the tapes continue to touch and clean the disk surface by attracting the charged dust off the disk. At higher rpm, such as during normal disk drive operation, the air flow raises the tapes off the disk surface.

FIG. 32E shows the cleaning element 3220 when the disk is not rotating. Dust particles are generally indicated by an "X". One end of the tape 3222 is close to or engages with the surface 3212 of the disk 3210 to be cleaned. The base 3221 may include a plurality of ribs 3224 for urging the end of the tape 3222 to engage with the disk 3210 when at rest. However, these ribs are generally not necessary. A gentle angling of the tape 3222 is often sufficient.

With a gentle angling, the tape 3222 does not provide such a downward force that the disk surface 3212 is actually degraded or abraded. In fact, the connection of the tape 3222 to the base 3221 may be designed specifically to provide just the amount of pressure needed to attract dust particles, but not so much as to degrade the disk surface or its lubrication. Factors considered in such design include the charge on the tape 3222, the charge on the dust particles, and the distance to which the above charges must be brought to cause the electrostatic attraction between the tape and the dust particles to overcome the electrostatic attraction between the dust particles and the disk surface 3212. The latter attraction may arise from, for example, gravity, surface charge, surface tension, and electrostatic attraction.

FIG. 32F shows the cleaning element 3220 when the disk 3210 is rotated at a low speed. The tape 3222 is still close to or in contact with the surface 3212 of the disk 3210, and as the disk 3210 rotates, dust particles X are attracted off the recording surface 3212 by the tape 3222. Static charges stored in the tape 3222 capture and retain the dust particles X on the tape 3222 to maintain a clean recording surface 3212.

FIG. 32G shows the assembly 3220 when the disk 3210 is rotating at high speed during normal operation when the information on the recording surface 3212 is being accessed. The movement of air, due to the rapid rotation of the disk 3210, causes one end of the tape 3222 to disengage from the recording surface 3212. This may occur when the disk is rotating at a small percentage of its rated operating speed, for example, at 10%–30% of the rated operating speed. The electrostatic charge on the tape 3222 retains dust particles X on the tape 3222.

FIG. 32H shows another embodiment of the invention for use with a double-sided disk 3210 having two recording surfaces 3212. The assembly 3200 of FIG. 32H is configured with two cleaning elements 3220, one mounted on the interior surfaces 3209 of the top and bottom covers 3205 and 3206 to permit the cleaning of the disk 3210.

FIG. 32I shows another embodiment of the invention including a disk cartridge 3230 removably mounted inside a mounting bay 3240 of a disk drive. In this embodiment, the cleaning elements are mounted in the drive bay rather than in the interior of the disk cartridge. The disk cartridge 3230 includes an enclosure 3231 having an access hole 3232. The disk 3250 is mounted inside the enclosure 3231. The disk 3250 is engaged for rotation by the spindle 3242. The cleaning element 3260 is mounted at a free end of the arm 3262 which can be pivotally or linearly mounted in the mounting bay 3240. The cleaning element 3260 engages with a surface 3252 of the disk 3250 through the access hole 3232 in the enclosure 3231 when the cartridge 3230 is inserted in the mounting bay 3240. The cleaning element 3260 includes, as previously described, a tape 3222 for removing dust from the surface 3252 of the disk 3250.

FIG. 32J shows another embodiment of the present invention. In this embodiment, at least two tapes 3222 are rotatably mounted to the sector door 3270 of the disk 3210. When the sector door 3270 is circumferentially displaced to expose a portion of the disk 3210, the tapes 3222 are circumferentially displaced because they are connected to and move with the sector door 3270. As they are displaced, they clean the disk surface 3212. In general, the number of tapes needed in this embodiment is related to the angular distance that the sector door 3270 moves. For example, if the sector door 3270 moves ninety degrees, eight tapes may be used (each quadrant of ninety degrees is swept by two tapes—one of each polarity). A one-way gear with a cam mechanism may be provided so that, upon the closing of the door 3270, the tapes 3222 are not forced along the disk surface 3212 in a reverse and perhaps an undesired manner. The mechanism may also function to pull the tape off the media prior to the spinning of the media up to operational speed.

2. Disk Protection Carrier and Docking System

The inventors also contemplate a disk docking system and disk protection carriers that provide a controlled and clean environment for disks at all times.

Disk cartridges and carriers are intended to keep disks from contamination and to provide a convenient way for transferring and storing disks. Most of the prior-art designs relied on a user to directly handle the cartridge for loading and unloading. This often results in contamination of the cartridge due to the direct contact with the user's hands. In addition, it is up to a user to place the cartridge in the carrier case when the cartridge is not in use. This further increases the possibility of contamination or other damage due to carelessness of a user. For example, a user may leave the cartridge out of the carrier and expose the cartridge to a wide variety of contaminants. These contaminants can be subsequently introduced into the drive when the contaminated cartridge is loaded.

The present invention provides a system in which a disk cartridge that encloses a disk is out of reach of a user at all times. A special box-like carrier is used to "lock" a cartridge therein when the disk is not in use. The carrier includes a door for loading and unloading the cartridge. A special docking system is implemented in the disk drive. In loading a disk, the carrier is temporarily docked to the drive. The carrier door is then opened and the cartridge is automatically removed from the carrier and transferred into the disk drive. At this time, the empty carrier can be removed from the disk drive. In unloading a disk, an empty carrier is temporarily docked to the drive. The docking system automatically transfers the cartridge from the disk drive to the carrier. The cartridge enclosed in the carrier is then removed from the disk drive. The carrier door remains closed and locked if the carrier is not docked to the disk drive. Hence, this system keeps a cartridge from being in direct contact with any objects other than the carrier and the disk drive.

FIGS. 33A–33C show one preferred embodiment of the above cartridge-in-carrier disk drive of the invention. The optical drive 3310 is equipped with a door 3312 hinged to rotate outwardly. When the door 3312 is opened, preferably under machine control, an opening 3314 is uncovered for inserting a cartridge carrier 3320 (FIG. 33A). The carrier 3320 includes a leading portion 3322 and a cartridge housing 3324 for holding a cartridge 3326. The carrier 3320 also has a door for keeping the cartridge in a protected environment within the cartridge housing 3324. The dimension of the leading portion 3322 is smaller than that of the cartridge housing 3324 and a shoulder 3323 is formed at the interface therebetween.

The size of the opening 3314 is designed to fit closely around the leading portion 3322 of the carrier 3320 and is smaller than the shoulder 3323. In this way, the shoulder 3323 around the leading portion 3322 functions as a stop and is in contact with the front of the drive 3310 when the carrier 3320 is inserted into the drive (FIG. 33B). The leading portion 3322 can have a predetermined length (e.g., about 40 mm long) so that when the carrier 3320 is inserted in the drive opening 3314 it can be accurately located and self-supporting.

When the carrier 3320 is fully inserted against the shoulder 3323, a carrier lock mechanism (not shown) in the drive 3310 locks the carrier 3320 to the drive 3310. A switch or sensor (not shown) provides a signal to the drive that a carrier has been installed. A mechanism (not shown) in the drive 3310 then opens the carrier door and transfers the cartridge 3326 from the carrier 3320 into the drive 3310. The carrier lock mechanism then unlocks the carrier 3320. When the carrier 3320 is unlocked, a carrier ejection (e.g., a spring-loaded ejection) moves the carrier 3320 a small distance outward from its locking position, for example 5 mm, away from the drive 3310. An unlocking sound and the ejection motion may be used to inform the user that the carrier 3320 now can be removed from the drive 3310. Unlocking the carrier can also be accompanied by an indicating tone from a host computer. After the carrier 3320 has been removed from the drive 3310, the door 3312 closes and seals the drive (FIG. 33C).

In unloading the cartridge 3326, the user pushes a button or otherwise notifies the drive 3310. The drive 3310 unloads the heads from the disk 3326, stops the disk 3326, disengages the disk 3326 from the spindle motor and opens the door 3312 of the disk drive 3310. After the door 3312 opens, the user inserts an empty carrier into the drive 3310. The drive moves the cartridge into the carrier. Then, after the carrier 3320 containing the cartridge 3326 has been removed from the drive 3310, the door 3312 closes and seals the drive.

FIGS. 33D and 33E show one example 3350 of the cartridge with a rotating door 3352 that can be used as the cartridge 3326 shown in FIGS. 33A–33C. The rotating door 3352 is closed to keep the disk within the cartridge if the disk is not in use (FIG. 33A). A lock may be implemented to ensure that the sliding door is securely closed at all times when the cartridge is outside the disk drive.

When the cartridge is transferred from the carrier and into the drive 3310 shown in FIGS. 33A–33C, the cartridge door 3352 can be opened by a lever mechanism (not shown). Alternatively, and preferably, the cartridge door 3352 is left closed until the cartridge is lowered onto the spindle motor (not shown) and the disk 3354 (FIG. 33B) has been brought to operating speed. Spinning the disk 3354 in the closed cartridge 3350 will maximize the pumping action of the disk 3354 which forces air through an absolute filter (not shown) thereby cleaning the disk and the inside of the cartridge. After cleaning, the cartridge door 3352 is opened to expose the disk 3354, and one or more read/write heads (not shown) can be loaded to read/write the disk 3354.

3. "Smart" Cartridge or Carrier

FIGS. 33F–33H show an additional feature for storage cartridges that may be used with the cartridge-in-carrier design as well as other cartridge designs. This feature allows transfer of information of the data contents from a computer to the cartridge carrier or cartridge. The content information can include a file directory, file size, date, etc and can be displayed and edited at the user's convenience. The user determines what information is selected for transfer from the computer to the cartridge or cartridge carrier. The selected information is then stored in the cartridge or cartridge carrier. Three embodiments of smart cartridge carriers are disclosed below. It should be understood that the same feature may be implemented in a cartridge.

FIG. 33F is a schematic showing a first embodiment 3360 of the smart cartridge carrier. According to this embodiment, the cartridge is of the type as shown in FIGS. 33A–33C in which a cartridge is kept out of reach of a user at all times. The cartridge carrier 3360 includes a cartridge case 3361 and a front display panel 3362. The content information can be either stored on a designated section on an optical disk enclosed in the cartridge or in a memory chip located in the cartridge or carrier 3360. An electronic interface (not shown) is implemented for transferring the data from a computer, a server or a remote information device in a network. The smart cartridge carrier 3360 has an independent power supply which can be a battery (not shown).

The front display panel 3362 has a display device 3363 such as a liquid crystal display for displaying the content information. At least one power control button 3364 is located on the front display panel 3362 for turning on and off the power. A user control mechanism (e.g., one or more push buttons) may be implemented on the cartridge or cartridge carrier to allow the user to sort through the information in memory. FIG. 33F shows examples of user control buttons including a cancel button 3365, four navigation buttons 3366, and a select button 3367. The content information could be user definable and would typically summarize the contents of the data stored in the cartridge. A user can use the control buttons to search for a desired directory and select a desired item.

In addition to the content information, other information may also be included in the cartridge memory. The capacity of the disk indicating the amount of used space and available space on the disk may be useful. Also, file protection status such as read only and copy protection may also be included in the display.

FIGS. 33G-1 and 33G-2 show a second embodiment 3370 of the smart cartridge carrier which has a removable cartridge 3375. The smart cartridge carrier 3370 has a cartridge case 3371 and a cartridge door 3372 with a display device 3373 and user control buttons. A door lock 3374 is also shown.

FIG. 33H shows a third embodiment 3380 of the smart cartridge carrier. The display panel and the user control buttons are located on top of the carrier case.

This feature is readily applicable to all types of data storage cartridges, i.e., cartridge tapes, removable hard drive cartridges, floppy media, etc. The user interface may be on the cartridge carrier in the cartridge-in-carrier design. The user interface could be on either the cartridge or a docking or storage case for other cartridge types.

This "smart cartridge" concept can be used to reduce or eliminate the need for cartridge paper labels and would automatically be updated by the user when saving new data to the cartridge or deleting existing data from the cartridge. Information that the user may want to store in the "smart cartridge" includes but is not limited to storage directories, cartridge labels, write protect/erase function, capacity used/available, etc.

4. A "Clamshell" Disk Drive

FIG. 34 shows an embodiment of a preferred "clamshell" type of disk drive 3400 having loading, unloading and drive sealing mechanisms. The large part or base of the clamshell 3410 is bowl-shaped. The spindle motor 3411 and actuator (not shown) are rigidly connected to the base. The base 3410 can rotate about hinge pins 3412 fixed to the cover 3413. The base 3410 can be rotated down to accept a cartridge or carrier and then rotated back against a continuous seal 3414 embedded in the cover 3413. When the base 3410 is closed, it slightly compresses the seal 3414 thereby providing protection from contamination and particulate entering the drive enclosure.

The "clamshell" drive 3400 provides very positive sealing and eliminates the need for a separate external door on the drive. The base 3410 and cover 3413 are typically die cast aluminum. The base 3410 can be rotated either manually or by a motor driven mechanism (not shown). The "clamshell" drive is more suitable for loading a bare cartridge similar to prior art drives. If the cartridge is thick or the cartridge-in-carrier is used, the base needs to rotate through a greater angle.

Electronic Components: A Signal-Converting Circuit

In a standard hard disk drive, the front-end signal from the read/write head is proportional to the rate of change of magnetic flux on the disk, i.e., the head in a HDD produces a signal that is the derivative of the magnetic pattern written on the disk. The front-end signal from a magneto-optic head in accordance with the invention, however, is proportional to the magnetic state of the patterns on the disk and hence is an undifferentiated signal. The inventors recognized that the well-developed existing HD drive electronics may be implemented in the preferred disk drive with a flying magneto-optic head of the invention. Therefore, it is desirable to convert the front-end signal from the flying head into a differentiated signal acceptable by existing HDD electronics (e.g., a partial-response-maximum-likelihood chip).

According to the present invention, a magneto-optic drive signal may be differentiated prior to the pulse qualifying process in the circuit in order to use the existing hard drive channels. FIG. 35A is a simplified block diagram of a hard drive signal path. A magnetic head 3501 generates a differentiated signal. The signal is then fed to a hard disk drive channel electronic circuit 3507 for further processing after an amplification by a pre-amplifier 3502. The HDD circuit 3507 includes a signal attenuator 3503, an automatic-gain-control ("AGC") amplifier 3504, an analog filter 3505, and a channel detector 3506.

In order to use the HDD channel for processing a magneto-optic signal, a magneto-optic signal needs to be modified prior to the channel detector 3506. A plurality of possible locations in the HDD channel path shown in FIG. 35A may be used for modifying the magneto-optic signal. For example, the magneto-optic signal can be modified in the preamp 3502, at point 3502a between the preamp 3502 and the HDD channel 3507, or at a location inside the channel 3507 prior to the channel detector 3506.

FIG. 35B shows a modified signal channel path in accordance with the invention. Note that the MO head response generated by the optical sensor is not a differentiated signal. A differentiator can be inserted at any one of the points labeled as A to F, making this chip compatible with an "MO drive" signal. Either a passive or an active differentiator may be used. The inventors recognized that one drawback of a passive differentiator is that the differentiator in a multi-zone disk system should be optimized for every zone. One way to do that is to use a programmable active differentiator that can be programmed for every zone.

Therefore, one preferred location for deploying a differentiator is in the analog filter. One reason for choosing this location is that the analog filter can change the cut-off and boost for every zone/data rate. Hence, if a data differentiator is combined with the analog filter, then the differentiator would be optimized for that data rate with every zone change. Since most channels have a built-in differentiator in the analog filter section, the new differentiator should be referred as a pre-differentiator.

FIG. 35C shows an embodiment implementing a pre-differentiator within the analog filter. It is shown that the MO signal remains the same from the photodetector through the pre-amplifier, attenuator and AGC. The signal after the analog filter is differentiated, equalized, and outputted for bit qualification. FIG. 35D further shows the channel signal flow after the pre-differentiator.

The inventors have demonstrated that an existing hard drive chip can be modified to operate in optical drives. This unique feature allows many hard drive chips to be easily converted for use in a magneto-optic disk drive.

Other Optical Flying Head Configurations

According to the invention, many configurations may be used to implement a near-field system for different applications. Some examples are given below.

1. Flying Head with Multiple Lasers for Addressing Multilayer Media

A plurality of lasers with each at a different wavelength can be disposed in a near-field system with a single near-field lens for addressing multilayer media. A suitable optical disk has multiple recording layers with each responsive to a different wavelength. Thus, a beam at a selected wavelength is only absorbed at a particular layer for reading or writing without affecting any other layers that absorb light of different wavelengths. All of the beams can be combined with at least one beam splitter to go through a single flying SIL head and also a single-tracking galvanometer.

2. Flying Head with Multiple Lasers For Parallel Addressing

Multiple lasers at the same wavelength can be imaged through one near-field lens in a flying head to simultaneously address different locations in an optical disk. Each beam can be separately modulated for such parallel addressing operations as writing or reading individual data tracks. This can significantly increase the data rate of the system.

3. Flying Head with Multiple Near-Field Lenses

Multiple near-field lenses can be implemented in a single flying head in a parallel manner. Each near-field lens produces one read/write beam. All beams simultaneously address different locations on the disk.

4. Multiple Flying Heads Per Actuator Arm

Multiple flying heads can be installed on a single actuator arm. The suspension arm ("flexure arm") for each flying head is designed so that each flying head is suspended with respect to another at a different location. Thus, multiple flying heads can be used to access the same disk simultaneously at different locations.

In particular, at least one flying head on a suspension arm attached to the actuator arm can be positioned to address one side of an optical disk and at least another flying head on another suspension arm on the actuator arm can be positioned to address the other side of the optical disk.

5. Multiple Actuator Arm Configuration

A stack of disks loaded on the same spindle can be implemented. Multiple actuator arms are installed on the same rotary hub. Each actuator arm has one flying head for accessing one disk in the stack. Thus, the total number of disks is equal to the number of actuator arms.

Also, both sides of a disk can be used for storing data. Hence, two actuator arms each with at least one flying head are needed to access the two sides of a disk. This is shown in FIG. 30A for a single-disk system. With multiple disks, the number of actuator arms is twice the number of disks.

6. Flying Head with Integrated Opto-Electronic Circuit (1) Integrated Flying Head with Near-Field Lens In the above described embodiments, the light source, beam relay system, signal detection, and flying head are different components mounted on a rotary or linear actuator arm. The inventors contemplate that these different components can be miniaturized and integrated into a single compact flying head by using integrated opto-electronic circuits, fiber optic light conductors, and/or micro-machined components.

(2) Integrated Flying Head without Near-Field Lens

The inventors further contemplate that the flying head may have a compact diode laser head without the objective lens and the near-field lens. The diode laser in the flying head may be directly coupled to the recording surface by placing the laser output facet in a near-field configuration wherein the facet is a fraction of one wavelength away from the medium. A beam masking element is formed on the output facet of the diode laser so that the output laser beam is spatially confined in a small spot which may have a large divergence angle caused by the two-dimensional masking. In a near-field configuration, the laser is so close to the medium that the tightly confined beam reaches the medium without much divergence. The beam from the laser is reflected back to the laser. The reflected beam can cause a modulation in the driving current of the diode laser. This may be a result of, for example, the coherent interference between the reflected beam and the output beam. The modulation signal can be processed electronically by a signal-processing circuit to extract the magneto-optic data encoded in the reflected beam from the medium. In effect, the diode laser acts as a data detector.

7. Single Fixed Optics Module Driving Two Flying Heads

The aforementioned optical disk drives having two or more flying heads use one fixed optics module per flying head, i.e., each flying head has its own set of beam relay optic components, laser, and detectors. In these embodiments, multiple fixed optics modules would be needed to support multiple flying heads.

The inventors recognized that a fixed optics module takes up considerable vertical space in a drive having a plurality of optical disks. It is therefore desirable to reduce the number of fixed optics modules to make the multiple-disk drive more compact and to reduce the manufacturing cost.

According to the present invention, a single fixed optics module can be used to drive at least two flying heads. FIG. 36A shows a disk drive having a rotary actuator arm that uses a single fixed optics module to support two flying heads. The top flying head addresses a bottom surface of a first disk and the bottom flying head addresses a top surface of a second disk. Two mirrors or a prism at the end of the fixed optics module close to the flying heads can be used to direct the beam either up to the first disk or down to the second disk or to address both disks simultaneously. This configuration can be expanded to two FOMs and four flying heads for four disk surfaces and so on, as illustrated in FIG. 36B. In addition, the inventors contemplate that this configuration can be used in both fixed media drives and removable media drives.

FIGS. 36C and 36D show examples of how to use a single laser in the fixed optics module to support two flying heads. The moving reflector scheme of FIG. 36C allows use of one flying head at a time to address a disk. The beam splitter scheme of FIG. 36D can be used to address two disk surfaces simultaneously. However, a mechanism may be needed in the signal detection system to separate two reflected beams from the two flying heads.

8. Flying Head with Drum (Cylindrical) Media

The near-field flying head system can also be configured to record and read data from the surface of a medium in form of a rotating cylindrical drum. In operation, the near-field head would fly over the recording surface of the rotating drum.

Exemplary Applications

1. Disk Writing, Reading and Copying

The high data transfer rates and high areal densities possible in near-field storage systems in accordance with the invention may be particularly useful for parallel reading and writing to the storage medium using one or more flying heads.

Parallel writes and reads can be used to read/write/erase disks at high speeds. In addition, parallel writes can be used to write software/content onto disks for distribution or replay, and parallel reads can be used to check the recorded data or for replay.

2. Backup Storage

A removable disk or tape based on the near-field recording in accordance with the invention can be used to back up a computer, a group of computers or a network. The backup storage media can be in different formats including a cartridge(for disk or tape), one or more disks, and a tape (e.g., open reel, continuous loop). The media can be fixed or removable, in a single unit, or libraries, or arrays. The connection to a computer can be a PCI bus, a SCSI bus, an IDE bus, a 1394 bus or any other interface.

The near-field storage may be used for different types of backups. Backup may be of data, application software or operating systems.

a. Write-Once. Massive storage capacity allows many backups to be stored on a single disk without ever having to overwrite. This gives users the ability to restore from previous backups, which might be useful if, for example, a virus infects the system but is undetected for some period of time, or a user wants to retrieve a document deleted some time in the past. A system of this type would require software which allows the user to locate each backup.

b. Full Back-Up. This takes a certain amount of time, but is easier to administer. Software could automatically trigger the backup at a time period when the system is likely not in use (e.g., night time or weekends), or as a background operation during the time when the system is in use (e.g., weekdays). This could be done either in a write-once configuration or by overwriting.

c. Incremental Back-Up. This takes less time and storage space, but is more complex. This can be done either write-once or by overwriting, and can be combined with periodic full back-ups.

d. Mirroring Backup. All data transactions are backed up in real time or near real time.

3. Read-Write Storage (1) Computers and Networks

Near-field-based systems in accordance with the invention can be used for mass storage for computers and networks.

a. Near-field systems designed to handle parallel reads/writes have high data transfer rates and may be particularly useful for systems which allow parallel processing. This could be a network with a single-platter drive handling data storage for multiple computers. This could also be a single computer with multiple processors. For example, one arm or head or positioner could be devoted to each CPU. This would require a bus architecture capable of handling parallel traffic.

b. Near-field systems are well-suited to networks of networked computers ("NCs"), since relatively few platters (possibly only one) could handle the storage requirements for a number of NCs.

c. Near-field recording is well suited for large database applications including RAID architectures enabling high-performance direct access to large amount of data without requiring complex libraries (e.g., jukeboxes).

d. Near-field recording is designed to handle large streams of data making it a candidate for specialized video servers and video-on-demand servers.

e. Near-field recording based libraries can be used for storage of large amounts of data and provide near line-access performance that is not easily achievable with other known storage technologies.

(2) Portable Digital Devices

Compact near-field-based drives could be used in or with personal digital assistants (PDAs), notebook computers and other portable digital devices, to provide a large amount of storage capacity in a very small space.

4. User Environment Storage

The ability to store large amounts of data in a small space using the near-field recording of the invention would allow users to carry the entire computing environment (e.g., operating systems, application programs, database, etc.) for their computer in a relatively small cartridge. This could, for example, be a PCMCIA card. The storage would include the user's software, the contents of the user's hard disk, and system configuration information. A user could plug this cartridge or card into any properly configured computer and completely recreate the user's environment. This could be done with a relatively small platter or platters that are fixed in or removable from the drive or cartridge.

5. Content Storage and Distribution (1) Read-Only Storage

Read-only near-field based cartridges can be used to distribute content, which could include software, databases (e.g., telephone directories, restaurant reviews, etc.), movies, television broadcasts, shows, etc. The near-field based read-only disks could easily reach hundreds of Gbytes per disk in the future.

a. Software Libraries. An entire library of software could be distributed on one cartridge. The user might pay for only one program, and then only see that program when the cartridge is used. Conversely, the user could obtain the cartridge as a whole for free, or for a nominal sum, and then obtain access to programs only after making some type of payment (possibly on-line) and receiving a code. This could include pay-for-use with an electronic payment mechanism.

b. Movies. Several movies can be distributed at once. The user could pay for the entire set, or pay for one, or pay for use as in section a above.

c. Television. A network or content provider could distribute programming for a single event or multiple events on one or a plurality of cartridges.

d. Databases. Massive compilations of information can be distributed, including yellow pages, white pages, dictionaries, encyclopedias, cultural information (e.g., reviews of restaurants, movies, etc.), maps (including down to the individual address level), etc.

e. DVD Rewritable Disks. The present invention can be used in digital video disk players to allow rewritable disks to replace conventional VCR tapes, laser disks, DVD, DVD-ROM, DVD-RAM, or any conventional optical recording devices that usually operate in a non-near-field configuration.

(2) Writable Storage

The ability of near-field systems to write may be extremely important in the use of near-field technology for distribution of content, since this allows the content to be updated. This updating would almost certainly take place through on-line connections. For example, a near-field-based system on a PDA could include a listing of every telephone number from every country in the world. This could be updated by dialing into a network site containing current information, and downloading new numbers. This could also be done, for example, with maps, with a cartridge holding complete maps of the United States (down to individual addresses), with additions and changes being available on-line.

6. Bandwidth Enhancement

Near-field-based systems can be used to sharply reduce real time information transmission. For example, a subscriber to an on-line service could receive a disk containing tens of thousands of Web sites. As stored on the disk, these sites would be either of the sites as they existed as of the date the disk was created, or of the basic site itself, without changeable content. After logging into the service, the user could then access any of the Web sites. The site as accessed by the user would consist of a combination of information pulled up from the disk and information downloaded from the network. The disk could then be updated with current information from the site, so that, each time the user visits that site, the only information to be downloaded would be the changes made since the time of the user's last visit. One instance of this is now being called "push" programming.

7. Cameras (1) Still Camera

A near-field-based still camera could be used to eliminate photographic films. A vacation's worth of pictures (or maybe a year's worth of pictures) could be stored in the camera. Digital images stored in a SIL-based camera can be downloaded to a fixed or removable media of a computer.

(2) Video Camera

A near-field-based video camera could store many hours of video with fixed or removable media.

8. Smart Cards

Credit-card sized cartridges could contain gigabytes of information.

(1) Card Containing A Spinning Platter

This could be the equivalent of a small cartridge, with a near-field flying head and the motor power for spinning the disk coming from an outside device such as a computer or a system similar to an ATM-type machine or inside the card. Alternatively, the near-field flying head and the disk driver can also be integrated within the card.

(2) Card Containing A Stripe

This could be placed into a slot, thereby engaging one or multiple motors which would pull the card in or cause relative motion between the head and the card at a speed sufficient to fly a head over the stripe and scan data in x, y, and z dimensions.

9. Partitioned Media

The amount of space on a near-field medium would allow a single disk (or cartridge) to combine several of the applications listed above. For example, a PC could include a 100 GB disk in which 20 GB could store software sold with the computer, 50 GB could store databases sold with the computer (including photo archives, video clips, etc.), and 30 GB would remain for normal disk storage. Some parts of the disk can be pre-written data which may be embossed mechanically (as in molding) in the media surface or write-protected as to be effectively archival.

Although the present invention has been described in detail with reference to the preferred embodiments, one ordinarily skilled in the art to which this invention pertains will appreciate that various modifications and enhancements may be made without departing from the spirit and scope of the following claims.

What is claimed is:

1. A method for mastering a disk for data storage, comprising:

coating a disk with a layer of a photoresist;

positioning a flying head employing a lens of a high numerical aperture (NA) over the surface of the disk by a distance less than one wavelength of an input laser beam;

directing the input laser beam through the lens in the flying head to change the properties of the photoresist coating, whereby to achieve a track of a first pitch;

moldably replicating the disk to a first-surface rewritable disk; and writing tracks of a second pitch between the tracks of the first pitch.

2. The method of claim 1, wherein the directing step includes passing the laser beam through an objective lens.

3. The method of claim 1, wherein the disk is a thick glass mastering blank disk.

4. The method of claim 1, further comprising the step of modulating the laser beam with a light modulator.

5. The method of claim 1, wherein the second pitch is finer than the first pitch.

6. The method of claim 1, further comprising the step of modulating the laser beam with a light modulator.

7. The method of claim 6, wherein the light modulator is an electro-optic modulator or an acousto-optic modulator.

8. The method as in claim 1, wherein the high NA lens is selected from the group consisting of a hemispherical solid immersion lens (SIL), a super-hemispherical SIL lens, a SIL lens between a hemispherical and a super-hemispherical lens, and a GRIN lens.

9. The method as in claim 1, wherein the NA is greater than about 0.9.

10. The method as in claim 1, wherein the input laser beam to the flying head is at a UV wave length.

* * * * *